US010607316B2

(12) United States Patent
Kato et al.

(10) Patent No.: US 10,607,316 B2
(45) Date of Patent: Mar. 31, 2020

(54) IMAGE GENERATING APPARATUS AND IMAGE GENERATING METHOD

(71) Applicant: Panasonic Intellectual Property Management Co., Ltd., Osaka (JP)

(72) Inventors: Yumiko Kato, Osaka (JP); Yoshihide Sawada, Kyoto (JP); Yasuhiro Mukaigawa, Nara (JP); Takuya Funatomi, Nara (JP); Hiroyuki Kubo, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 211 days.

(21) Appl. No.: 15/641,322

(22) Filed: Jul. 5, 2017

(65) Prior Publication Data
US 2018/0025475 A1 Jan. 25, 2018

(30) Foreign Application Priority Data

Jul. 22, 2016 (JP) .................. 2016-144808
Apr. 10, 2017 (JP) .................. 2017-077843

(51) Int. Cl.
G06K 9/00 (2006.01)
G06T 5/00 (2006.01)
(Continued)

(52) U.S. Cl.
CPC ............. G06T 5/002 (2013.01); G02B 21/06 (2013.01); G02B 21/367 (2013.01); G06T 5/50 (2013.01);
(Continued)

(58) Field of Classification Search
CPC .......... G06T 2207/30024; G06T 7/521; G06K 9/00134; G06K 9/00127; G06K 9/0014; G01N 15/1475
See application file for complete search history.

(56) References Cited

U.S. PATENT DOCUMENTS 5,440,426 A * 8/1995 Sandstrom ............. G02B 21/00
359/559
5,631,976 A * 5/1997 Bolle ........................ G06T 5/50
348/E5.038
(Continued)

FOREIGN PATENT DOCUMENTS

JP 2010-019762 1/2010
WO 2014/196203 12/2014

OTHER PUBLICATIONS

Tanaka, Kenichiro, et al. "Descattering of transmissive observation using parallel high-frequency illumination." IEEE International Conference on Computational Photography (ICCP). IEEE, 2013.*
(Continued)

Primary Examiner — Avinash Yentrapati
(74) Attorney, Agent, or Firm — Wenderoth, Llnhd & Ponack, L.L.P.

(57) ABSTRACT

An image generating apparatus is provided with: first and second light sources that illuminate a material; an image sensor on which the material is disposed; a mask which includes a light-transmitting part that transmits light and a light-blocking part that blocks light, and which is positioned between the image sensor and the first and second light sources; and a light and dark image processing unit. The image sensor acquires first and second images of the material when illuminated by the first and second light sources, respectively. The light and dark image processing unit derives a difference between a luminance value of a pixel included in the first image and a luminance value of a pixel
(Continued)

included in the second image at the same position as the pixel included in the first image, and thereby generates a third image of the material.

19 Claims, 25 Drawing Sheets

(51) Int. Cl.
    *G02B 21/06*     (2006.01)
    *G02B 21/36*     (2006.01)
    *G06T 5/50*     (2006.01)
    *H04N 5/225*     (2006.01)
    *H04N 5/345*     (2011.01)

(52) U.S. Cl.
    CPC ........... *H04N 5/2256* (2013.01); *H04N 5/345* (2013.01); *G06T 2207/10056* (2013.01); *G06T 2207/10152* (2013.01); *G06T 2207/30024* (2013.01)

(56) References Cited

U.S. PATENT DOCUMENTS

| | | | | |
|---|---|---|---|---|
| 6,905,838 | B1* | 6/2005 | Bittner | G01N 21/21 435/173.1 |
| 7,345,754 | B1* | 3/2008 | Zhao | G01N 21/4738 356/237.1 |
| 9,343,494 | B2* | 5/2016 | Lee | H01L 27/14629 |
| 2001/0041843 | A1* | 11/2001 | Modell | A61B 5/0066 600/473 |
| 2002/0014577 | A1* | 2/2002 | Ulrich | G01B 11/2513 250/205 |
| 2002/0190228 | A1* | 12/2002 | Suzuki | G03F 7/70066 250/548 |
| 2003/0039388 | A1* | 2/2003 | Ulrich | G01B 11/2513 382/145 |
| 2003/0076423 | A1* | 4/2003 | Dolgoff | G03B 35/16 348/222.1 |
| 2004/0183084 | A1* | 9/2004 | Wachi | G02F 1/133555 257/98 |
| 2006/0066837 | A1* | 3/2006 | Ortyn | C12Q 1/6816 356/73 |
| 2009/0273829 | A1* | 11/2009 | Terakawa | G01N 21/4738 359/385 |
| 2010/0193686 | A1* | 8/2010 | Watanabe | B82Y 10/00 250/307 |
| 2010/0238442 | A1* | 9/2010 | Heng | G01J 3/02 356/343 |
| 2011/0191073 | A1* | 8/2011 | Kim | G01B 11/26 703/2 |
| 2011/0304723 | A1* | 12/2011 | Betzig | G02B 21/0004 348/79 |
| 2014/0112558 | A1* | 4/2014 | Bean | G06K 9/46 382/128 |
| 2014/0133702 | A1* | 5/2014 | Zheng | G06K 9/00624 382/103 |
| 2015/0172575 | A1* | 6/2015 | Adachi | H04N 5/2354 348/239 |
| 2015/0279033 | A1* | 10/2015 | Murakami | G06T 7/0014 382/128 |
| 2016/0178883 | A1* | 6/2016 | Horstmeyer | G02B 21/367 348/80 |
| 2018/0329193 | A1* | 11/2018 | Hirata | G02B 21/086 |

OTHER PUBLICATIONS

Kenichiro Tanaka et al., "Descattering of transmissive observation using parallel high-frequency illumination", IEEE International Conference on Computational Photography (ICCP2013), Apr. 2013.

* cited by examiner

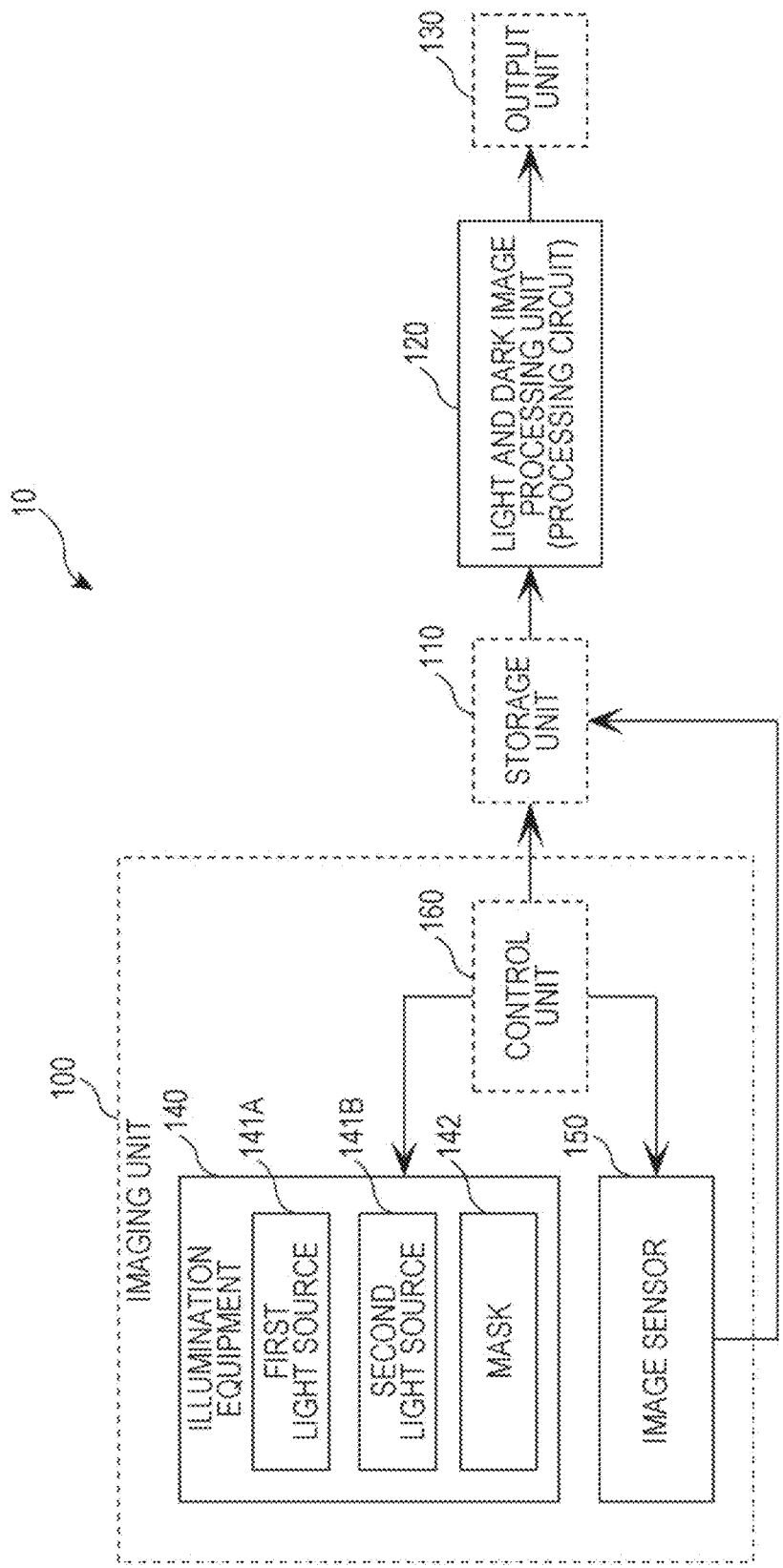

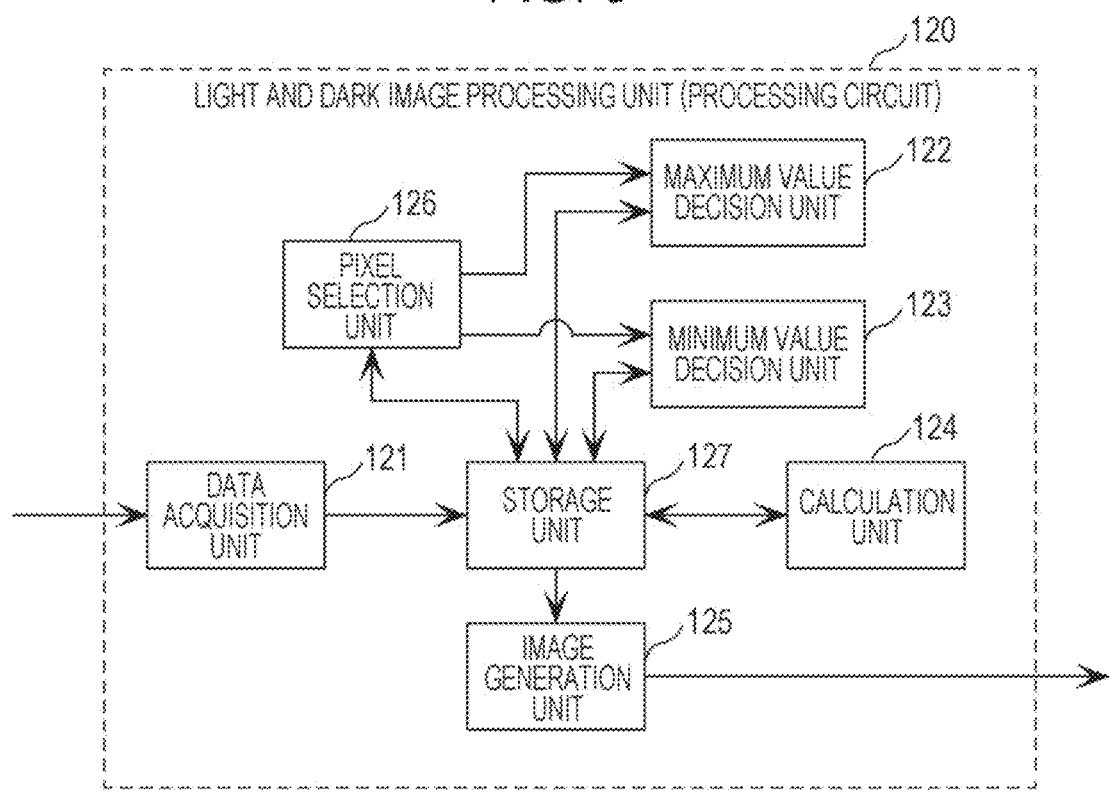

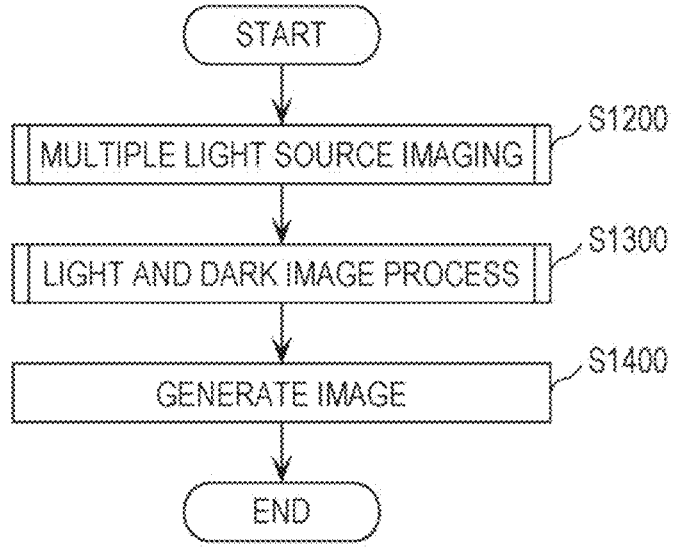
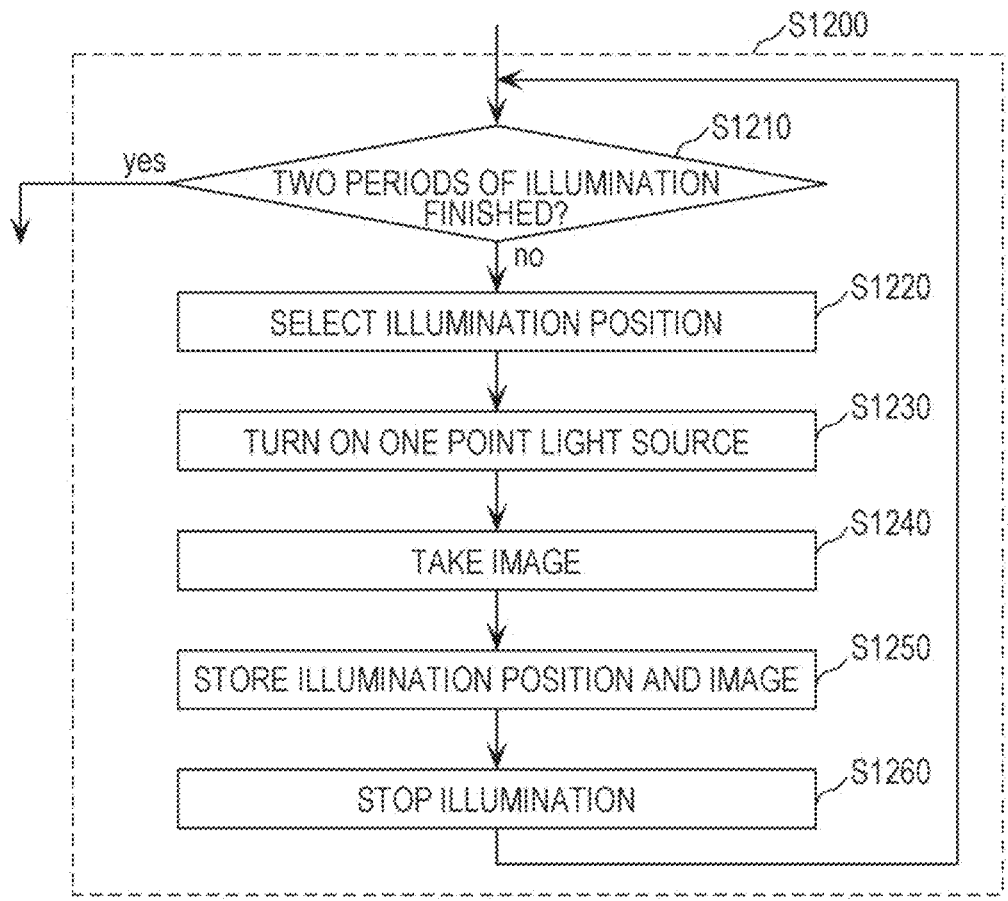

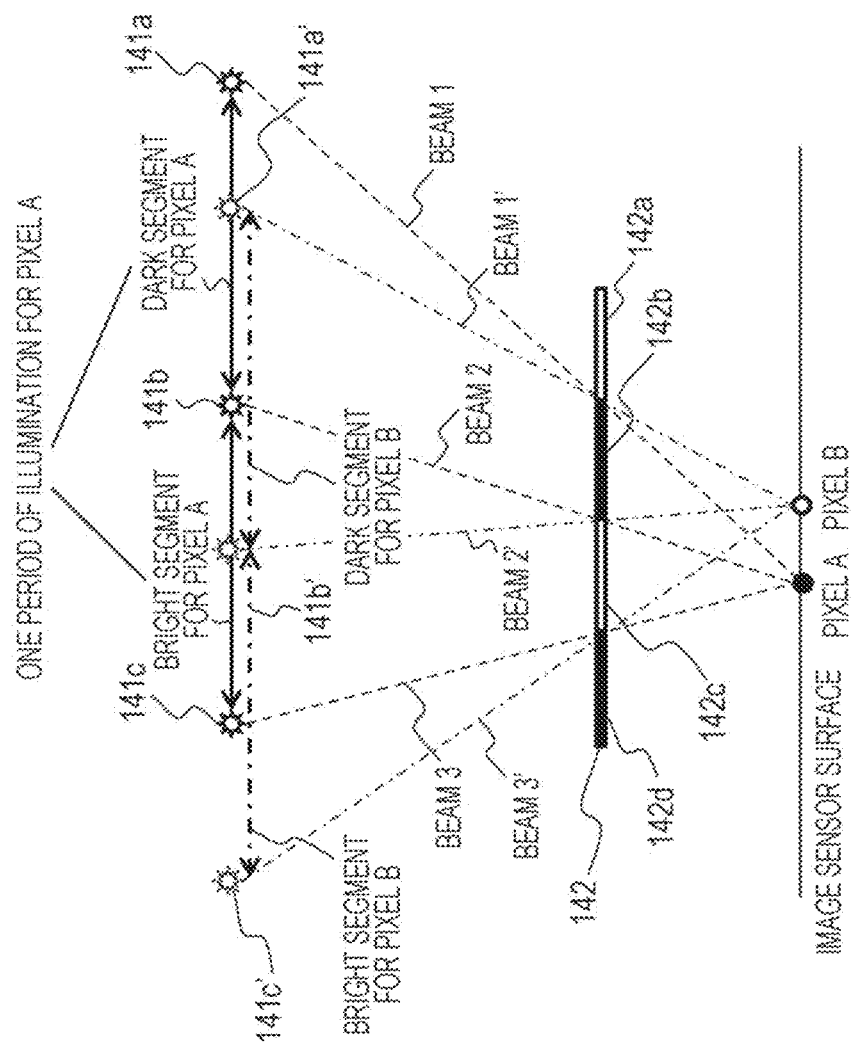

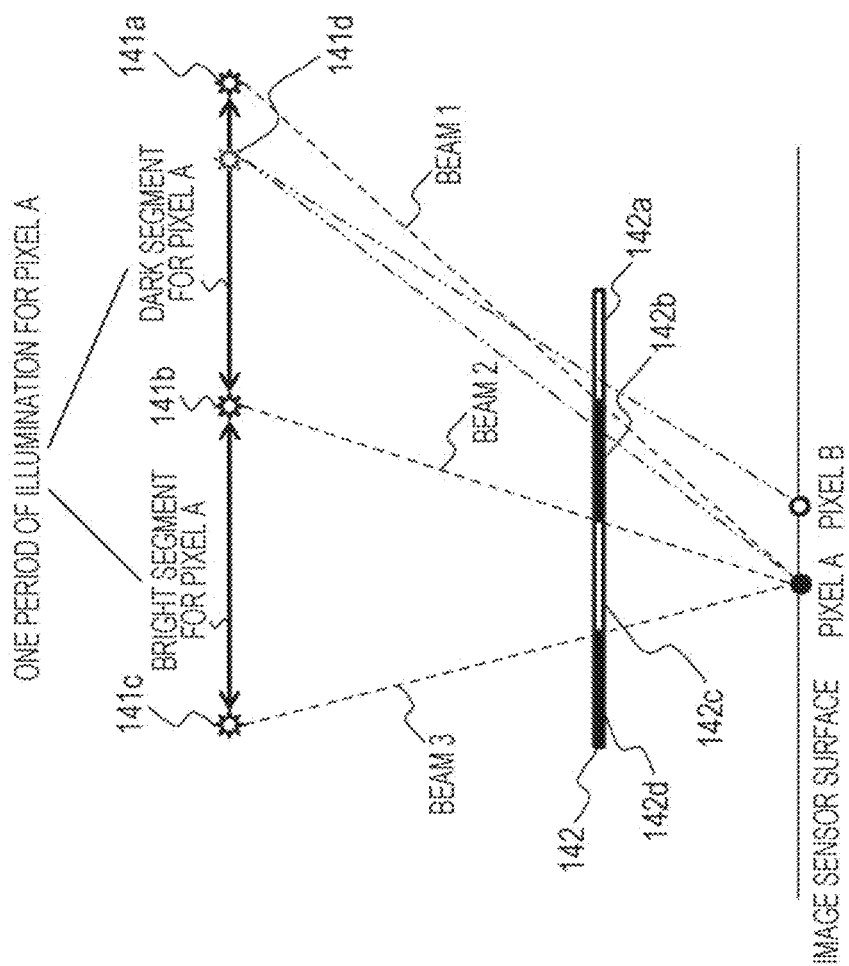

| ID | PRESENCE OF MASK | ILLUMINATION POSITION |
|---|---|---|
| ⋮ | ⋮ | ⋮ |
| 016 | PRESENT | (2301, 1741) |
| 017 | PRESENT | (2321, 1741) |
| 018 | PRESENT | (2341, 1741) |
| ⋮ | ⋮ | ⋮ |

IMAGE GENERATING APPARATUS AND IMAGE GENERATING METHOD

BACKGROUND

1. Technical Field

The present disclosure relates to an image generating apparatus that generates images, such as a lensless microscope, for example, and to an image generating method.

2. Description of the Related Art

Demand to observe cultured cells continuously without staining exists in the cultivation of cells for medical use and in testing for drug efficacy, as well as in many fields that use cultured cells for medical or industrial applications. However, since many cells are nearly colorless and transparent, observation is difficult because of the low contrast when imaging with an optical microscope using transmitted light. One factor for the low contrast is the scattering or refraction of light due to the medium around the subject to be imaged and the subject itself.

Japanese Patent No. 5403458 illustrates a method of removing a noise component of reflected light from the luminance of two light and dark states, namely a state of radiation from an optical beam, and a state in which the radiation is stopped.

Meanwhile, continuous observation of cultured cells is conducted in the limited space of an incubator for maintaining a humid environment to cultivate cells. For such observation in a limited space, Japanese Patent No. 5789766 and U.S. Patent Application Publication No. 2014/0133702 disclose a lensless microscope enabling observation of tiny cells without using a lens. In the above literature, a high-resolution image is generated by using multiple images taken with illumination radiated from multiple different positions. Also, descattering technology using high-frequency illumination is disclosed in IEEE International Conference on Computational Photography (ICCP2013) April 2013, Cambridge, "Descattering of transmissive observation using parallel high-frequency illumination".

SUMMARY

However, a problem with the method of Japanese Patent No. 5403458 is that the apparatus becomes bulkier. In other words, with this method, collimated light and a digital micro-mirror device are used in an apparatus that records the luminance of reflected light from illumination, and measures the asperities on the object surface. Additionally, by computing the relative luminance from the difference between the luminance recorded by radiating a first light and dark pattern and the luminance recorded by radiating a second light and dark pattern, the luminance at individual positions of the objective lens is compared more easily. However, if one attempts to extend the light and dark pattern over the entire image sensor, a lens becomes necessary, and the apparatus becomes bulkier. On the other hand, in the case of taking images with multiple light sources as in Japanese Patent No. 5789766 and U.S. Patent Application Publication No. 2014/0133702, it may be necessary to change the position of the illumination. When taking images while changing the positions of the light source and the digital micro-mirror device, since the apparatus is bulky, it is difficult to combine a lensless microscope with light and dark inversion by the digital micro-mirror device.

One non-limiting and exemplary embodiment provides an image generating apparatus and an image generating method enabling miniaturization.

In one general aspect, the techniques disclosed here feature an image generating apparatus that generates an image of a translucent material, including: a first light source that illuminates the material; a second light source that illuminates the material from a position separated from the first light source by a certain distance; an image sensor on which the material is disposed; a mask including a light-transmitting part that transmits light from the first light source and the second light source, and a light-blocking part that blocks the light, the mask being positioned between the image sensor, and the first light source and the second light source; and a processing circuit. The image sensor acquires a first image of the material when illuminated by the first light source, and acquires a second image of the material when illuminated by the second light source. The processing circuit generates a third image of the material by deriving a difference between a luminance value of a pixel included in the first image and a luminance value of a pixel included in the second image at a same position as the pixel included in the first image.

It should be noted that general or specific embodiments may be implemented as a system, a method, an integrated circuit, a computer program, a non-transitory computer-readable recording medium, or any selective combination thereof. Computer-readable recording media include non-volatile recording media such as Compact Disc-Read-Only Memory (CD-ROM), for example.

According to the present disclosure, miniaturization of an image generating apparatus is possible. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Additional benefits and advantages of the disclosed embodiments will become apparent from the specification and drawings. The benefits and/or advantages may be individually obtained by the various embodiments and features of the specification and drawings; which need not all be provided in order to obtain one or more of such benefits and/or advantages.

BRIEF DESCRIPTION OF THE DRAWINGS

FIG. 2 is a block diagram illustrating an example of a functional configuration of an image generating apparatus according to Embodiment 1;

FIG. 8 is a diagram illustrating an example of content stored by a storage unit according to Embodiment 1;

FIG. 9 is a block diagram illustrating an example of a functional configuration of a light and dark image processing unit according to Embodiment 1;

FIG. 10 is a flowchart illustrating an example of the operation of an image generating apparatus according to Embodiment 1;

FIG. 11 is a flowchart illustrating an example of the operation of an imaging unit according to Embodiment 1;

FIG. 12A is a schematic diagram explaining a specific example of a period of bright segments and dark segments according to Embodiment 1;

FIG. 12B is a schematic diagram explaining a specific example of a period of bright segments and dark segments according to Embodiment 1;

DETAILED DESCRIPTION

Figure 1A:
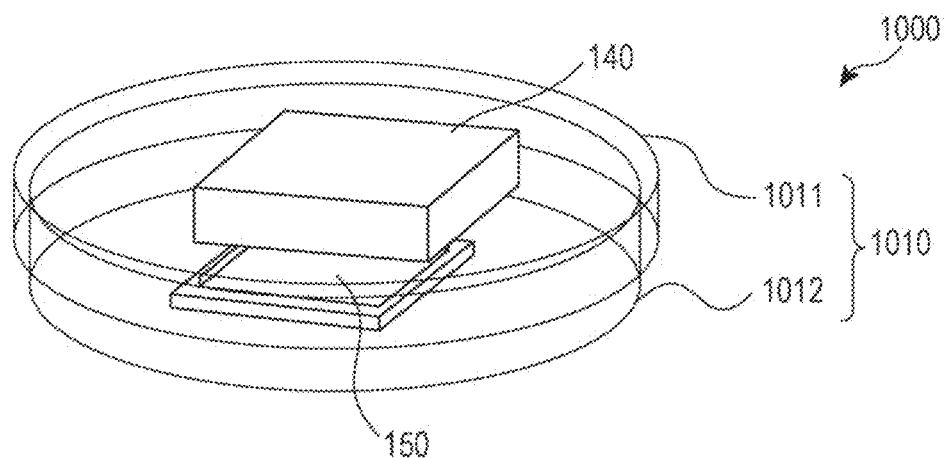
FIG. 1A is a perspective view of a cell culture container according to Embodiment 1.

An image generating apparatus according to one aspect of the present disclosure is an image generating apparatus that generates an image of a translucent material, including: a first light source that illuminates the material; a second light source that illuminates the material from a position separated from the first light source by a certain distance; an image sensor on which the material is disposed; a mask including a light-transmitting part that transmits light from the first light source and the second light source, and a light-blocking part that blocks the light, the mask being positioned between the image sensor, and the first light source and the second light source; and a processing circuit. The image sensor acquires a first image of the material when illuminated by the first light source, and acquires a second image of the material when illuminated by the second light source. The processing circuit generates a third image of the material by deriving a difference between a luminance value of a pixel included in the first image and a luminance value of a pixel included in the second image at a same position as the pixel included in the first image.

As a result, a first image and a second image with different light and dark patterns may be acquired by illumination from a first light source and a second light source at separate positions from each other. Consequently, by deriving the difference between these images, noise due to scattered light or refracted light may be reduced, and a third image that is clear due to direct light may be generated. Also, since it is sufficient to switch the light source illuminating the material in order to acquire two images with different light and dark patterns, it is not necessary to change the positions of structures such as a light source of a digital micro-mirror device, for example, and the apparatus as a whole may be miniaturized.

In other words, an image generating apparatus according to an aspect of the present disclosure is a lensless microscope that passes diffuse light from a point light source through a mask having slits or a checker pattern, for example. Subsequently, an image of the object is generated on the basis of an image taken under illumination having a first light and dark pattern, and an image taken under illumination having a second light and dark pattern that is the inverse of the first light and dark pattern.

As a result, it is possible to generate a taken image with reduced noise by conducting imaging in two states of light and dark by multiple light source imaging, without using a digital micro-mirror device. In other words, in a lensless imaging system that uses transmitted light to taken an image of material placed on top of an image sensor, a high-quality image with reduced noise may be generated by using images taken in two light and dark states.

Another configuration is possible in which a partial region of a photosensitive surface of the image sensor acquires the first image in a state in which the light-transmitting part of the mask is disposed between the first light source that illuminates the material and the region, and acquires the second image in a state in which the light-blocking part of the mask is disposed between the second light source that illuminates the material, and the region. For example, a partial region of a photosensitive surface of the image sensor acquires a plurality of images with different luminance values, including the first image and the second image, when each of a plurality of light sources, including the first light source and the second light source, successively illuminates the material. The processing circuit selects, as the first image from among the plurality of images, an image including a maximum luminance value, being an image acquired by the image sensor when the first light source is illuminating the material, and selects, as the second image from among the plurality of images, an image including a minimum luminance value, being an image acquired by the image sensor when the second light source is illuminating the material.

As a result, the difference between a first image taken in a bright segment and a second image taken in a dark segment may be derived, and a clearer third image with further reduced noise may be generated.

Another configuration is possible in which the first light source is positioned one half-period away from the second light source. A partial region of a photosensitive surface of the image sensor acquires an image including a maximum luminance value and an image including a minimum luminance value in a case in which each of a plurality of light sources, including the first light source and the second light source, successively illuminates the material. The processing circuit selects an image group with less variance in luminance value from between a first image group including a maximum luminance image containing a maximum luminance value, and a second image group including a minimum luminance image containing a minimum luminance value. (i) If the selected image group is the first image group, the processing circuit selects, as the first image from among the first image group, an image including a maximum luminance value, being an image acquired by the image sensor when the first light source is illuminating the material, and selects, as the second image, an image acquired by the image sensor when the second light source is illuminating the material. (ii) If the selected image group is the second image group, the processing circuit selects, as the second image from among the second image group, an image including a minimum luminance value, being an image acquired by the image sensor when the second light source is illuminating the material, and selects, as the first image, an image acquired by the image sensor when the first light source is illuminating the material.

As a result, even if the maximum value or the minimum value of the luminance is unstable, the first image taken in a bright segment and the second image taken in a dark segment may be selected appropriately on the basis of the period. Consequently, a clearer image may be generated.

Also, an image generating apparatus according to one aspect of the present disclosure is an image generating apparatus that generates an image of a translucent material, including: a light source group made up of a plurality of light sources, including a first light source that illuminates a material, and a second light source that illuminates the material from a position separated from the first light source by a certain distance; an image sensor on which the material is disposed; a mask including a light-transmitting part that transmits light from the first light source and the second light source, and a light-blocking part that blocks the light; and a processing circuit. The image sensor (a) acquires a first image of the material when illuminated by the first light source, (b) acquires a second image of the material when illuminated by the second light source, (c) acquires a fourth image of the material when illuminated by a light source included in the light source group, the first image and the second image being acquired through the mask positioned between the image sensor, and the first light source and the second light source, and the fourth image being acquired without going through the mask. The processing circuit selects an image having a large luminance value or an image having a small luminance value from among the first image and the second image, and derives a difference based on the selected image and the fourth image to thereby generate a fifth image of the material. For example, each of the first image, the second image, the fourth image, and the fifth image includes a luminance value corresponding to a same pixel included in the image sensor.

As a result, it is possible to acquire a first image or a second image having a light and dark pattern due to illumination from a first light source or a second light source, as well as a fourth image which is uniformly bright without a light and dark pattern. Consequently, by deriving the difference based on these images, noise due to scattered light or refracted light may be reduced, and a fifth image that is clear due to direct light may be generated. Additionally; in order to acquire the image having a light and dark pattern and the image which is uniformly bright without a light and dark pattern, it is not necessary to change the positions of complex structures such as a digital micro-mirror device, for example, and thus the apparatus as a whole may be miniaturized.

Also, there may be a 1:1 area ratio of the light-transmitting part and the light-blocking part in the mask. Also, the processing circuit may generate the luminance value of the fifth image by deriving a difference between double the luminance value of the selected image, and the luminance value of the fourth image. For example; in the case of selecting an image having a large luminance value from among the first image and the second image, the processing circuit generates the luminance value of the fifth image by subtracting the luminance value of the fourth image from double the luminance value of the selected image. Alternatively, in the case of selecting an image having a small luminance value from among the first image and the second image; the processing circuit generates the luminance value of the fifth image by subtracting double the luminance value of the selected image from the luminance value of the fourth image.

Consequently, the surface area ratio of the light-transmitting part and the light-blocking part of the mask may be utilized to reduce noise due to scattered light or refracted light, and a fifth image that is clear due to direct light may be generated.

Note that these general or specific aspects may also be realized by an apparatus, a method, an integrated circuit, a computer program; or a non-transitory computer-readable recording medium such as a CD-ROM disc; or any selective combination thereof.

Hereinafter, an image generating apparatus and an image generating method according to a mode of the present disclosure will be described specifically with reference to the drawings.

Note that the exemplary embodiments described hereinafter all illustrate general or specific examples. Features such as numerical values, shapes; structural elements, layout positions and connection states of structural elements, steps, and the ordering of steps indicated in the following exemplary embodiments are merely examples, and are not intended to limit the scope of the claims. In addition, among the structural elements in the following exemplary embodiments, structural elements that are not described in the independent claim indicating the broadest concept are described as arbitrary or optional structural elements.

Embodiment 1

An image generating apparatus according to Embodiment 1 is provided with: illumination equipment made up of multiple point light sources and a mask in which are created a light-transmitting part that transmits light and a light-blocking part that blocks light, such as slits or a checker pattern; an image sensor; and a processing circuit. In the illumination equipment, the multiple point light sources at different positions successively illuminate an object positioned on top of the image sensor. At this time, the image sensor images the object while light and dark patterns of the light reaching the image sensor and the object are switched. As a result, multiple images with different light and dark patterns are acquired. For each pixel of the image sensor, the processing circuit computes the luminance difference between the image in which the relevant pixel has the highest luminance and the image in which the relevant pixel has the lowest luminance from among the multiple images, and thereby generates an image in which the luminance values of the pixels are taken to be the luminance differences for each pixel.

At this point, the image generating apparatus according to Embodiment 1 images cells in a mixture contained in a cell culture container as the object, for example. First, the cell culture container and the like will be described in detail. Note that the object of imaging in the present embodiment is cells as an example, but may also be any translucent material, and may be a material other than cells.

[1. Structure of Cell Culture Container]

Figure 1B:
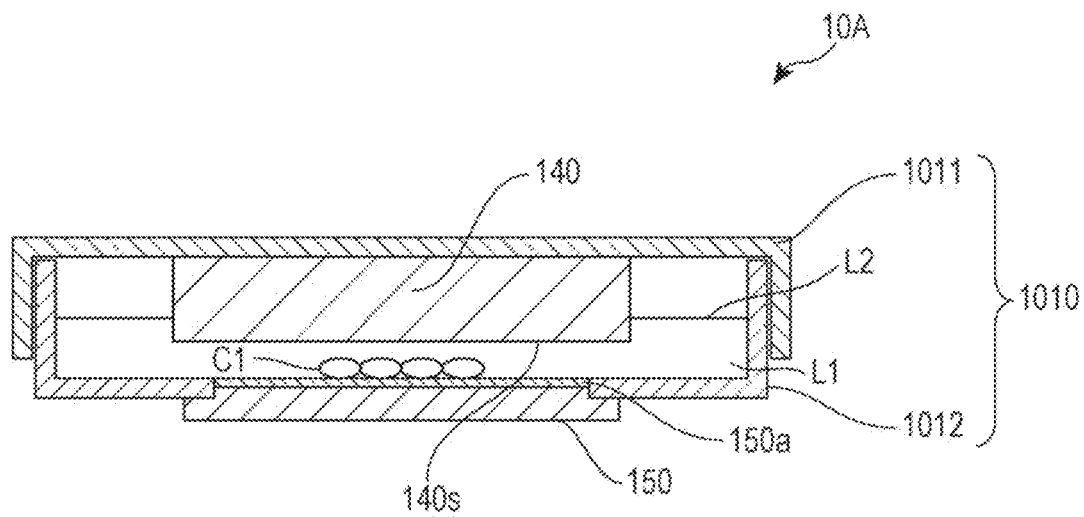
FIG. 1B is a cross-section view of a cell culture container according to Embodiment 1.

FIG. 1A is a perspective view of a dish cell culture container 1000 according to Embodiment 1. FIG. 1B is a cross-section view of a dish cell culture container 1000 according to Embodiment 1. As illustrated in FIGS. 1A and 1B, the dish cell culture container 1000 is provided with a container unit 1010, illumination equipment 140, and an image sensor 150. Note that the dish cell culture container 1000 is a dish-shaped container called a laboratory dish or a Petri dish, but may also be a horizontal flask-shaped container.

The container unit 1010 is a container that holds a mixture including cells and a culture liquid. In other words, the container unit 1010 is a container inside of which the mixture is positioned. The container unit 1010 is a transparent container made of glass or plastic, and is provided with a lid part 1011 and a main part 1012.

The main part 1012 is a bottomed cylindrical member that forms a bottom part and a side part.

The lid part 1011 is a bottomed cylindrical member that closes off the opening in the main part 1012 by being fitted onto the main part 1012. The lid part 1011 forms the top part of the container unit 1010.

The illumination equipment 140 is provided on the inner face of the lid part 1011, and radiates light onto the mixture inside the container unit 1010. As a result, the radiated light passes through the mixture, and is output as transmitted light. In other words, transmitted light refers to light that has been transmitted through the mixture from the illumination equipment 140, and is light that has been refracted and attenuated by the semitransparent material of the mixture. Specifically, the illumination equipment 140 is affixed to the inner face of the lid part 1011, and radiates light from above onto the mixture inside the container unit 1010. Note that the illumination equipment 140 may also be affixed to the outer face of the lid part 1011.

Also, in the present embodiment, the illumination equipment 140 projects from the top part of the container unit 1010 into the interior of the container unit 1010, and a light-emitting face 140s of the illumination equipment 140 is positioned inside the mixture that includes cells C1 and culture liquid L1 inside the container unit 1010. In other words, the light-emitting face 140s of the illumination equipment 140 is positioned below the liquid face L2 of the mixture, and above the bottom of the container unit 1010.

The image sensor 150 is provided on the bottom of the container unit 1010, and receives transmitted light output from the mixture. The image sensor 150 is a solid-state image sensor such as a charge-coupled device (CCD) image sensor or a complementary metal-oxide semiconductor (CMOS) image sensor, for example. In the image sensor 150, multiple pixels are arranged in a matrix layout. Light radiated from the illumination equipment 140 is incident on each pixel of the image sensor 150. By being irradiated with light, the image sensor 150 takes an optical image of the cells formed on the photosensitive surface of the image sensor 150.

Specifically, as illustrated in FIG. 1B, the image sensor 150 is fitted into an opening formed in the bottom of the container unit 1010. The photosensitive surface of the image sensor 150, which is covered by a transparent protective film 150a, is exposed to the space inside the container unit 1010. The cells C1 sink to the bottom of the culture liquid L1 which fills the container unit 1010, and are cultivated in a state of direct contact on top of the transparent protective film 150a. As illustrated in FIG. 1B, a condensing lens does not exist between the cells C1 and the image sensor 150.

In this way, the cells C1 which are the object of imaging are cultivated while being placed on top of the photosensitive surface of the image sensor 150 through the transparent protective film 150a.

[2. Configuration of Image Generating Apparatus]

FIG. 2 is a function block diagram of an image generating apparatus 10 according to Embodiment 1. The image generating apparatus 10 illustrated in FIG. 1 is an apparatus that generates images of translucent material such as cells, and is provided with an imaging unit 100, a storage unit 110, a light and dark image processing unit 120, and an output unit 130.

[2-1. Imaging Unit]

First, the configuration of the imaging unit 100 will be described. The imaging unit 100 is provided with illumination equipment 140, an image sensor 150, and a control unit 160. The imaging unit 100 acquires a photographic image of a material treated as the object. Herein, the imaging unit 100 does not include a focus lens. Note that although the image generating apparatus 10 according to Embodiment 1 is provided with the control unit 160, the storage unit 110, and the output unit 130, these structural elements are not required, and the image generating apparatus 10 may also not be provided with these structural elements.

The illumination equipment 140 in Embodiment 1 is provided with a first light source 141A, a second light source 141B, and a mask 142. The first light source 141A is a point light source that illuminates the material. The second light source 141B is a point light source that illuminates the material from a position separated from the first light source 141A by a certain distance. The mask 142 includes a light-transmitting part that transmits light from the first light source 141A and the second light source 141B, as well as a light-blocking part that blocks such light. The mask 142 is positioned between the image sensor 150, and the first light source 141A and the second light source 141B. Note that the certain distance discussed above is the distance of ⅓ of the period discussed later.

Hereinafter, the illumination equipment 140 will be described in detail.

Figure 3:
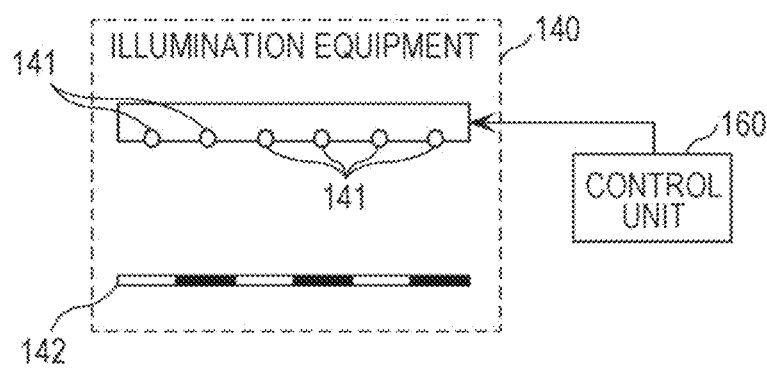
FIG. 3 is a diagram that schematically illustrates the structure of illumination equipment according to Embodiment 1.

FIG. 3 is a diagram that schematically illustrates the structure of the illumination equipment 140 in Embodiment 1. Specifically, the illumination equipment 140 is provided with multiple point light sources 141, including the first light source 141A and the second light source 141B discussed above, and the mask 142. The mask 142 includes slits or a checker pattern. In other words, the mask 142 includes a light-transmitting part that transmits light, and a light-blocking part that blocks light.

Figure 4:
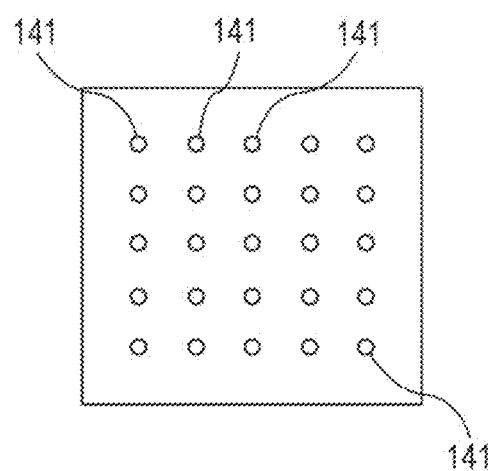
FIG. 4 is a diagram that schematically illustrates an example of multiple point light sources according to Embodiment 1.

FIG. 4 is a schematic diagram that illustrates an example of the arrangement of the multiple point light sources 141. In the example of FIG. 4, the multiple point light sources 141 are arrayed at equal intervals. Each of the multiple point light sources 141 includes a light-emitting face of diameter 10 μm that emits light, and is attached to a light-shielding plate so that the light-emitting face is exposed from a pinhole of diameter 10 μm provided in the light-shielding plate. Light is taken to spread out uniformly in all directions from the point light sources 141.

Figure 5A:
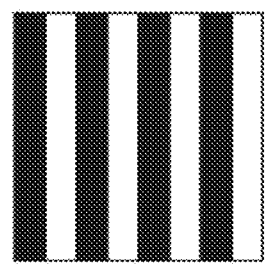
FIGS. 5A and 5B are diagrams that schematically illustrate the structure of a mask according to Embodiment 1.
Figure 5B:
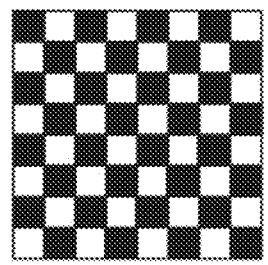

FIGS. 5A and 5B illustrate an example of the mask 142. Specifically, FIG. 5A illustrates an example of a mask 142 having slits, while FIG. 5B illustrates an example of a mask 142 having a checker pattern. Note that the black portions in FIGS. 5A and 5B indicate the light-blocking part discussed earlier, whereas the white portions indicate the light-transmitting part discussed earlier. In the example of FIG. 5A, the slits of the light-blocking part indicated by the black lines are the same width as the slits of the light-transmitting part indicated by the white lines. Also, in the checker pattern of FIG. 5B, the black squares indicating the light-blocking part are the same size as the white squares indicating the light-transmitting part. Also, the multiple light-transmitting parts and the multiple light-blocking parts are set at equal intervals on the mask 142. In other words, the multiple light-transmitting parts and the multiple light-blocking parts of the mask 142 are arranged periodically and regularly. Also, the widths of the lines in the slits or the lengths of one side of the squares in the checker pattern are set so that part of the object becomes bright due to the light beam passing through the mask 142 from some of the point light sources 141, while the remaining part becomes dark. In other words, the widths or the lengths of one side of the squares discussed above are set so that the light and dark pattern of the light on the object and the image sensor 150 due to the light beam divides the object into at least two regions (a bright region and a dark region). For example, if the object is 100 μm, the widths of the lines in the slits or the lengths of one side of the squares are 30 μm for example. The mask 142 is realized by vapor deposition of metal on glass, for example.

Figure 6:
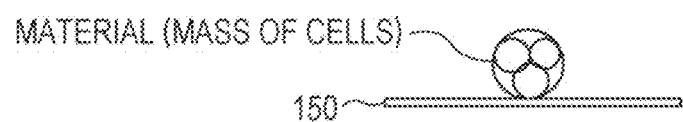
FIG. 6 is a schematic diagram explaining the positional relationship between an image sensor and an object according to Embodiment 1.

FIG. 6 is an example of an object placed on top of the image sensor 150. Note that in FIG. 6, elements such as the transparent protective film 150a are omitted. The object to be imaged is placed directly on top of the image sensor 150. The object is multiple semitransparent materials, for example. The multiple materials are stacked on top of each other in three dimensions. A specific example of the material is cells or cultured cells. In the example of FIG. 6, the object is an early embryo.

The image sensor 150 includes multiple pixels, on which is placed the material discussed above. The pixels of the image sensor 150 are disposed on a photosensitive surface, and acquire the intensity of light (in other words, luminance values) of light radiated from the multiple point light sources 141. The image sensor 150 acquires a photographic image on the basis of the intensity of light acquired by each of the pixels. In other words, the image sensor 150 acquires a first image of the material when illuminated by the first light source 141A from among the multiple point light sources 141, and acquires a second image of the material when illuminated by the second light source 141B from among the multiple point light sources 141.

Examples of the image sensor 150 include a complementary metal-oxide semiconductor (CMOS) image sensor and a charge-coupled device (CCD) image sensor.

The multiple point light sources 141 of the illumination equipment 140 radiate light one after another. The multiple point light sources 141 are arranged at mutually different positions, and radiate light onto the object through the mask 142 from mutually different directions.

The control unit 160 controls the radiation of light by the multiple point light sources 141, and the imaging by the image sensor 150. Specifically, the control unit 160 controls the order in which the multiple point light sources 141 radiate light, and the time intervals over which the multiple point light sources 141 radiate light. The control unit 160 is realized by a computer system (not illustrated) made up of components such as a central processing unit (CPU), random access memory (RAM), and read-only memory (ROM). Some or all of the functions of the structural elements of the control unit 160 may also be achieved by having the CPU execute a program recorded in the ROM, using the RAM as a working memory. Additionally, some or all of the functions of the structural elements of the control unit 160 may also be achieved by a specialized hardware circuit.

Figure 7:
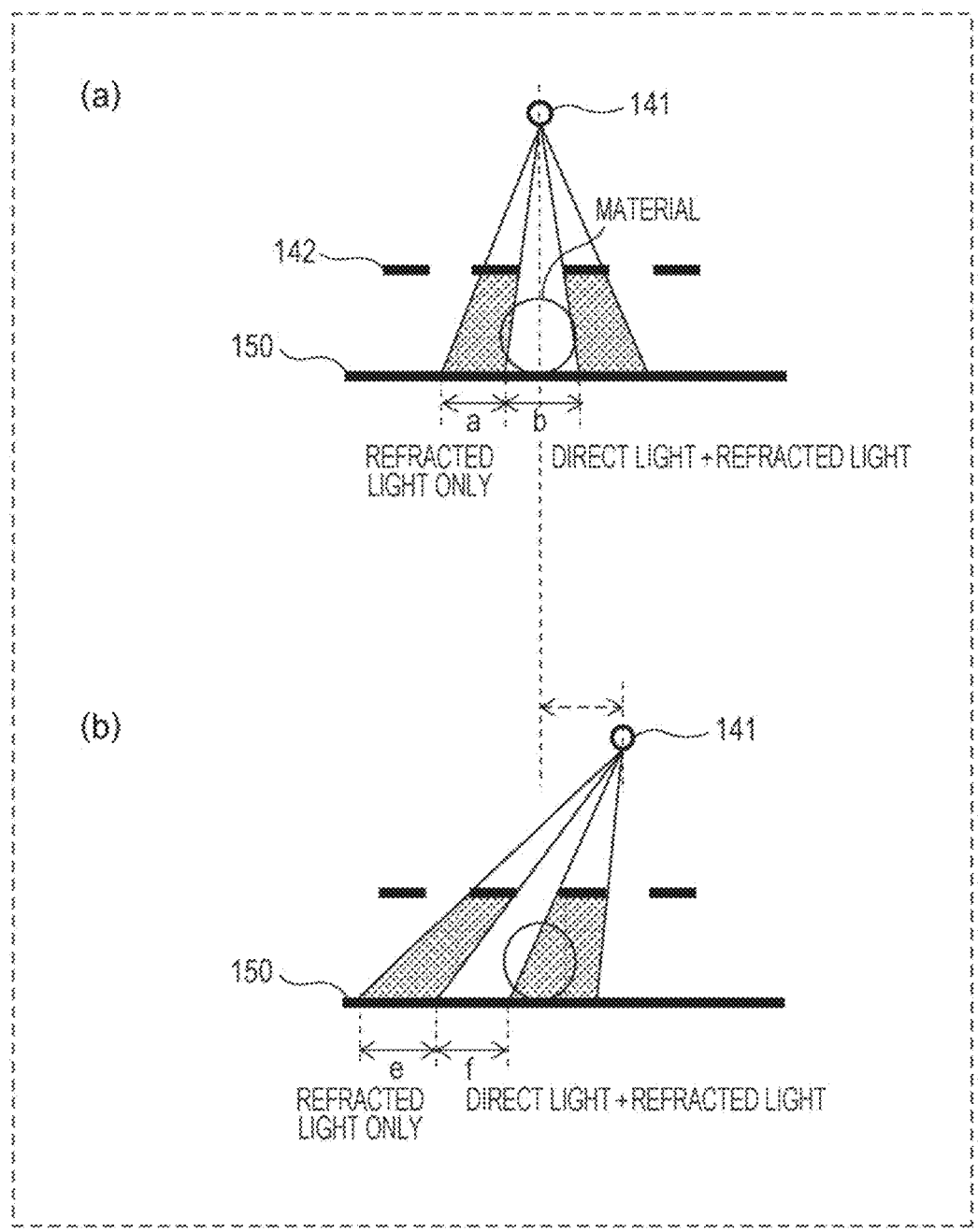
FIG. 7 is a diagram that illustrates examples of the relationship between the position of a point light source and the light received by an image sensor, according to Embodiment 1.

FIG. 7 illustrates an example of the relationship between the position of a point light source 141 and the light received by the image sensor 150. For example, as illustrated in the upper part of FIG. 7, the light transmitted by the light-transmitting part of the mask 142 from the point light source 141 shines on a part of the material and a region b of the photosensitive surface of the image sensor 150. At this point, the light shining on a part of the material and the region b of the image sensor 150 includes not only direct light from the point light source 141, but also refracted light. The refracted light is light which has passed through the light-transmitting part of the mask 142 from the point light source 141, and which has been refracted, reflected, or scattered by the culture fluid or the translucent material. On the other hand, a portion of the direct light from the point light source 141 is blocked by the light-blocking part of the mask 142, and does not reach a region a of the photosensitive surface of the image sensor 150. However, the refracted light reaches the region a. Consequently, the region a of the photosensitive surface of the image sensor 150 does not sense direct light but instead senses refracted light, and thus is dark, whereas the region b senses both direct light and refracted light, and thus is bright.

However, if the point light source 141 illustrated in the upper part of FIG. 7 is turned off and another point light source 141 illustrated in the lower part of FIG. 7 is turned on, a region e which is different from the region a on the photosensitive surface of the image sensor 150 becomes dark due to sensing only refracted light. Also, a region f which is different from the region b on the photosensitive surface of the image sensor 150 becomes bright due to sensing both refracted light and direct light.

In other words, if the positions of the point light sources 141 that illuminate the material are different, partial regions of the photosensitive surface of the image sensor 150 sometimes become brighter due to sensing both refracted light and direct light, and other times become darker due to sensing refracted light without sensing direct light. In Embodiment 1, the multiple point light sources 141 arranged as illustrated in FIG. 4, namely, the multiple point light sources 141 along the direction in which the light-transmitting part and the light-blocking part of the mask 142 are alternately and regularly arranged, provide illumination one after another. Consequently, partial regions (specifically, pixels) of the photosensitive surface of the image sensor 150 become brighter and darker periodically in accordance with the position of the illumination. Hereinafter, the segment of an illumination position that becomes brighter is designated a bright segment, while a segment of an illumination position that becomes darker is designated a dark segment. In Embodiment 1, these changes in brightness (that is, luminance values) due to the illumination positions for individual regions (for example, pixels) of the photosensitive surface of the image sensor 150 are utilized to generate an image of the material from which the noise of refracted light has been removed.

[2-2. Storage Unit]

The storage unit 110 stores an image acquired by the image sensor 150 in association with the illumination or the positions of the point light sources 141 which were turned on during imaging as set by the control unit 160 (hereinafter designated the illumination positions).

FIG. 8 is an example of information stored by the storage unit 110. The storage unit 110 stores an ID identifying an image acquired by the image sensor 150 in association with an illumination position of a point light source 141 which was turned on during imaging. An illumination position is indicated as a point on a coordinate system whose origin is taken to be the upper-left corner of a plane made up of the multiple active pixels of the image sensor 150, in which the horizontal direction of the image sensor 150 is treated as the x-axis, and the vertical direction is treated as the y-axis, for example. In the example of the illumination equipment 140 in Embodiment 1, the multiple point light sources 141 are arranged on a plane parallel to the surface of the image sensor 150 (namely, the photosensitive surface), so as to face the surface of the image sensor 150. In other words, the distance from the surface of the image sensor 150 to each and every point light source 141 is the same. For this reason, illumination positions are expressed in two dimensions. However, illumination positions may also be expressed in three dimensions. Also, if all of the point light sources 141 are arranged in a linear manner, illumination positions may be expressed in one dimension.

[2-3. Light and Dark Image Processing Unit]

The light and dark image processing unit 120 is realized by at least one control circuit or processing circuit. In Embodiment 1, the light and dark image processing unit 120 derives the difference between the first image and the second image discussed earlier, to thereby generate a third image of the material. Herein, in Embodiment 1, each of the first image, the second image, and the third image has luminance values corresponding to the same pixels included in the image sensor 150.

FIG. 9 is a function block diagram illustrating a detailed configuration of the light and dark image processing unit 120. As illustrated in FIG. 9, the light and dark image processing unit 120 is made up of a data acquisition unit 121, a maximum value decision unit 122, a minimum value decision unit 123, a calculation unit 124, an image generation unit 125, a pixel selection unit 126, and a storage unit 127.

The data acquisition unit 121 acquires, from the storage unit 110, an image to use in image processing, or in other words the luminance values of the individual pixels included in the image, and the illumination position corresponding to the image.

The pixel selection unit 126 selects a pixel on which to perform a luminance calculation from among the multiple pixels of the image sensor 150, or in other words the multiple pixels in the image to be generated. Note that the pixel selected by the pixel selection unit 126 hereinafter is also designated the selected pixel.

The maximum value decision unit 122 compares the luminance value of the pixel selected by the pixel selection unit 126 to the luminance values of the pixels at the same position in each of multiple images stored in the storage unit 110, and from among these multiple images, specifies the image that includes the pixel having the maximum luminance value. The maximum value decision unit 122 decides the maximum luminance value as the maximum value of the luminance for the selected pixel.

The minimum value decision unit 123 compares the luminance value of the pixel selected by the pixel selection unit 126 to the luminance values of the pixels at the same position in each of multiple images stored in the storage unit 110, and from among these multiple images, specifies the image that includes the pixel having the minimum luminance value. The minimum value decision unit 123 decides the minimum luminance value as the minimum value of the luminance for the selected pixel.

The storage unit 127 stores the image and the illumination position acquired by the data acquisition unit 121 from the storage unit 110, the maximum value decided by the maximum value decision unit 122, and the minimum value decided by the minimum value decision unit 123.

For each selected pixel in the image to be generated, the calculation unit 124 subtracts the minimum value decided by the minimum value decision unit 123 and corresponding to the selected pixel from the maximum value decided by the maximum value decision unit 122 and corresponding to the selected pixel. As a result, a luminance value is calculated for each pixel in the image to be generated.

The image generation unit 125 generates an image made up of the luminance values for each of pixels calculated by the calculation unit 124.

In other words, in Embodiment 1, a partial region of the photosensitive surface of the image sensor 150 acquires multiple images with mutually different luminance values, including a first image and a second image, when multiple light sources, including a first light source and a second light source, successively illuminate a material. Specifically, a partial region of the photosensitive surface of the image sensor 150 is a pixel. In this case, a processing circuit, namely the light and dark image processing unit 120, selects as the first image from among multiple images an image having the maximum luminance value, which is an image acquired by the image sensor 150 when the first light source 141A is illuminating the material. Also, the light and dark image processing unit 120 selects as the second image from among multiple images an image having the minimum luminance value, which is an image acquired by the image sensor 150 when the second light source 141B is illuminating the material.

Note that the data acquisition unit 121, the maximum value decision unit 122, the minimum value decision unit 123, the calculation unit 124, and the image generation unit 125 included in the light and dark image processing unit 120 are realized by a computer system (not illustrated) made up of components such as a central processing unit (CPU), random access memory (RAM), and read-only memory (ROM). Some or all of the functions of the structural elements of the light and dark image processing unit 120 may also be achieved by having the CPU execute a program recorded in the ROM, using the RAM as a working memory. Additionally, some or all of the functions of the structural elements of the light and dark image processing unit 120 may also be achieved by a specialized hardware circuit.

[2-4. Output Unit]

The output unit 130 is an output apparatus that presents an image generated by the light and dark image processing unit 120, or a means of outputting an image as electronic data. The output apparatus that presents an image may be a display, for example. The means of outputting an image as electronic data may be a USB connector, for example.

[3. Operation of Image Generating Apparatus]

Next, the operation of the image generating apparatus 10 configured as above will be described.

FIG. 10 is a flowchart illustrating an example of the operation of the image generating apparatus 10 according to Embodiment 1.

The image generating apparatus 10 starts operation in response to the input of an operation start command which is not illustrated.

(Step S1200)

The imaging unit 100 conducts multiple light source imaging. In other words, the imaging unit 100 uses each of the multiple point light sources 141 of the illumination equipment 140 one after another to illuminate an object with light transmitted through the mask 142, and takes multiple images of the object. Specifically, every time each of the multiple point light sources 141 of the illumination equipment 140 illuminates the object, the imaging unit 100 acquires an image of the object by recording the intensity of the light that reaches the photosensitive surface of the image sensor 150. The acquired images are stored in the storage unit 110 together with position information about the point light sources 141 which were illuminating the object during imaging (in other words, the illumination positions). Herein, the positions of the multiple point light sources 141 are fixed with respect to the image sensor 150, and thus the position information about each of the multiple point light sources 141 is predetermined. Multiple light source imaging will be discussed in detail later.

(Step S1300)

The light and dark image processing unit 120 conducts a light and dark image process on the bright parts and the dark parts of the image taken in step S1200 by the mask 142 of the illumination equipment 140. In step S1200, by conducting imaging with illumination provided by each of the point light sources 141 at mutually different positions, the positions of the bright parts and the dark parts are different for each image. The light and dark image processing unit 120 compares the luminance of the same pixel position among the multiple images taken in step S1200. For each pixel, the light and dark image processing unit 120 decides the luminance value of each pixel by subtracting the minimum value from the maximum value of the luminance. The light and dark image process will be discussed in detail later.

(Step S1400)

The image generation unit 125 of the light and dark image processing unit 120 generates and outputs an image on the basis of the luminance values decided for each of the pixels in step S1300. After that the image generating apparatus 10 ends operation.

In this way, an image generating method according to Embodiment 1 is an image generating method that generates an image of a translucent material, and uses the first light source 141A, the second light source 141B, the image sensor 150, and the mask 142. Additionally, with this image generating method, in step S1200, (a) the image sensor 150 acquires a first image of the material when illumination is provided by the first light source 141A, and (b) the image sensor 150 acquires a second image of the material when illumination is provided by the second light source 141B. Furthermore, with this image generating method, in step S1300 and step S1400, (c) a third image of the material is generated by deriving the difference between the luminance value of the first image and the luminance value of the second image.

[3-1. Multiple Light Source Imaging]

At this point, the operation of the imaging unit 100 in step 31200 illustrated in FIG. 10 will be described in detail.

FIG. 11 is a flowchart illustrating an example of the operation of the imaging unit 100.

(Step S1210)

The control unit 160 references a list indicating multiple predetermined illumination positions, or in other words a list indicating the positions of the multiple point light sources 141 of the illumination equipment 140 (hereinafter designated the illumination position list), and determines whether or not imaging of the object illuminated from each illumination position has finished.

At this point, if imaging with illumination from all illumination positions included in the illumination position list has finished (step S1210, yes), the flow proceeds to step S1300. On the other hand, if imaging with illumination from any of the illumination positions included in the illumination position list has not finished (step S1210, no), the flow proceeds to step S1120. Note that imaging with illumination from all illumination positions included in the illumination position list being finished means that the imaging of two periods' worth of images has finished. Herein, in each pixel, one period is a segment combining a bright segment in which the pixel senses direct light and refracted light, and a dark segment in which the pixel senses refracted light but does not sense direct light. Two periods' worth of images means multiple images taken with multiple types of illumination arranged over the range of illumination positions, so that, for each pixel, when the multiple images taken with illumination from the multiple illumination positions are arrayed in the arrangement order of the illumination positions, the images include two each of a bright segment, which is a range of illumination positions in which the pixel senses direct light and refracted light, and a dark segment, which is a range of illumination positions in which the pixel senses refracted light but does not sense direct light. The periodicity of these two periods will be discussed later with reference to FIGS. 12A and 12B.

(Step S1220)

The control unit 160 selects an illumination position from which illumination has not been provided from among the multiple illumination positions included in the illumination position list, and outputs a control signal to the illumination equipment 140. The control signal includes the selected illumination position. Each illumination position in the illumination position list, or in other words, the position of each point light source 141, is indicated by a number assigned to each point light source 141, for example. Alternatively, each illumination position is indicated by coordinate values in an xyz space in which the xy plane is taken to be the surface of the image sensor 150, or by coordinate values on an xy plane set parallel to the surface of the image sensor 150, for example. The selection of an illumination position is conducted in ascending order of the illumination position list, for example.

(Step S1230)

The illumination equipment 140 starts illuminating the object, in accordance with the control signal output from the control unit 160 in step S1220. In other words, from among the multiple point light sources 141 included in the illumination equipment 140, the point light source 141 at the illumination position selected in step S1220 starts radiating light.

(Step S1240)

While the object is being illuminated by the point light source 141, the image sensor 150 acquires an image formed by the light that travels from the point light source 141 through the mask 142, and is additionally transmitted through the object.

(Step S1250)

The control unit 160 associates the image acquired in step S1240 with the illumination position of the point light source 141 that provided illumination during the acquisition of that image, and outputs to the storage unit 110. The storage unit 110 stores the image and the illumination position in association with each other.

(Step S1260)

After that, the control unit 160 outputs a control signal to the illumination equipment 140, and stops the illumination of the object. Note that the stopping of illumination may also not be conducted in accordance with a control signal from the control unit 160. For example, the illumination equipment 140 may measure the length of time since illumination by one of the point light sources 141 started, and actively stop illumination after the measured length of time exceeds a predetermined length of time. Alternatively, after the image sensor 150 finishes acquiring the image in step S1240, the image sensor 150 may output a control signal for stopping the illumination to the illumination equipment 140. After step S1260, the flow returns to step S1210.

By repeating the processes from step S1210 to step S1260, the object is successively irradiated with light from the point light sources 141 at all of the illumination positions included in the illumination position list. In addition, every time the object is irradiated with light through the mask 142, the image sensor 150 acquires an image.

[3-2. Point Light Source Arrangement]

Hereinafter, illumination positions, or in other words the positions of the multiple point light sources 141, bright segments, dark segments, and periods combining bright segments and dark segments will be described in detail.

FIG. 12A is a schematic diagram explaining a light and dark pattern created by the positions of the point light sources 141 and the position of the mask 142 for one arbitrary pixel on the image sensor 150. The black rectangles in the mask 142 represent the light-blocking part, while the white rectangles represent the light-transmitting part that transmits light. Herein, suppose that a point light source 141a, a point light source 141b, and a point light source 141c exist.

The light from the point light source 141a that reaches an arbitrary pixel A on the image sensor 150 is a beam 1, which travels over the boundary between the light-blocking part 142b and the light-transmitting part 142a of the mask 142. The light from the point light source 141b that reaches the pixel A is a beam 2, which travels over the boundary between the light-blocking part 142b and the light-transmitting part 142c of the mask 142. If a point light source 141 is positioned on the line that includes the point light source 141a and the point light source 141b, and is positioned to the left of the point light source 141a and also to the right of the point light source 141b as viewed in FIG. 12A (in other words, if a point light source 141 is positioned in the segment labeled "Dark segment of Pixel A" in FIG. 12A), the light beam radiating from that point light source 141 to the pixel A will be blocked by the light-blocking part 142b of the mask 142. In other words, in the segment on the line between the position of the point light source 141a and the position of the point light source 141b (that is, if a point light source 141 is positioned in the segment labeled "Dark segment of Pixel A" in FIG. 12A), direct light from the point light source will be blocked by the light-blocking part 142b of the mask 142, and the light beam will not reach the pixel A. Since refracted light arrives but direct light does not arrive, the luminance value is relatively low, yielding a segment in which a dark image is acquired as the image (hereinafter referred to as a dark segment). Note that a dark segment is a continuous segment on the line between the location where the point light source 141a is assumed to exist and the location where the point light source 141b is assumed to exist, and the amount of light detected by the pixel A when one point light source existing in a dark segment provides illumination is less than the amount of light detected by the pixel A when one point light source existing in a bright segment discussed below provides illumination. A continuous time during which one or multiple light sources existing in one dark segment are turned on may also be referred to as a dark segment.

Meanwhile, the light beam from the point light source 141c that reaches the pixel A is a beam 3, which travels over the boundary between the light-transmitting part 142c and the light-blocking part 142d of the mask 142. If a point light source 141 is positioned on the line that includes the point light source 141b and the point light source 141c, and is positioned to the left of the point light source 141b and also to the right of the point light source 141c as viewed in FIG. 12A (in other words, if a point light source 141 is positioned in the segment labeled "Bright segment of Pixel A" in FIG. 12A), the light beam radiating from that point light source 141 to the pixel A will arrive at the pixel A on the surface of the image sensor 150. In other words, in the segment on the line between the position of the point light source 141b and the position of the point light source 141c (that is, if a point light source 141 is positioned in the segment labeled "Bright segment of Pixel A" in FIG. 12A), direct light from the point light source as well as refracted light will reach the pixel A. Thus, the luminance value is relatively high, yielding a segment in which a bright image is acquired as the image (hereinafter referred to as a bright segment). Note that a bright segment is a continuous segment on the line between the location where the point light source 141b is assumed to exist and the location where the point light source 141c is assumed to exist, and the amount of light detected by the pixel A when one point light source existing in a bright segment provides illumination is greater than the amount of light detected by the pixel A when one point light source existing in a dark segment discussed above provides illumination. A continuous time during which one or multiple light sources existing in one bright segment are turned on may also be referred to as a bright segment.

After one bright segment, that is, a segment of time in which one or multiple point light sources existing in the bright segment (location) corresponding to one light-transmitting part of the mask 142 are turned on, there follows one dark segment, that is, a segment of time in which one or multiple point light sources existing in the dark segment (location) corresponding to one light-blocking part of the mask 142 adjacent to the above light-transmitting part. The combination of these two segments is taken to be one period of illumination. In other words, when the multiple point light sources 141 in the illumination equipment 140 are arranged at equal intervals, and provide illumination one after another for a predetermined time each, the time during which each of the multiple point light sources 141 arranged in one bright segment (location) and one dark segment (location) adjacent to the bright segment (location) provides illumination one after another becomes one period.

Note that among the point light sources 141, if the priority during imaging is different depending on the position of the point light source, the multiple sources of illumination existing in one dark segment or one bright segment may not provide illumination in a continuous time segment in some cases. For example, suppose that imaging is performed with the point light sources 141 arranged every ⅙ of one period. The point light sources 141 are arranged at least every ⅓ of one period. In other words, illumination at every ⅓ of one period becomes necessary, and the positions of these point light sources are treated as high-priority positions, while the positions of point light sources arranged between every ⅓ are treated as low-priority positions. If the imaging time not ample, imaging with illumination provided by the point light sources at the high-priority positions is conducted first, while imaging with illumination provided by the point light sources at the low-priority positions are conducted after the imaging with illumination provided from the high-priority positions is finished. In such cases, the six point light sources arranged in the segments of one period (location) do not provide illumination in a continuous time segment. Consequently, the one period in terms of time, or in other words, "the time during which each of the multiple point light sources 141 arranged in one bright segment (location) and one dark segment (location) adjacent to the bright segment (location) provides illumination one after another" does not exist. When each of the point light sources 141 are arranged at equal intervals, a segment in which multiple point light sources 141 are arranged in one bright segment (location) and one dark segment (location) adjacent to the bright segment (location) is taken to be the segment of one period, and the multiple images taken with illumination provided by each of the multiple point light sources 141 arranged in that segment of one period are taken to be one period's worth of images.

Even if the sources of illumination existing in one bright segment (location) and one dark segment (location) adjacent to the bright segment (location) do not provide illumination in a continuous time segment, the state of illumination being provided by the sources of illumination in one bright segment (location) and one dark segment (location) adjacent to the bright segment (location) is taken to be one locational, or in other words spatial, period.

For the pixel B at a different position from the pixel A in FIG. 12A, the boundary positions between the bright segments and the dark segments are different from the boundary positions with respect to the pixel A. However, the sizes of the bright segments and the dark segments with respect to the pixel A are the same as the sizes of the bright segments and the dark segments with respect to the pixel B. This is because, with respect to the pixel A and the pixel B, the sizes of the light-blocking part and the light-transmitting part of the mask 142, the distance between the mask 142 and the surface of the image sensor 150, and the distance between the point light sources 141 and the surface of the image sensor 150 are the same. In other words, for an arbitrary pixel on the image sensor 150, the periods of light and dark are the same, but the illumination positions of the bright segments and the illumination positions of the dark segments are different depending on the position of the pixel.

In step S1300 illustrated in FIG. 10, for each pixel of the image sensor 150, the light and dark image processing unit 120 subtracts the minimum value from the maximum value of the luminance for the pixels at the same position in each of the multiple images acquired by imaging. The maximum value and the minimum value of the luminance correspond to the bright segment and the dark segment of each pixel on the image sensor 150, respectively.

In other words, in Embodiment 1, a partial region of the photosensitive surface of the image sensor 150 acquires a first image while in a state in which the light-transmitting part of the mask 142 is arranged between a first light source illuminating the material and the partial region. As a result, a first image in the bright segment is acquired. Also, a partial region of the photosensitive surface of the image sensor 150 acquires a second image while in a state in which the light-blocking part of the mask 142 is arranged between a second light source illuminating the material and the partial region. As a result, a second image in the dark segment is acquired.

At this point, a required imaging condition for specifying the maximum value and the minimum value of the luminance for all pixels in the taken images is that both imaging with illumination provided by a point light source 141 positioned in a bright segment and imaging with illumination provided by a point light source 141 positioned in a dark segment are conducted for all pixels on the image sensor 150.

For each and every pixel on the image sensor 150, even if the point light source is the same, the relevant point light source may be positioned in a bright segment or may be positioned in a dark segment, depending on the pixel. For example, as illustrated in FIG. 12B, for the pixel A, direct light from the point light source 141a is blocked by the light-blocking part 142b to create a dark segment, but for the pixel B, light emitted from the point light source 141a is transmitted through the light-transmitting part 142a and arrives at the pixel B. In other words, for the pixel B, the point light source 141a is in a bright segment.

For two different pixels on the image sensor 150, the bright segments and the dark segments of illumination are the same size, but the positions are different. The positions of the bright segments and the dark segments are shifted in accordance with the distance between the two pixels. For example, consider the case of the pixel A and the pixel B in FIG. 12A. Suppose that a point light source 141a' exists at an illumination position where light passes through the boundary between the light-blocking part 142b and the light-transmitting part 142a of the pixel B and the mask 142, and a point light source 141b' exists at an illumination position where light passes through the boundary between the light-blocking part 142b and the light-transmitting part 142c of the pixel B and the mask 142. In this case, the positions of the point light source 141a and the point light source 141a' as well as the positions of the point light source 141b and the second light source 141b' are different, but the distance between the point light source 141a and the point light source 141b, or in other words the size of the dark segment for the pixel A, and the distance between the point light source 141*a*' and the point light source 141*b*', or in other words the size of the dark segment for the pixel B, are the same. The adjacent bright segments are similar, and for the pixel A and the pixel B, the sizes of the dark segments and the bright segments are the same. In other words, the period of the illumination with respect to the positions of the illumination for each pixel are the same.

Consequently, imaging the pixel A and the pixel B at least requires imaging with illumination provided by one point light source 141 arranged in a bright segment for each pixel illustrated in FIG. 12A, and imaging with illumination provided by one point light source 141 arranged in a dark segment for each pixel illustrated in FIG. 12A. In other words, provided that the sum of the distance of one dark segment and the distance of one bright segment is the distance of one period, the distance between adjacent point light sources must be less than or equal to the distance of a half-period. In actuality, when light is radiated from multiple point light sources 141 one after another, the boundary between a bright segment, in which direct light is transmitted through the light-transmitting part of the mask 142 and reaches the surface of the image sensor 150, and a dark segment, in which direct light is blocked by the light-blocking part of the mask 142 and does not reach the surface of the image sensor 150, is indistinct.

Figure 13:
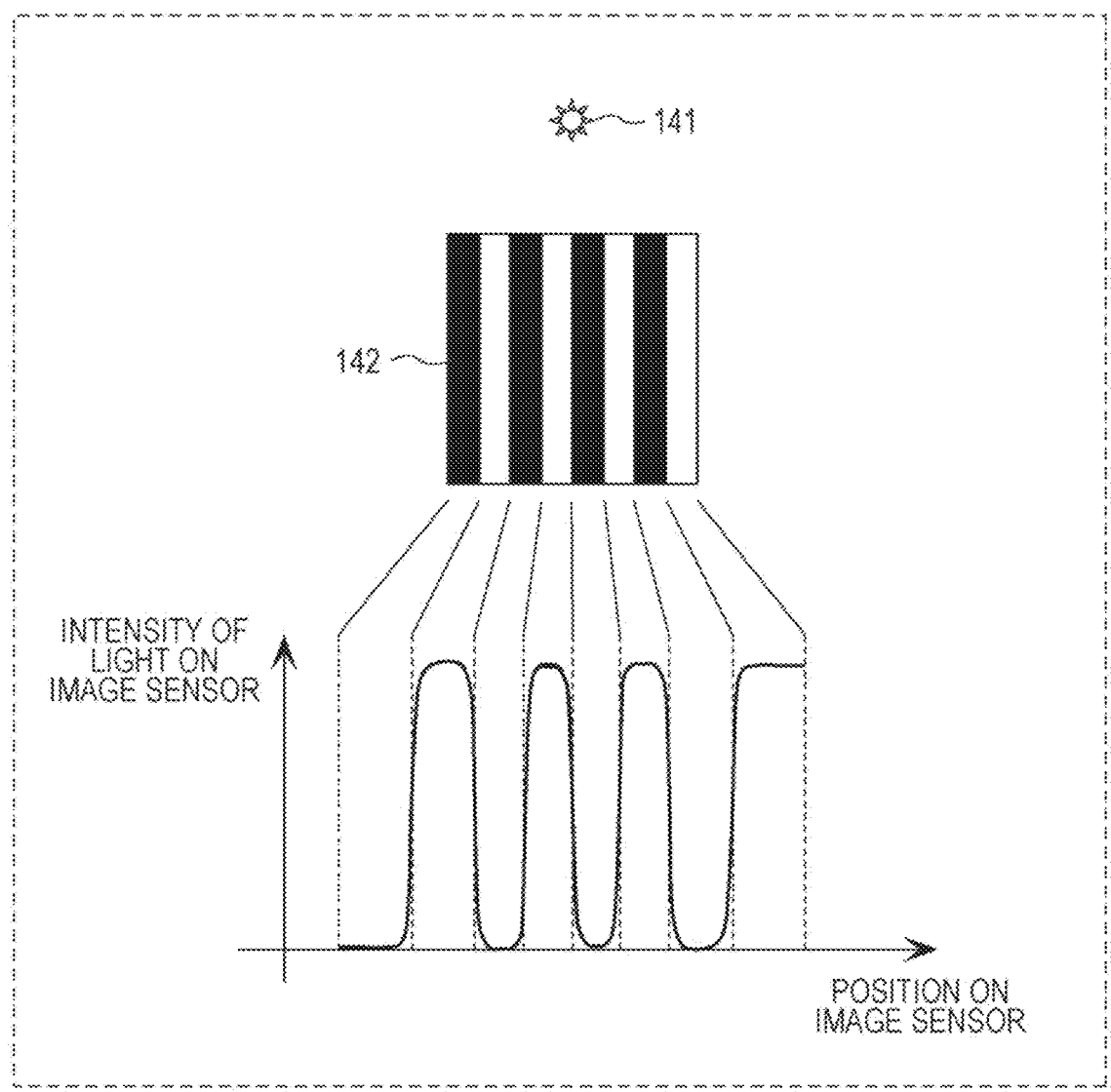
FIG. 13 is a diagram illustrating the intensity of light at respective positions on an image sensor according to Embodiment 1.

FIG. 13 illustrates the intensity of light at respective positions on the image sensor 150. For example, as in FIG. 13, the luminance at the boundaries changes gradually. For this reason, even if the distance between adjacent point light sources 141 is taken to be the distance of a half-period, or in other words, even if two point light sources are provided over the distance of one period, which is taken to be the sum of the distance of one dark segment and the distance of one bright segment, an imaging result in a bright segment and a dark segment may not be obtained for all pixels on the image sensor 150 in some cases. The inventors experimentally confirmed that when the sum of the distance of one bright segment and the distance of one dark segment is taken to be the distance of one period, an imaging result in a bright segment and a dark segment is obtained for all pixels on the image sensor 150 if the point light sources 141 are arranged at distance intervals of ⅓ period, or in other words, three point light sources are arranged over one period, and imaging is conducted by turning on the point light sources 141 one after another. In other words, the interval of the multiple point light sources 141 in the illumination equipment 140 is less than or equal to the distance of ½ period, and preferably less than or equal to the distance of ⅓ period. In addition, the certain distance between the first light source 141A and the second light source 141B discussed earlier is the distance between the illumination position of a bright segment for an arbitrary pixel on the image sensor 150, and the illumination position of a dark segment for that pixel. Specifically, when the interval of the multiple point light sources 141 is the distance of ⅓ period, the certain distance between the first light source 141A and the second light source 141B discussed earlier is the distance of ⅓ period, provided that the distance of one period is taken to be the sum of the distance of one bright segment and the distance of one dark segment.

For example, when the point light sources 141 are arranged at a distance interval of ⅓ period, or in other words, when three point light sources are arranged over the distance of one period, and the point light sources 141 are arranged in the direction cutting across the slits, the illumination position list referenced in step S1210 is a list indicating seven illumination positions. Herein, since the illumination is taken to cover two periods, and since the point light sources 141 are arranged at a distance interval of ⅓ period, seven points of illumination are arranged in the segment of two periods, including both ends of the illumination period. Note that the direction cutting across the slits is the direction in which the light-blocking part and the light-transmitting part of the mask 142 are alternately arranged.

[3-3. Light and Dark Image Process]

The operation of the light and dark image processing unit 120 in step S1300 illustrated in FIG. 10 will be described in detail.

Figure 14:
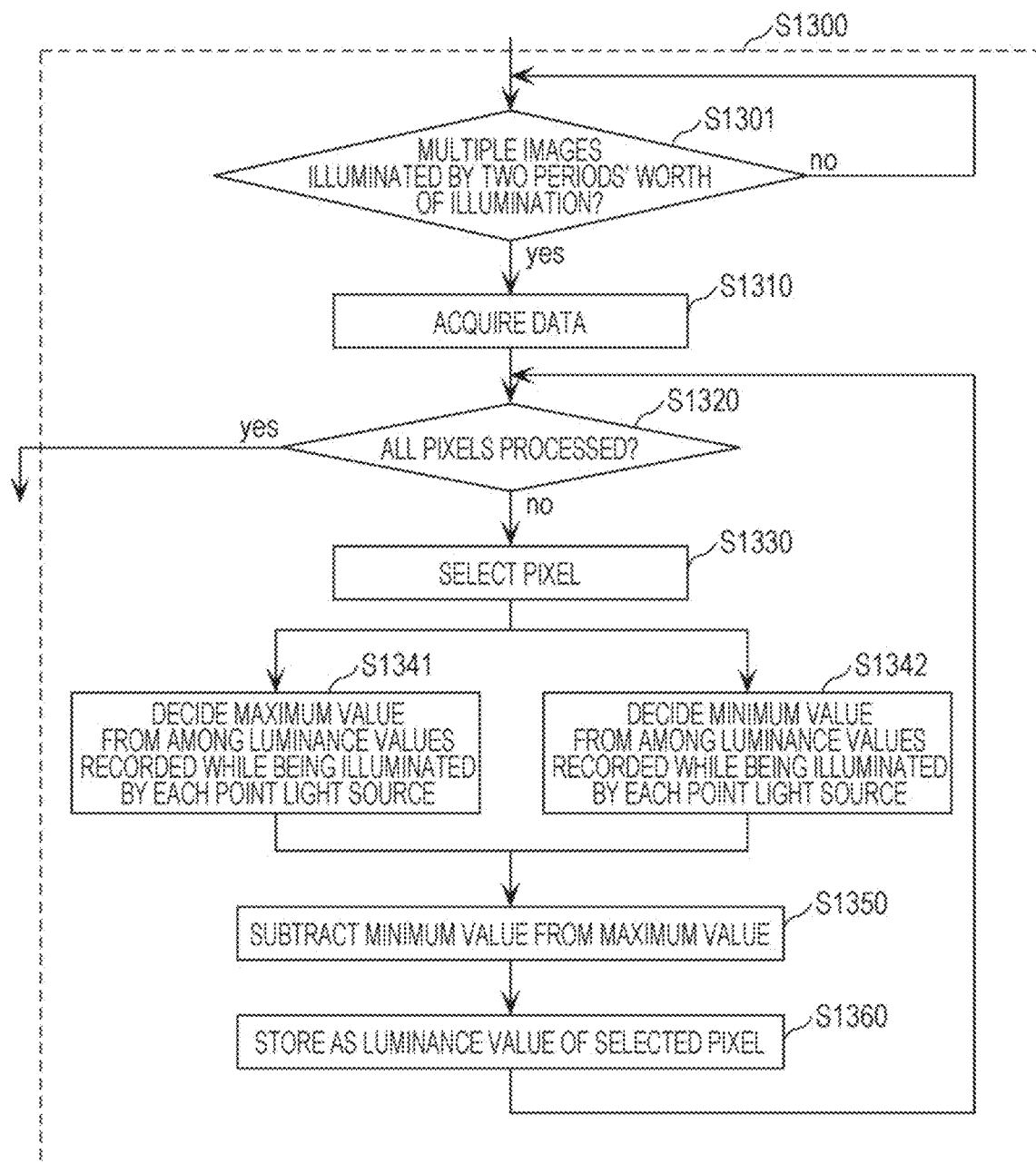
FIG. 14 is a flowchart illustrating an example of the operation of a light and dark image processing unit according to Embodiment 1.

FIG. 14 is a flowchart illustrating an example of the operation of the light and dark image processing unit 120 according to Embodiment 1.

(Step S1301)

The data acquisition unit 121 of the light and dark image processing unit 120 determines whether or not multiple images and the illumination positions associated with each of the multiple images are stored in the storage unit 110. The multiple images and the multiple illumination positions are the respective images and illumination positions acquired when each of the multiple point light sources 141 arranged in the segment of two periods provides illumination one after another in step S1200. If the data acquisition unit 121 determines that the images and illumination positions are stored (step S1301, yes), the light and dark image process is continued (that is, the flow proceeds to step S1310).

(Step S1310)

The data acquisition unit 121 acquires, from the storage unit 110, the multiple images acquired in step S1200, and the illumination positions corresponding to each of the multiple images.

(Step S1320)

The pixel selection unit 126 determines whether or not the process of calculating luminance values for all pixels included in the image to generate has finished. More specifically, this calculation process refers to the processes from step S1320 to step S1360.

If the calculation process has finished for all pixels included in the image to generate (step S1320, yes), the light and dark image processing unit 120 ends the light and dark image process (that is, the flow proceeds to step S1400).

If the calculation process has not finished for any of the pixels included in the image to generate (step S1320, no), the light and dark image processing unit 120 continues the light and dark image process (that is, the flow proceeds to step S1330).

The image to generate includes fewer pixels than the image with the least pixels from among the multiple images acquired in step S1200. In other words, the number of pixels in the image to generate is less than the number of pixels in any of the multiple acquired images.

(Step S1330)

The pixel selection unit 126 selects one pixel from among the multiple pixels included in the image to generate. The one pixel selected at this point, or in other words the selected pixel, is a pixel on which the calculation process has not been executed yet from among the multiple pixels included in the image to generate. Note that the pixel values (that is, the luminance values) in the image to generate have a default value of 0.

(Step S1341)

For the pixel selected in step S1330 (that is, the selected pixel), the maximum value decision unit 122 compares the luminance values of the pixels at the same position as the selected pixel included in each of the multiple images taken in step S1200. From the results of the comparison, the maximum value decision unit 122 decides the maximum luminance value as the maximum value of the luminance for the selected pixel.
(Step S1342)
For the pixel selected in step S1330 (that is, the selected pixel), the minimum value decision unit 123 compares the luminance values of the pixels at the same position as the selected pixel included in each of the multiple images taken in step S1200. From the results of the comparison, the minimum value decision unit 122 decides the minimum luminance value as the minimum value of the luminance for the selected pixel.

Note that step S1341 and step S1342 in any order, or may be conducted in parallel.
(Step S1350)
The calculation unit 124 subtracts the minimum value of the luminance decided in step S1342 from the maximum value of the luminance decided in step S1341.
(Step S1360)
The image generation unit 125 stores the luminance value calculated in step S1350 as the luminance value of the selected pixel.

By repeating the processes from step S1320 to step S1360, the light and dark image processing unit 120 is able to generate the luminance values of all pixels in the image to generate.

[4. Advantageous Effects]

According to the image generating apparatus 10 according to Embodiment 1 as above, light from multiple point light sources 141 at different positions is projected through the mask 142 onto an object and the image sensor 150, to thereby conduct imaging with transmitted light. The mask 142 has a repeating pattern of a light-blocking part and a light-transmitting part, such as slits or a checker pattern. From among the multiple images acquired by such imaging, for each pixel (that is, the selected pixel) in the image to generate, the image taken in a state in which light passes through the light-transmitting part of the mask 142 and reaches the relevant pixel as direct light is specified. Subsequently, the luminance value of the pixel at the same position as the selected pixel included in the specified image is decided as the maximum value of the luminance. Similarly, from among the multiple images acquired by such imaging, for each selected pixel, the image taken in a state in which direct light from a point light source 141 is blocked by the light-blocking part of the mask 142 is specified. Subsequently, the luminance value of the pixel at the same position as the selected pixel included in the specified image is decided as the minimum value of the luminance. The maximum value of the luminance indicates the luminance corresponding to direct light and scattered light or refracted light from the object. The minimum value of the luminance indicates the luminance corresponding to scattered light or refracted light from the object, excluding direct light. By subtracting the minimum value from the maximum value of the luminance, the luminance value obtained by direct light may be computed. Consequently, noise due to scattered light or refracted light may be reduced, and an image that is clear due to direct light may be generated.

Meanwhile, descattering technology using high-frequency illumination is disclosed in IEEE International Conference on Computational Photography (ICCP2013) April 2013, Cambridge, "Descattering of transmissive observation using parallel high-frequency illumination". With high-frequency illumination, it is conceivable to modify the types of light output from the light source, and the methods of generating a light and dark pattern with light radiated onto the object. In IEEE International Conference on Computational Photography (ICCP2013) April 2013, Cambridge, "Descattering of transmissive observation using parallel high-frequency illumination", it is assumed that the object, the light source, and the mask are separated by ample distances. For this reason, a light source is used to provide illumination with collimated light or near-collimated light to thereby take an image of the object.

Methods of generating a light and dark pattern with light radiated onto an object include (i) a method of utilizing light having a light and dark pattern, and (ii) a method of placing a light-blocking mask between the illumination and the object. Additionally, if moving the position of the light and dark pattern of the radiated light on the surface of the object is considered, there also exist (iii) a method of modifying the position of the light source, and (iv) a method of modifying the position of the mask.

In the case of taking images using collimated light or near-collimated light as in IEEE International Conference on Computational Photography (ICCP2013) April 2013, Cambridge, "Descattering of transmissive observation using parallel high-frequency illumination", even if the position of the mask is fixed and the position of the light source is moved, there is little or no change in the light radiated through the mask and onto the object. In other words, it is difficult to adopt a method of moving the position of the light and dark pattern of the radiated light by (iii) modifying the position of the light source.

On the other hand, in the case of a microscope having the condition of small distances between the light source, the mask, and the object, obtaining collimated light simply is difficult. Thus, it is conceivable to use diffuse light as the type of light output from the light source.

In the case of using diffuse light, if the distance from the mask to the object is large, the light and dark pattern spreads out, making it difficult to obtain the advantageous effects of high-frequency illumination. For example, if the mask is brought close to the object, there is a possibility of affecting tiny objects such as cells due to (iv) the movement of the mask. Specifically, there is a possibility of tiny objects moving or rotating due to the movement of the mask. When taking images of tiny objects such as cells, the distances between the light source, the mask, and the object become small. Thus, in a case in which the distance between the mask and the object is small, and a light source that radiates diffuse light must be used, high-frequency illumination may be provided effectively by keeping the mask fixed in place and moving the light source to thereby move the position of the light and dark pattern of the light.

Advantageous Effects of Embodiment 1

Figure 26A:
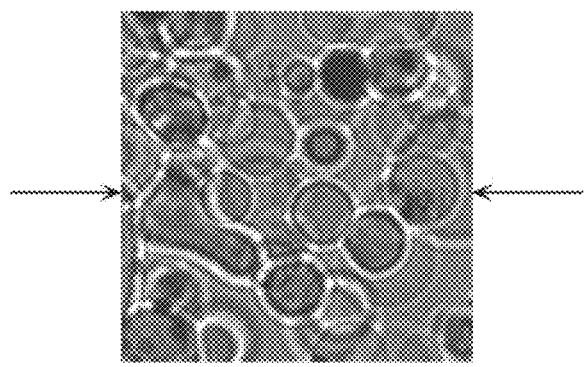
FIG. 26A is a diagram illustrating an image taken in a state of radiating illumination from a point light source, without a mask.
Figure 26B:
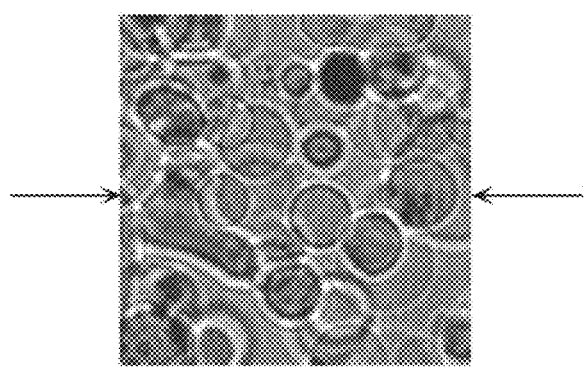
FIG. 26B is a diagram illustrating an image obtained by taking and compositing images with the method according to Embodiment 1.

FIGS. 26A and 26B are images taken in a state in which multiple glass beads having an average diameter of 0.04 mm are kept fixed in place with a resin. The multiple spheres illustrated in FIGS. 26A and 26B correspond to the glass beads. The image in FIG. 26A is an image taken in a state of radiating illumination from a point light source, without a mask. The image in FIG. 26B is an image obtained by taking and compositing images with the method according to Embodiment 1. Compared to the image in FIG. 26A, the image in FIG. 26B has greater contrast, with distinct edges.

Figure 27:
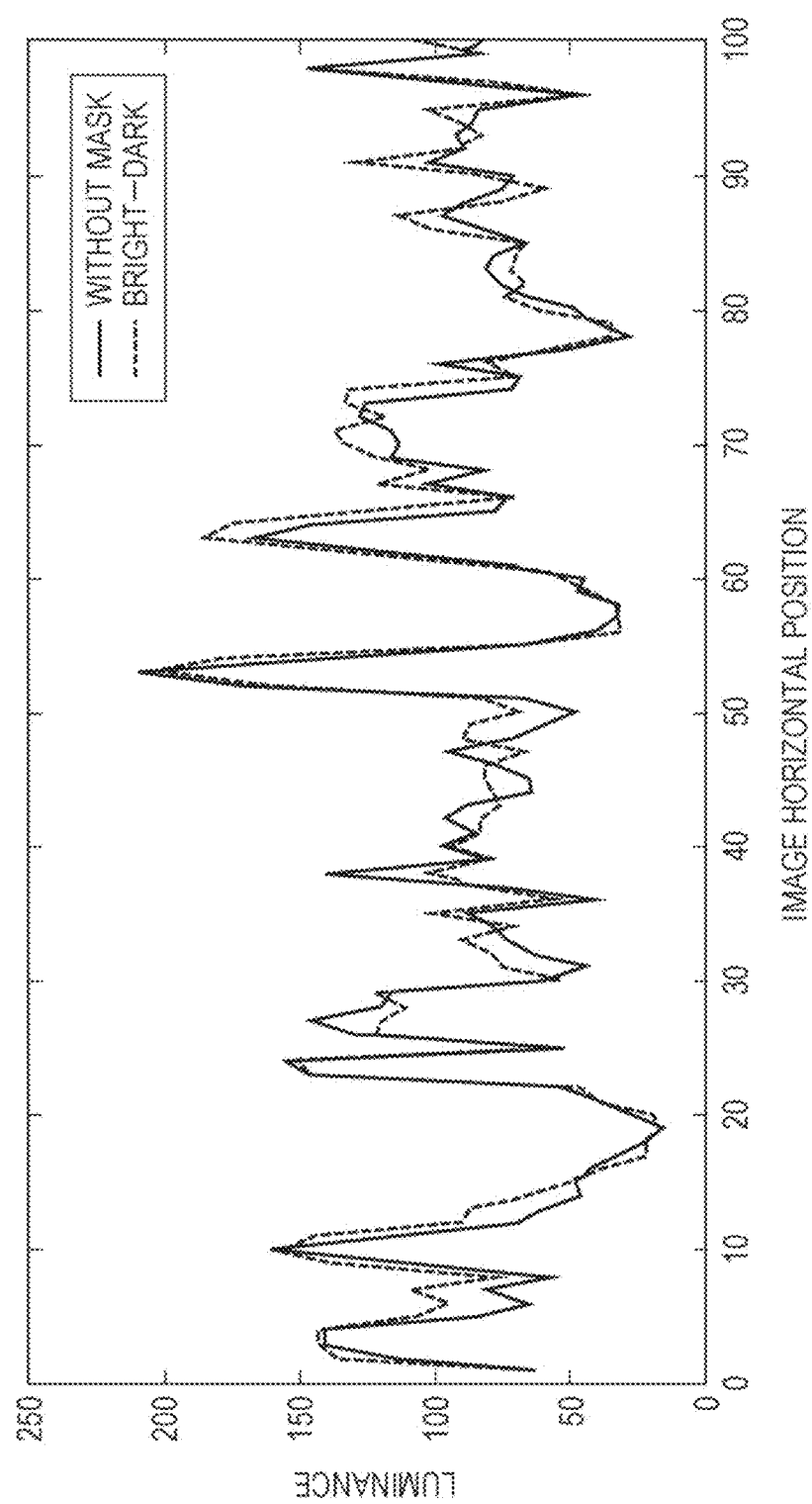
FIG. 27 is a diagram illustrating the luminance profiles of the image in FIG. 26A and the image in FIG. 26B.

FIG. 27 is a diagram illustrating the luminance profiles of the image in FIG. 26A and the image in FIG. 26B. In FIG. 27, the solid line indicates the luminance profile of the image in FIG. 26A, while the dashed line indicates the luminance profile of the composite image taken with the method according to Embodiment 1 in FIG. 26B. In FIG. 27, the horizontal axis is a value indicating the horizontal position of the image by pixel count, while the vertical axis is the luminance value. The luminance profiles illustrated in FIG. 27 are computed at the positions indicated by the arrows in FIGS. 26A and 26B. In the region where the horizontal axis is 50 or greater in FIG. 27, the luminance gradient of the image in FIG. 26B (dashed line) is greater than the luminance gradient of the image in FIG. 26A (solid line). Thus, as illustrated in FIG. 27, the composite image taken with the method according to Embodiment 1 is confirmed to have higher contrast than the image taken without a mask.

Modification of Embodiment 1

Next, a modification of Embodiment 1 will be described. In Embodiment 1, each pixel is imaged over a range of one period or more, and for each selected pixel, the maximum luminance value and the minimum luminance value of pixels at the same position as the selected pixel in each of the multiple images are decided. Subsequently, the minimum luminance value is subtracted from the maximum luminance value to compute the luminance of the selected pixel. In this modification, the luminance value with the lesser variance from between the maximum luminance value and the minimum luminance value, or in other words the most stable luminance value, is adopted as the maximum value or the minimum value of the luminance of the selected pixel. Additionally, if the adopted luminance value is the maximum value, the illumination position and the above-discussed period from when that maximum value was obtained are used to decide the minimum value of the luminance of the selected pixel. On the other hand, if the adopted luminance value is the minimum value, the illumination position and the above-discussed period from when that minimum value was obtained are used to decide the maximum value of the luminance of the selected pixel.

Figure 15:
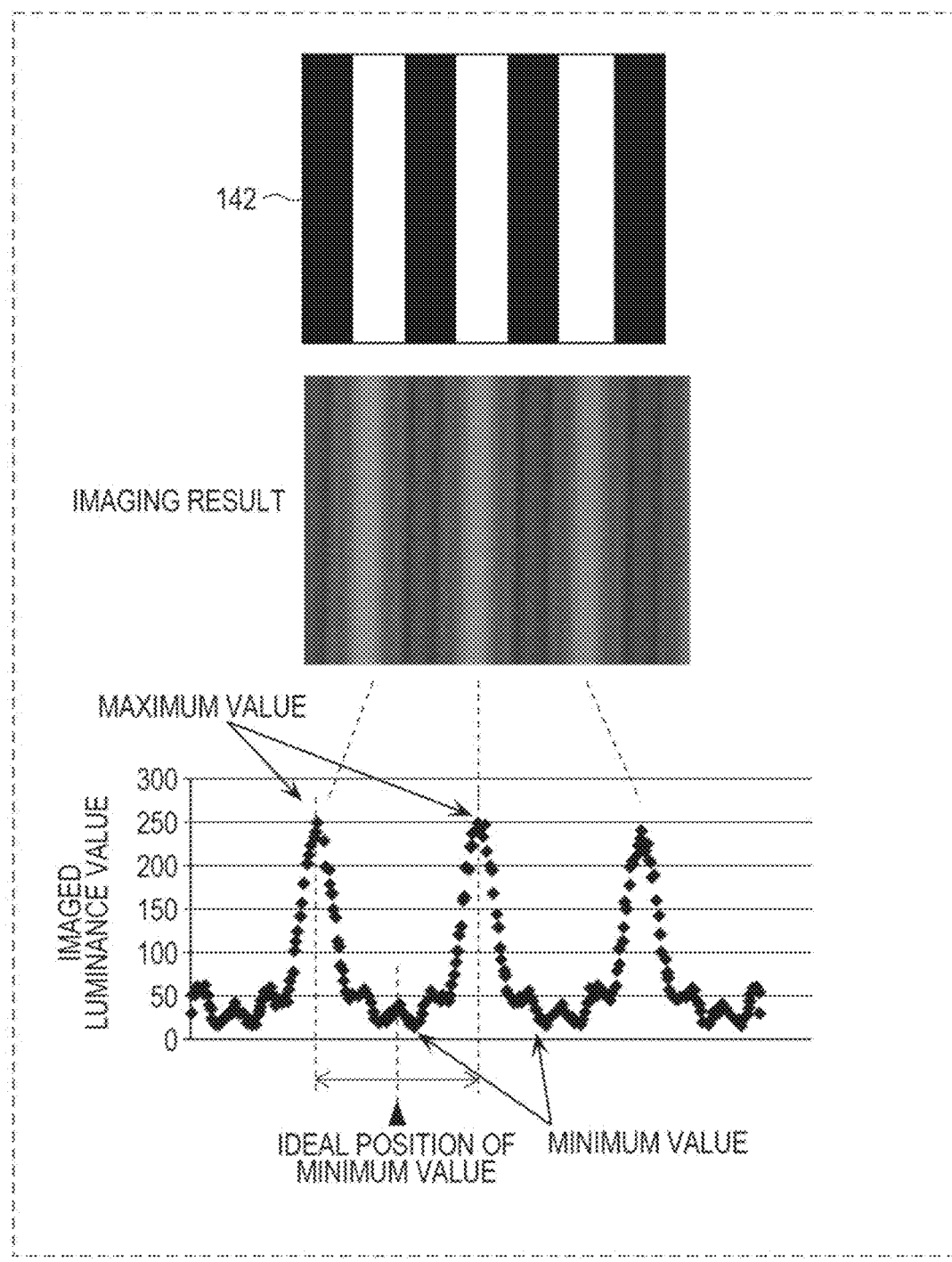
FIG. 15 is a diagram illustrating an example of an imaging result by an image sensor using a mask according to Embodiment 1.

FIG. 15 illustrates an example of an imaging result by the image sensor 150 using the mask 142. Specifically, FIG. 15 illustrates an example of an image obtained by imaging when light from a point light source 141 passes through a slit mask 142 and is sensed on the surface of the image sensor 150 placed parallel to the mask 142. In this example, there is no object. As in FIG. 15, strong fringes are produced due to effects such as the interference of light passing through the mask 142, and the illumination position where the maximum value or the minimum value is obtained becomes unstable in some cases. In such cases, there is a possibility that the image indicating the maximum value of the luminance may be different from the image having the most intense direct light in the bright segment. Alternatively, there is a possibility that the image indicating the minimum value of the luminance may be different from the image having the least intense direct light in the dark segment.

With this modification, in cases like the above, the process of calculating the luminance for each pixel may be further stabilized.

In other words, in the image generating apparatus 10 according to the present modification, when each of multiple light sources, including the first light source 141A and the second light source 141B, successively illuminates a material, a partial region of the photosensitive surface of the image sensor (specifically, the selected pixel) acquires an image having the maximum luminance value and an image having the minimum luminance value every period. Subsequently, a processing circuit, namely the light and dark image processing unit 120, selects an image group with less variance in the luminance value, from between a first image group that includes a maximum luminance image containing the maximum luminance value acquired every period, and a second image group that includes a minimum luminance image containing the minimum luminance value acquired every period. At this point, (i) if the selected image group is the first image group, the light and dark image processing unit 120 selects, as the first image from among the first image group, an image which contains the maximum luminance value and which is acquired by the image sensor 150 when the first light source 141A illuminates the material. Furthermore, the light and dark image processing unit 120 selects, as the second image, an image which is acquired by the image sensor 150 at a timing shifted by a half-period after the first image is acquired by the image sensor 150, and which is acquired by the image sensor 150 when the second light source 141B illuminates the material. On the other hand, (ii) if the selected image group is the second image group, the light and dark image processing unit 120 selects, as the second image from among the second image group, an image which contains the minimum luminance value and which is acquired by the image sensor 150 when the second light source 141B illuminates the material. Furthermore, the light and dark image processing unit 120 selects, as the first image, an image which is acquired by the image sensor 150 at a timing shifted by a half-period after the second image is acquired by the image sensor 150, and which is acquired by the image sensor 150 when the first light source 141A illuminates the material. Note that, specifically, each of the first image and the second contains luminance values corresponding to the same pixels included in the image sensor 150.

More specifically, in the image generating apparatus 10, imaging is conducted over a range of three or more periods, and the maximum and minimum values of the luminance are computed for each period. Hereinafter, the maximum value in one period is also designated the in-period maximum value, while the minimum value in one period is also designated the in-period minimum value. From between a maximum value group made up of the in-period maximum values from each of the periods and a minimum value group made up of the in-period minimum values from each of the periods, the group with less variance is selected. Subsequently, if the selected group is the maximum value group, the largest in-period maximum value is selected from among the multiple in-period maximum values included in the maximum value group as the overall maximum value, and is also adopted as the maximum value of the luminance for the selected pixel. On the other hand, if the selected group is the minimum value group, the smallest in-period minimum value is selected from among the multiple in-period minimum values included in the minimum value group as the overall minimum value, and is also adopted as the minimum value of the luminance for the selected pixel. At this point, when the overall maximum value is selected, the image taken when illumination is provided by the point light source 141 at an illumination position separated by the distance corresponding to one half-period from the illumination position when acquiring the image corresponding to the overall maximum value is specified. Subsequently, the luminance value of the pixel at the same position as the selected pixel included in the specified image is adopted as the minimum value of the luminance for the selected pixel. On the other hand, when the overall minimum value is selected, the image taken when illumination is provided by the point light source 141 at an illumination position separated by the distance corresponding to one half-period from the illumination position when acquiring the image corresponding to the overall minimum value is specified. Subsequently, the luminance value of the pixel included in the specified image at the same position as the selected pixel is adopted as the maximum value of the luminance for the selected pixel.

Hereinafter, the points about the modification of Embodiment 1 that differ from Embodiment 1 will be described primarily. Also, since the configuration of the image generating apparatus 10 according to the present modification is similar to Embodiment 1, detailed description thereof will be reduced or omitted.

[1. Operation of Image Generating Apparatus]

The operation of the image generating apparatus 10 according to the present modification will be described. The overall schematic operation of the image generating apparatus 10 according to the present modification is similar to the operation indicated in the flowchart illustrated in FIG. 10 of Embodiment 1. However, the detailed operation in each of the multiple light source imaging in step S1200 and the light and dark image process in step S1300 according to the present modification is different from Embodiment 1. Also, since the image generating operation in step S1400 according to the present modification is similar to Embodiment 1, the description of such operation will be reduced or omitted.

[1-1. Multiple Light Source Imaging]

The multiple light source imaging in step S1200 according to the present modification will be described in detail. In step S1200 according to the present modification, from among the operation from step S1210 to step S1260 illustrated in FIG. 11, the operation in step S1210 is different from Embodiment 1.

In Embodiment 1, in step S1210, the control unit 160 references the illumination position list indicating multiple predetermined illumination positions, and determines whether or not imaging of the object with illumination from each illumination position has finished. Specifically, the illumination positions of the multiple point light sources 141 indicated in the illumination position list are arranged along the direction cutting across the slits over the segment of two periods, and separated from each other by an interval of ⅓ period. In the present modification, the illumination positions of the multiple point light sources 141 indicated in the illumination position list are arranged along the direction cutting across the slits over a segment of three or more periods, such as a segment of five periods, for example, and separated from each other by an interval of ⅙ period. In other words, in the illumination position list according to the present modification, six sources of illumination in the segment of each period are respectively arranged in a segment of five periods, for a total of 31 illumination positions including the sources of illumination arranged at both ends.

At this point, if imaging with illumination from all illumination positions included in the illumination position list has finished (step S1210, yes), the flow proceeds to step S1300. On the other hand, if imaging with illumination from any of the illumination positions included in the illumination position list has not finished (step S1210, no), the flow proceeds to step S1220.

As a result, in each period of the three or more periods of illumination, namely, in each period of the five periods of illumination in the present modification, imaging is conducted in bright segments and dark segments. Consequently, even if there are fringes in the intensity of light in the bright segments and dark segments, maximum values of the luminance from multiple bright segments and minimum values of the luminance from multiple dark segments may be referenced.

[1-2. Light and Dark Image Process]

Next, the light and dark image process in step S1400 according to the present modification will be described in detail.

Figure 16:
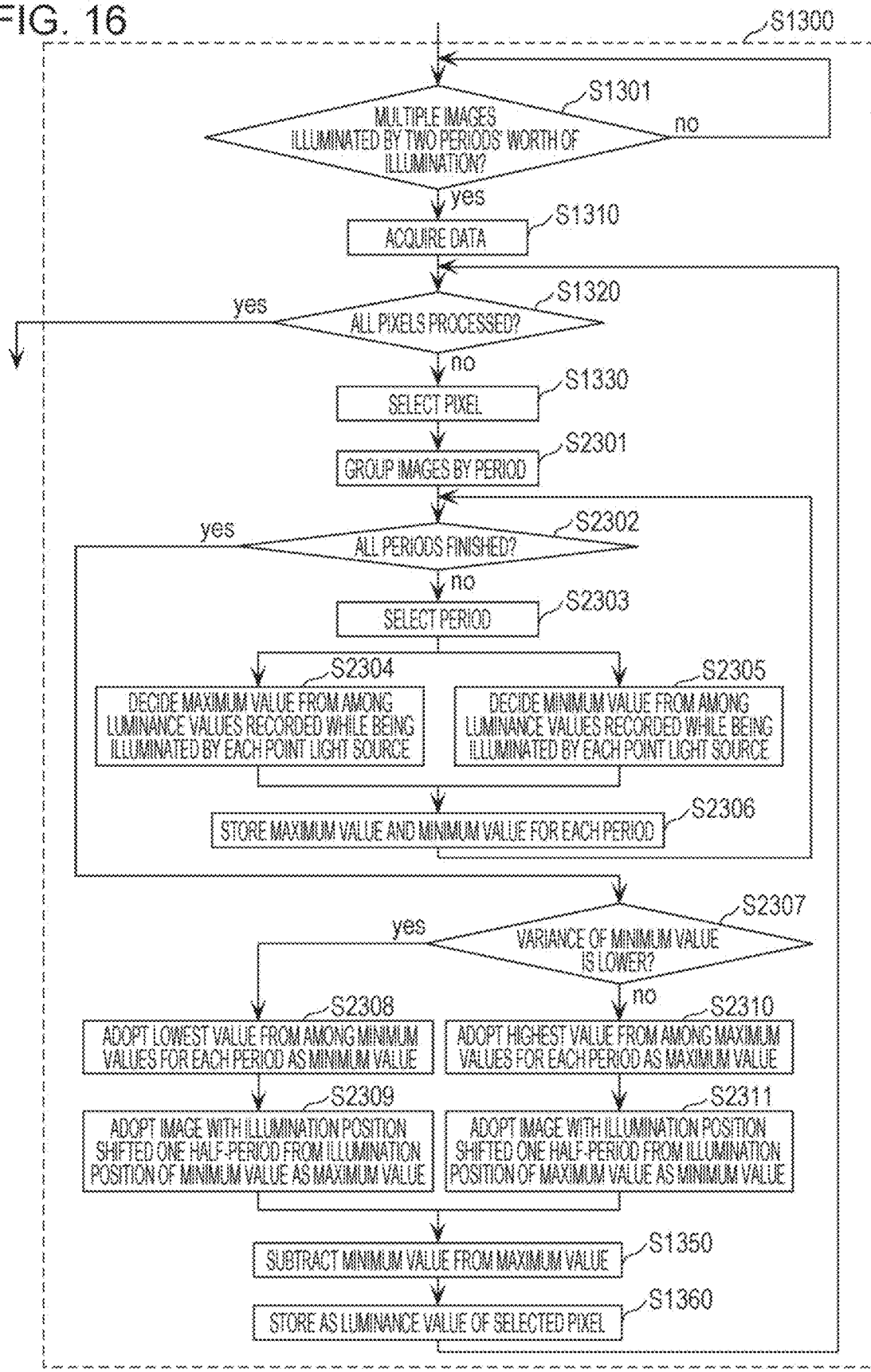
FIG. 16 is a flowchart illustrating an example of the operation of a light and dark image processing unit according to a modification of Embodiment 1.

FIG. 16 is a flowchart illustrating an example of the detailed operation of the light and dark image processing unit 120 according to the present modification. In the flowchart illustrated in FIG. 16, the steps similar to steps S1301 to S1330, step S1350, and step S1360 illustrated in FIG. 14 of Embodiment 1 are denoted with the same signs, and detailed description thereof will be reduced or omitted.

In step S1310, the data acquisition unit 121 acquires, from the storage unit 110, the multiple images acquired in step S1200, and the illumination positions corresponding to each of the multiple images. In step S1320, the pixel selection unit 126 determines whether or not the process of calculating luminance values for all pixels included in the image to generate has finished.

If the calculation process has finished for all pixels included in the image to generate (step S1320, yes), the light and dark image processing unit 120 ends the light and dark image process (that is, the flow proceeds to step S1400).

If the calculation process has not finished for any of the pixels included in the image to generate (step S1320, no), the light and dark image processing unit 120 continues the light and dark image process (that is, the flow proceeds to step S1330).

In step S1330, the pixel selection unit 126 selects, as the selected pixel, a pixel on which the calculation process has not been executed yet, from among the multiple pixels included in the image to generate.

(Step S2301)

The pixel selection unit 126 classifies each of the multiple pixels acquired by the data acquisition unit 121 in step S1310 into multiple groups with different periods, or in other words, groups the pixels by period. In other words, on the basis of the illumination positions corresponding to each of the multiple images, the pixel selection unit 126 classifies the respective images of one period's worth of multiple illumination positions into a single group for each period made up of a bright segment and a dark segment. Each of these multiple groups corresponds to a period made up of a bright segment and a dark segment. Note that the start point and the end point of a period are not required to be at a boundary between a bright segment and a dark segment. In the present modification, the predetermined illumination position list referenced in step S1200 indicates multiple illumination positions which are positioned in a segment of three or more periods. In the present modification, the positions of six sources of illumination per period, which are positioned in a segment of five periods, are indicated. In other words, in step S2301, the multiple images are grouped into three or more groups, specifically five groups in the present modification. In step S1200, if imaging is conducted with illumination from multiple illumination positions positioned in a segment of five periods, then in step S2301, the multiple images are grouped into five groups.

(Step S2302)

In addition, for each and every group generated by the grouping in step S2301, or in other words, for each and every period, the pixel selection unit 126 determines whether or not a maximum value of the luminance for the selected pixel and a minimum value of the luminance for the selected pixel have been decided. The maximum value of the luminance at this point is the in-period maximum value discussed earlier, while the minimum value of the luminance at this point is the in-period minimum value discussed earlier. In other words, in step S2302, it is determined for each and every period whether or not the in-period maximum value and the in-period minimum value of the selected pixel have been decided.

If the maximum value and the minimum value of the luminance have been decided for all groups (step S2302, yes), the flow proceeds to step S2307.

If the maximum value and the minimum value of the luminance have not been decided for all groups (step S2302, no), the light and dark image processing unit 120 continues the process of deciding the maximum value and the minimum value (that is, the flow proceeds to step S2303). This decision process is the process from step S2303 to step S2306.

(Step S2303)

From among all periods (or in other words, all groups), the pixel selection unit 126 chooses one period (or in other words, group) for which the maximum value and the minimum value of the luminance for the selected pixel have not been decided.

(Step S2304)

The maximum value decision unit 122 compares the luminance values of pixels at the same position as the selected pixel in each of the multiple images classified into the chosen period (or in other words, group). Specifically, the maximum value decision unit 122 compares the luminance values of pixels at the same position as the pixel selected in step S1330 in the multiple images taken with illumination provided from the multiple points arranged in the segment of the one period chosen in step S2303 from among the multiple images taken in step S1200. As a result, with respect to that one period (or in other words, group), the maximum value decision unit 122 decides the maximum value of the luminance for the selected pixel (or in other words, the in-period maximum value).

(Step S2305)

The minimum value decision unit 123 compares the luminance values of pixels at the same position as the selected pixel in each of the multiple images classified into the chosen period (or in other words, group). Specifically, the minimum value decision unit 123 compares the luminance values of pixels at the same position as the pixel selected in step S1330 in the multiple images taken with illumination provided from the multiple points arranged in the segment of the one period chosen in step S2303 from among the multiple images taken in step S1200. As a result, with respect to that one period (or in other words, group), the minimum value decision unit 123 decides the minimum value of the luminance for the selected pixel (or in other words, the in-period minimum value).

(Step S2306)

The storage unit 127 stores the maximum value of the luminance decided in step S2304, and the illumination position of the point light source 141 from when that maximum value was obtained by imaging. Additionally, the storage unit 127 stores the minimum value of the luminance decided in step S2305, and the illumination position of the point light source 141 from when that minimum value was obtained by imaging. At this time, the storage unit 127 stores the maximum luminance value, the illumination position corresponding to the maximum luminance value, the minimum luminance value, and the illumination position corresponding to the minimum luminance value together with the period chosen in step S2303. After that, the light and dark image processing unit 120 repeats the process from step S2302 to step S2306.

By repeating the processes from step S2302 to step S2306, the light and dark image processing unit 120 computes the maximum value and the minimum value of the luminance of the selected pixel for each and every one of the three or more periods, and decides the illumination position corresponding to each maximum value and each minimum value.

(Step S2307)

The calculation unit 124 computes the variance of the maximum value of the luminance for each of the periods stored in step S2306. Additionally, the calculation unit 124 computes the variance of the minimum value of the luminance for each of the periods. Additionally, the calculation unit 124 compares the variance of the maximum value to the variance of the minimum value of the luminance.

In step S2307, if the variance of the minimum value of the luminance is smaller than the variance of the maximum value, or in other words, in the case of Yes in step S2307, the flow proceeds to step S2308. In step S2307, if the variance of the minimum value of the luminance is larger than the variance of the maximum value or if the variance of the minimum value is equal to the variance of the maximum value, or in other words, in the case of No in step S2307, the flow proceeds to step S2310. In other words, the calculation unit 124 selects the group with less variance from between a maximum value group made up of the in-period maximum values from each of the periods, and a minimum value group made up of the in-period minimum values from each of the periods.

(Step S2308)

The calculation unit 124 decides the smallest value among the minimum values for each of the periods stored in step S2306 as the final minimum value of the luminance to adopt for the selected pixel. The final minimum value of the luminance is the overall minimum value discussed earlier. In other words, if the group selected in step S2307 is the minimum value group, the calculation unit 124 selects the smallest in-period minimum value from among the multiple in-period minimum values included in the minimum value group as the overall minimum value, and also adopts this overall minimum value as the minimum value of the luminance for the selected pixel.

(Step S2309)

The calculation unit 124 specifies an illumination position shifted by the distance of one half-period from the illumination position corresponding to the minimum value of the luminance of the selected pixel decided in step S2308 (in other words, the overall minimum value). Subsequently, from among the multiple images stored in the storage unit 127, the calculation unit 124 references the image taken with illumination provided by the point light source 141 at the specified illumination position. The calculation unit 124 decides the luminance value of the pixel included in the referenced image at the same position as the selected pixel as the final maximum value of the luminance to adopt for the selected pixel. The final maximum value of the luminance is the overall maximum value discussed earlier. In other words, when the overall minimum value is selected in step S2308, the calculation unit 124 specifies the image taken when illumination is provided by the point light source 141 at an illumination position separated by a distance of one half-period from the illumination position when acquiring the image corresponding to the overall minimum value. Subsequently, the calculation unit 124 adopts the luminance value of the pixel included in the specified image at the same position as the selected pixel as the maximum value of the luminance for the selected pixel.
(Step S2310)

The calculation unit 124 decides the largest value among the maximum values for each of the periods stored in step S2306 as the final maximum value of the luminance to adopt for the selected pixel. The final maximum value of the luminance is the overall maximum value discussed earlier. In other words, if the group selected in step S2307 is the maximum value group, the calculation unit 124 selects the largest in-period maximum value from among the multiple in-period maximum values included in the maximum value group as the overall maximum value, and also adopts this overall maximum value as the maximum value of the luminance for the selected pixel.
(Step S2311)

The calculation unit 124 specifies an illumination position shifted by the distance of one half-period from the illumination position corresponding to the maximum value of the luminance of the selected pixel decided in step S2310 (in other words, the overall maximum value). Subsequently, from among the multiple images stored in the storage unit 127, the calculation unit 124 references the image taken with illumination provided by the point light source 141 at the specified illumination position. The calculation unit 124 decides the luminance value of the pixel included in the referenced image at the same position as the selected pixel as the final minimum value of the luminance to adopt for the selected pixel. The final minimum value of the luminance is the overall minimum value discussed earlier. In other words, when the overall maximum value is selected in step S2310, the calculation unit 124 specifies the image taken when illumination is provided by the point light source 141 at an illumination position separated by a distance of one half-period from the illumination position when acquiring the image corresponding to the overall maximum value. Subsequently, the calculation unit 124 adopts the luminance value of the pixel included in the specified image at the same position as the selected pixel as the minimum value of the luminance for the selected pixel.
(Step S1350)

The calculation unit 124 subtracts the minimum value of the luminance of the selected pixel decided in step S2308 or step S2311 from the maximum value of the luminance of the selected pixel decided in step S2309 or step S2310.
(Step S1360)

The image generation unit 125 stores the difference between the maximum value and the minimum value calculated in step S1350 as the luminance value of the selected pixel.

By repeating the processes from step S1320 to step S1360, the light and dark image processing unit 120 is able to generate the luminance values of all pixels in the image to generate.

Note that in the modification of Embodiment 1, in step S2307, the calculation unit 124 compares the variance of the maximum value to the variance of the minimum value computed by period, and chooses the more stable value from between the maximum value and the minimum value. However, the calculation unit 124 may also compute the variance of the distance between the illumination positions where the maximum value of the luminance is obtained in respectively adjacent periods, or in other words, the variance of the distance between maximum values. In this case, the calculation unit 124 similarly computes the variance of the distance between the illumination positions where the minimum value of the luminance is obtained in respectively adjacent periods, or in other words, the variance of the distance between minimum values. Subsequently, the calculation unit 124 may compare the variance of the distance between maximum values to the variance of the distance between minimum values, and choose the more stable value from between the maximum value and the minimum value.

[2. Advantageous Effects]

As above, the maximum value of the luminance, which should be obtained by imaging with light transmitted through the light-transmitting part of the mask 142, and the minimum value of the luminance, which should be obtained by imaging in a state in which direct light is blocked by the light-blocking part of the mask 142, may become unstable in some cases. One possible reason for this is interference when light passes through the mask 142. However, according to the image generating apparatus 10 according to the modification of Embodiment 1, imaging is conducted with illumination positions set over three or more periods, with each period including a bright segment and a dark segment. Additionally, the more stable value from between the minimum value and the maximum value of the luminance is selected as a base of reference, and the luminance of the imaging result from an illumination position shifted by one half-period from the illumination position corresponding to the base of reference is used for calculation. In other words, in the present modification, instead of using values which have become unstable due to interference or the like, a combination of a maximum value and a minimum value of the luminance produced by the periodicity of the mask 142 is used. Consequently, noise due to scattered light or refracted light may be reduced, and an image that is clear due to direct light may be generated. In other words, the luminance due to direct light may be generated, even in an unstable state such as interference.

Embodiment 2

Embodiment 2 will now be described. In Embodiment 1, each pixel is imaged over a range of one or more periods of a bright segment and a dark segment, and for each selected pixel, the maximum value and the minimum value of the luminance are decided, and the luminance value of the selected pixel is computed by subtracting the minimum value from the maximum value. Also, in the modification of Embodiment 1, imaging is conducted in a segment of three or more periods, the maximum value and the minimum value of the luminance is computed for each period, and the value of less variance from between the maximum value and the minimum value by period is selected. Subsequently, if the value of less variance is the maximum value, the largest value among the maximum values for each of the periods is treated as a base of reference, whereas conversely, if the value of least variance is the minimum value, the smallest value among the minimum values for each of the periods is treated as a base of reference. The luminance of the pixel at the same position as the selected pixel in the image taken with illumination provided by the point light source 141 at an illumination position shifted by the distance of one half-period from the illumination position when acquiring the image containing the value of the base of reference is adopted as the minimum value or the maximum value of the luminance for the selected pixel. As a result, even if the maximum value or the minimum value of the luminance is unstable as illustrated in FIG. 15, noise may be reduced, and an image of the material illuminated by direct light may be generated.

In Embodiment 2, imaging is conducted without the mask 142, and the image taken without the mask 142 as well as the image taken with the mask 142 are used. As a result, even if the maximum value or the minimum value of the luminance is unstable as illustrated in FIG. 15, scattered light or refracted light may be removed. In other words, likewise in Embodiment 2, noise may be reduced, and an image of the material illuminated by direct light may be generated. Hereinafter, Embodiment 2 will be described in detail.

[1. Configuration of Image Generating Apparatus]

Figure 17:
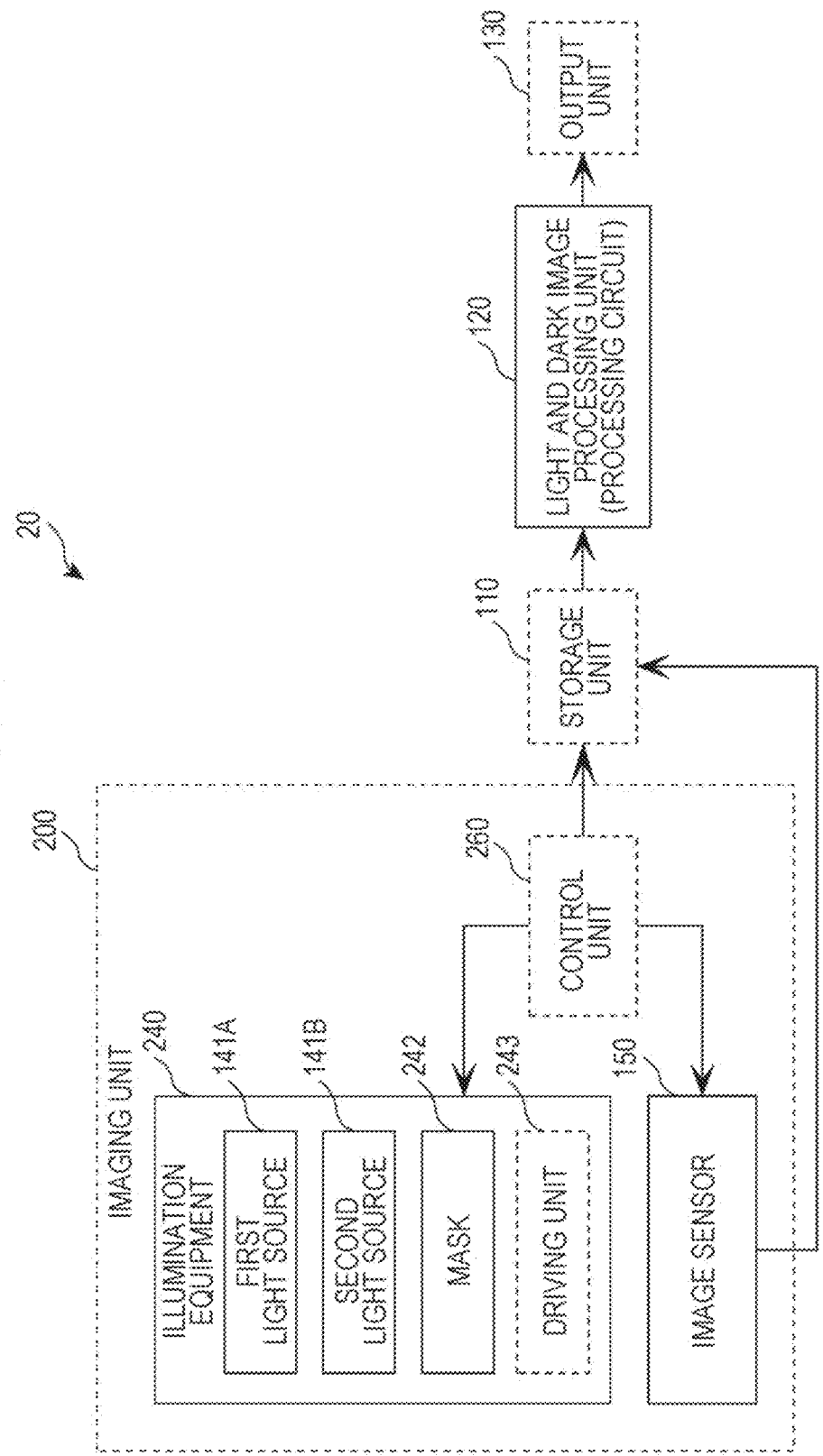
FIG. 17 is a block diagram illustrating an example of a functional configuration of an image generating apparatus according to Embodiment 2.

FIG. 17 is a function block diagram of an image generating apparatus 20 according to Embodiment 2. As illustrated in FIG. 17, the image generating apparatus 20 is an apparatus that generates images of translucent material such as cells, and is provided with an imaging unit 200, a storage unit 110, a light and dark image processing unit 120, and an output unit 130. The imaging unit 200 is provided with illumination equipment 240, a control unit 260, and an image sensor 150. The illumination equipment 240 is provided with a first light source 141A, a second light source 141B, a mask 242, and a driving unit 243.

In other words, the image generating apparatus 20 according to Embodiment 2 is provided with a storage unit 110, a light and dark image processing unit 120, and an output unit 130, similarly to the image generating apparatus 10 of Embodiment 1. However, the image generating apparatus 20 is different from the image generating apparatus 10 of Embodiment 1 in that the imaging unit 200 is provided instead of the imaging unit 100. Also, the imaging unit 200 according to Embodiment 2 is provided with the image sensor 150, similarly to the imaging unit 100 of Embodiment 1. However, the imaging unit 200 is different from the imaging unit 100 of Embodiment 1 in that the illumination equipment 240 is provided instead of the illumination equipment 140, and the control unit 260 is provided instead of the control unit 160. Also, the illumination equipment 240 according to Embodiment 2 is provided with the first light source 141A and the second light source 141B, similarly to the illumination equipment 140 of Embodiment 1. However, the illumination equipment 240 is different from the illumination equipment 140 of Embodiment 1 in that the mask 242 is provided instead of the mask 142, and the driving unit 243 is additionally provided. Note that structural elements in Embodiment 2 which are similar to the structural elements in Embodiment 1 are denoted with the same signs, and detailed description thereof will be reduced or omitted.

In Embodiment 2, similarly to Embodiment 1, the point light sources 141 included in the illumination equipment 240 at mutually different positions illuminate an object, namely a material, one after another through the mask 242, and thereby switch the light and dark pattern of the light that reaches the image sensor 150 and the object. Note that the mask 242 according to Embodiment 2 has slits or a checker pattern, similarly to Embodiment 1. In other words, the mask 242 includes a light-transmitting part that transmits light, and a light-blocking part that blocks light. Furthermore, in Embodiment 2, imaging is also conducted in a state with no mask 242, or in other words, in a state in which all light beams from the point light sources 141 reach the image sensor 150 and the object without being blocked. Also, in Embodiment 2, a clear image is generated from the imaging result without the mask 242, the image of the bright segment, and the image of the dark segment.

Note that although the image generating apparatus 20 according to Embodiment 2 is provided with the control unit 260, the storage unit 110, the output unit 130, and the driving unit 243, these structural elements are not required, and the image generating apparatus 20 may also not be provided with these structural elements.

[1-1. Imaging Unit]

First, the configuration of the imaging unit 200 will be described. The imaging unit 200 is provided with illumination equipment 240, an image sensor 150, and a control unit 260.

The illumination equipment 240 according to Embodiment 2 is provided with a light source group made up of multiple light sources including a first light source 141A and a second light source 141B, a mask 242, and a driving unit 243. The first light source 141A is a point light source that illuminates the material. The second light source 141B is a point light source that illuminates the material from a position separated from the first light source 141A by a certain distance. The mask 242 includes a light-transmitting part that transmits light from the first light source 141A and the second light source 141B, as well as a light-blocking part that blocks such light. Also, the driving unit 243 drives the mask 242.

Hereinafter, the illumination equipment 240 will be described in detail.

Figures 18, 19:
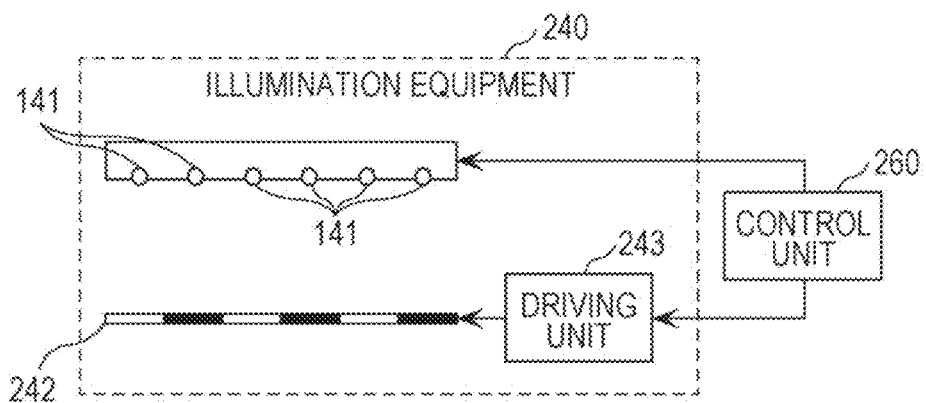
FIG. 18 is a diagram that schematically illustrates the structure of illumination equipment according to Embodiment 2.
FIG. 19 is a diagram illustrating an example of content stored by a storage unit according to Embodiment 2.

FIG. 18 is a diagram that schematically illustrates the structure of the illumination equipment 240 in Embodiment 2. Specifically, the illumination equipment 240 is provided with multiple point light sources 141, including the first light source 141A and the second light source 141B discussed above, the mask 142, and the driving unit 243.

The multiple point light sources 141 of the illumination equipment 240 radiate light one after another. The multiple point light sources 141 are arranged at mutually different positions, and radiate light onto the object through the mask 242 from mutually different directions.

The mask 242 includes slits or a checker pattern. In other words, the mask 242 includes a light-transmitting part that transmits light, and a light-blocking part that blocks light. The driving unit 243 places or removes the mask 242, and is a mechanism that includes an actuator such as a motor, for example. Specifically, the driving unit 243 places the mask 242 between the image sensor 150, and the first light source 141A and the second light source 141B, or removes the placed mask 242 therefrom.

The image sensor 150 includes multiple pixels, on which is placed the material discussed above. The pixels of the image sensor 150 are disposed on a photosensitive surface, and acquire the intensity of light (in other words, luminance values) of light radiated from the multiple point light sources 141. The image sensor 150 acquires a photographic image on the basis of the intensity of light acquired by each of the pixels. In other words, the image sensor 150 acquires a first image of the material when illuminated by the first light source 141A from among the light source group made up of the multiple point light sources 141, and acquires a second image of the material when illuminated by the second light source 141B from among light source group made up of the multiple point light sources 141. In addition, the image sensor 150 acquires a fourth image of the material when illuminated by a light source included in the light source group. At this point, the first image and the second image are acquired through the mask 242 positioned between the image sensor 150, and the first light source 141A and the second light source 141B. The fourth image is acquired without the mask 242 in between.

The control unit 260 controls the radiation of light by the multiple point light sources 141, and the imaging by the image sensor 150. Additionally, the control unit 260 outputs a control signal to the driving unit 243 for placing and removing the mask 242. Specifically, the control unit 260 outputs to the driving unit 243 a signal to place the mask 242, or a signal to remove the mask 242. Also, the control unit 260 controls the order in which the multiple point light sources 141 radiate light, and the time intervals over which the multiple point light sources 141 radiate light.

[1-2. Storage Unit]

The storage unit 110 stores an image acquired by the image sensor 150 in association with the illumination position during imaging as set by the control unit 260, and information about the presence or absence of the mask 242. The information about the presence or absence of the mask 242 indicates whether the mask 242 has been placed between the image sensor 150 and the multiple point light sources 141 (that is, the mask 242 is present), or whether the mask 242 has been removed from in between (that is, the mask 242 is absent).

FIG. 19 is an example of information stored by the storage unit 110. The storage unit 110 stores an ID identifying an image acquired by the image sensor 150 in association with the illumination position of a point light source 141 which was turned on during imaging, and information about the presence or absence of the mask 242. Note that with regard to the presence or absence of the mask 242, "present" indicates a state in which the mask 242 has been placed, whereas "absent" indicates a state in which the mask 242 has been removed.

[1-3. Light and Dark Image Processing Unit]

The light and dark image processing unit 120 has a configuration similar to the light and dark image processing unit 120 of Embodiment 1, and is realized by at least one control circuit or processing circuit. The light and dark image processing unit 120 according to Embodiment 2 selects an image having a large luminance value or an image having a small luminance value from among the first image and the second image discussed above, and derives a difference based on the selected image and the fourth image to thereby generate a fifth image of the material. Herein, in Embodiment 2, each of the first image, the second image, the fourth image, and the fifth image has luminance values corresponding to the same pixels included in the image sensor 150.

More specifically, similarly to the light and dark image processing unit 120 of Embodiment 1 illustrated in FIG. 9, the light and dark image processing unit 120 is made up of a data acquisition unit 121, a maximum value decision unit 122, a minimum value decision unit 123, a calculation unit 124, an image generation unit 125, a pixel selection unit 126, and a storage unit 127.

The data acquisition unit 121 acquires, from the storage unit 110, an image to use in image processing, or in other words the luminance values of the individual pixels included in the image, and the illumination position corresponding to the image.

The pixel selection unit 126 selects, as the selected pixel, a pixel on which to perform a luminance calculation from among the multiple pixels of the image sensor 150, or in other words the multiple pixels in the image to be generated.

The maximum value decision unit 122 compares the luminance value of the selected pixel to the luminance values of the pixels at the same positions in each of multiple images stored in the storage unit 110, specifies the image that includes the pixel having the largest luminance value, and decides the largest luminance value as the maximum value of the luminance for the selected pixel.

The minimum value decision unit 123 compares the luminance value of the selected pixel to the luminance values of the pixels at the same position in each of multiple images stored in the storage unit 110, specifies the image that includes the pixel having the smallest luminance value, and decides the smallest luminance value as the minimum value of the luminance for the selected pixel.

The storage unit 127 stores images and illumination positions acquired by the data acquisition unit 121, and in addition, stores the maximum value decided by the maximum value decision unit 122 in association with the illumination position, and stores the minimum value decided by the minimum value decision unit 123 in association with the illumination position.

For each selected pixel in the image to be generated, the calculation unit 124 subtracts the luminance value of the pixel at the same position as the selected pixel included in an image taken in the state without the mask 242 from double the maximum value of the luminance for the selected pixel decided by the maximum value decision unit 122. Alternatively, for each selected pixel, the calculation unit 124 subtracts double the minimum value of the selected pixel decided by the minimum value decision unit 123 from the luminance value of the pixel at the same position as the selected pixel included in an image taken in the state without the mask 242. As a result, a luminance value is calculated for each pixel in the image to be generated.

In this way, the calculation unit 124 selects an image having a large luminance value or an image having a small luminance value from among the first image and the second image discussed above, and derives a difference based on the selected image and the fourth image to thereby generate a fifth image of the material. Note that each of the first image, the second image, the fourth image, and the fifth image includes a luminance value corresponding to a same pixel included in the image sensor 150.

Herein, there is a 1:1 area ratio of the light-transmitting part and the light-blocking part of the mask 242. Consequently, the calculation unit 124 generates the luminance value of the fifth image by deriving the difference between double the luminance value of the selected image, and the luminance value of the fourth image.

Specifically, in the case of selecting an image having a large luminance value from among the first image and the second image, the calculation unit 124 generates the luminance value of the fifth image by subtracting the luminance value of the fourth image from double the luminance value of the selected image. Alternatively, in the case of selecting an image having a small luminance value from among the first image and the second image, the calculation unit 124 generates the luminance value of the fifth image by subtracting double the luminance value of the selected image from the luminance value of the fourth image.

The image generation unit 125 generates an image made up of the luminance values for each of pixels calculated by the calculation unit 124.

[1-4. Output Unit]

The output unit 130 is an output apparatus that presents an image generated by the light and dark image processing unit 120, or a means of outputting an image as electronic data.

[2. Operation of Image Generating Apparatus]

Next, the operation of the image generating apparatus 20 configured as above will be described. The overall schematic operation of the image generating apparatus 20 according to Embodiment 2 is similar to the overall schematic operation of the image generating apparatus 10 of Embodiment 1 illustrated in the flowchart of FIG. 10, and thus the description thereof will be reduced or omitted.

In other words, an image generating method according to Embodiment 2 is an image generating method that generates an image of a translucent material, and uses a light source group made up of multiple light sources, including the first light source 141A and the second light source 141B, as well as an image sensor 150, and a mask 242. Additionally, in the image generating method, in step S1200, the following operations (a) to (e) are conducted, while in step S1300 and step S1400, the following operations (f) and (g) are conducted. In (a), the mask 242 is placed between the image sensor 150, and the first light source 141A and the second light source 141B. In (b), the image sensor 150 acquires a first image of the material while illumination is provided by the first light source 141A in a state in which the mask 242 is placed. In (c), the image sensor 150 acquires a second image of the material while illumination is provided by the second light source 141B in a state in which the mask 242 is placed. In (d), the mask 242 is removed from in between the image sensor 150, and the first light source 141A and the second light source 141B. In (e), the image sensor 150 acquires a fourth image of the material while illumination is provided by a light source included in the above light source group in a state in which the mask 242 is removed. In (f), an image having a large luminance value or an image having a small luminance value is selected from among the first image and the second image. In (g), a difference based on the selected image and the fourth image is derived to thereby generate a fifth image of the material.

[2-1. Multiple Light Source Imaging]

Figure 20:
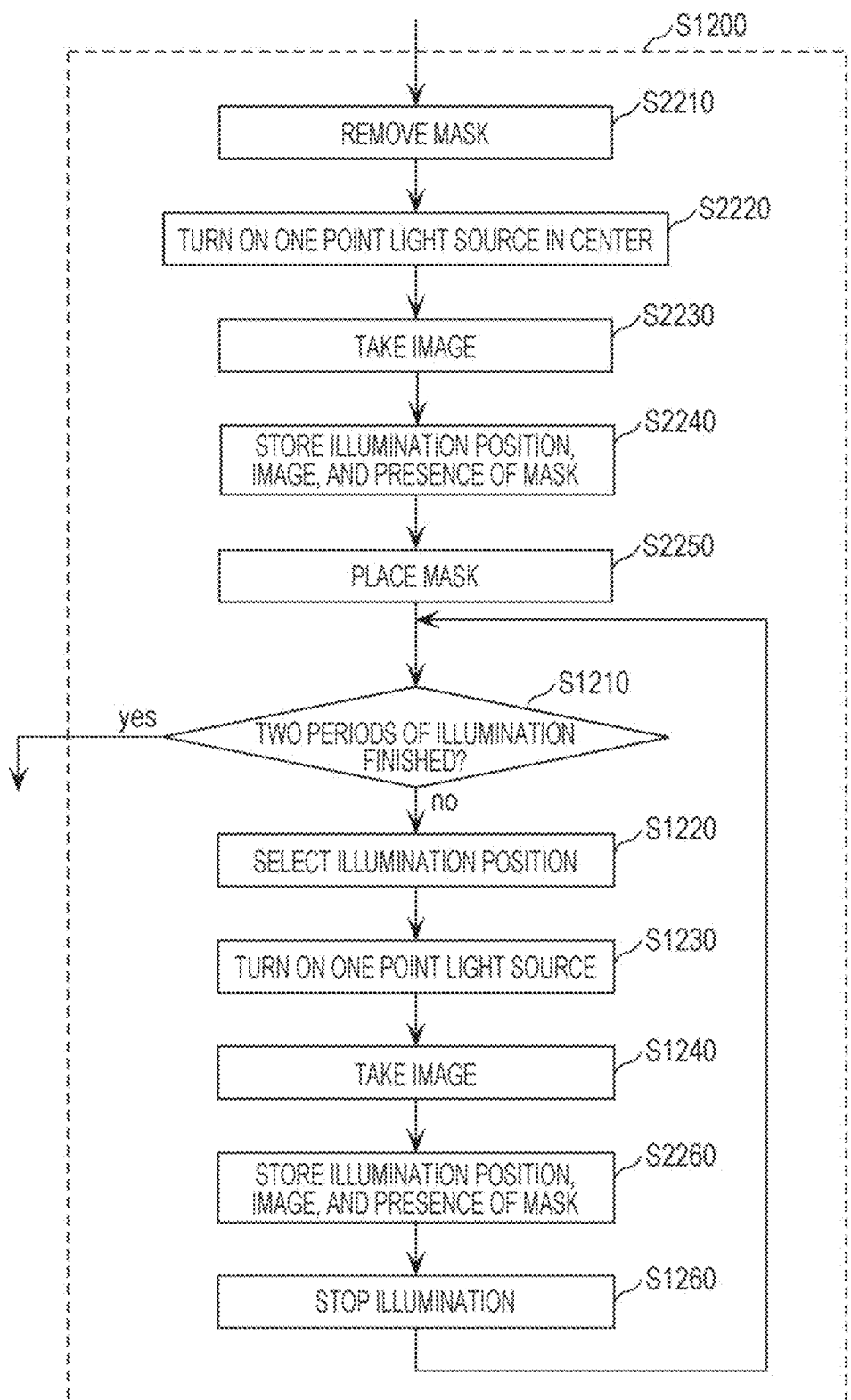
FIG. 20 is a flowchart illustrating an example of the operation of an imaging unit according to Embodiment 2.

FIG. 20 is a flowchart illustrating an example of the detailed operation of the imaging unit 200 of the image generating apparatus 20 according to Embodiment 2. The operation of the imaging unit 200 will be described in detail in accordance with FIG. 20.

(Step S2210)

The control unit 260 outputs a mask removal signal to the driving unit 243. The driving unit 243 removes the mask 242 of the illumination equipment 240 from in between the multiple point light sources 141 and the image sensor 150, or in other words, causes the mask 242 to move. As a result, the control unit 260 sets a state in which the light emitted from the multiple point light sources 141 is not blocked by the mask 242.

(Step S2220)

The control unit 260 outputs a center light ON signal that turns on the point light source 141 directly above the center of the image sensor 150 from among the multiple point light sources 141. The illumination equipment 240 receives the center light ON signal from the control unit 260, and from among the multiple point light sources 141, starts radiating light from only the point light source 141 directly above the center of the image sensor 150.

(Step S2230)

While the object is being illuminated by the point light source 141, the image sensor 150 acquires an image formed by the light from the point light source 141 that is transmitted through the object. At this point, the light emitted from the point light source 141 does not pass through the mask 242. In other words, the light emitted from the point light source 141 reaches the object and the image sensor 150 without being blocked.

(Step S2240)

The control unit 260 outputs the image acquired in step S2230, together with the illumination position from when the image was acquired, and information about the presence or absence of the mask 242 (specifically, "absent"), to the storage unit 110. The storage unit 110 stores the image, the illumination position, and the information about the presence or absence of the mask 242 in association with each other, as illustrated in FIG. 19, for example.

(Step S2250)

The control unit 260 outputs a mask placement signal to the driving unit 243. The driving unit 243 causes the mask 242 of the illumination equipment 240 to move, and places the mask 242 between the multiple point light sources 141 and the image sensor 150. As a result, the control unit 260 sets a state in which the light emitted from the multiple point light sources 141 is radiated through the mask 242 onto the object and the image sensor 150.

The operations thereafter are similar to the imaging operations of Embodiment 1 (step S1200 illustrated in FIG. 11). In the flowchart in FIG. 20, operations which are the same as FIG. 11 of Embodiment 1 are denoted with the same signs, and detailed description thereof will be reduced or omitted.

(Step S1210)

The control unit 260 references the illumination position list, and determines whether or not imaging of the object with illumination from each illumination position has finished.

At this point, if imaging with illumination from all illumination positions included in the illumination position list has finished (step S1210, yes), the flow proceeds to step S1300. On the other hand, if imaging with illumination from any of the illumination positions included in the illumination position list has not finished (step S1210, no), the flow proceeds to step S1220.

(Step S1220)

The control unit 260 selects an illumination position from which illumination has not been provided from among the multiple illumination positions included in the illumination position list, and outputs a control signal to the illumination equipment 240.

(Step S1230)

The illumination equipment 240 starts illuminating the object, in accordance with the control signal output from the control unit 260 in step S1220. In other words, from among the multiple point light sources 141 included in the illumination equipment 140, the point light source 141 at the illumination position selected in step S1220 starts radiating light.

(Step S1240)

While the object is being illuminated by the point light source 141, the image sensor 150 acquires an image formed by the light that travels from the point light source 141 through the mask 242, and is additionally transmitted through the object.

(Step S2260)

The control unit 260 outputs the image acquired in step S1240, together with the illumination position from when the image was acquired, and information about the presence or absence of the mask 242 (specifically, "present"), to the storage unit 110. The storage unit 110 stores the image, the illumination position, and the information about the presence or absence of the mask 242 in association with each other.

(Step S1260)

After that, the control unit 260 outputs a control signal to the illumination equipment 240, and stops the illumination of the object. After step S1260, the flow returns to step S1210.

By repeating the processes from step S1210 to step S1260, the object is successively irradiated with light from the point light sources 141 at all of the illumination positions included in the illumination position list. In addition, every time the object is irradiated with light through the mask 142, the image sensor 150 acquires an image.

[2-2. Light and Dark Image Process]

The operation of the light and dark image processing unit 120 in step S1300 will be described in detail.

Figure 21:
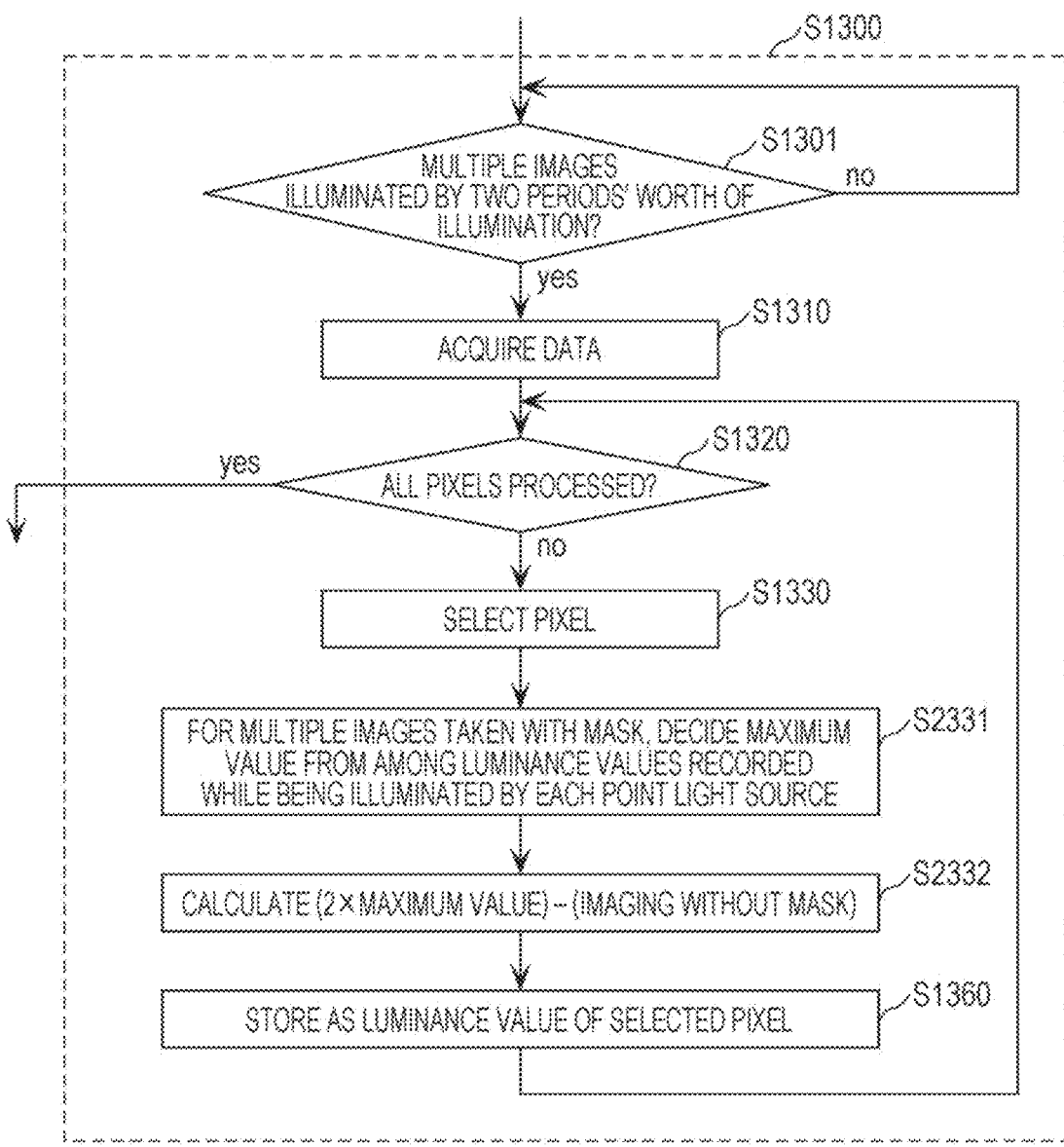
FIG. 21 is a flowchart illustrating an example of the operation of a light and dark image processing unit according to Embodiment 2.

FIG. 21 is a flowchart illustrating an example of the operation of the light and dark image processing unit 120 according to Embodiment 2. In the flowchart illustrated in FIG. 21, the steps similar to steps S1301 to S1330 and step 1360 illustrated in FIG. 14 of Embodiment 1 are denoted with the same signs, and detailed description thereof will be reduced or omitted.

(Step S1310)

The data acquisition unit 121 of the light and dark image processing unit 120 acquires the multiple images acquired in step S1200, the illumination positions corresponding to each of the multiple images, and the information about the presence or absence of the mask 242 from the storage unit 110, and stores the acquired information in the storage unit 127.

(Step S1320)

The pixel selection unit 126 determines whether or not the process of calculating luminance values for all pixels included in the image to generate has finished.

If the calculation process has finished for all pixels included in the image to generate (step S1320, yes), the light and dark image processing unit 120 ends the light and dark image process (that is, the flow proceeds to step S1400).

If the calculation process has not finished for any of the pixels included in the image to generate (step S1320, no), the light and dark image processing unit 120 continues the light and dark image process (that is, the flow proceeds to step S1330).

(Step S1330)

The pixel selection unit 126 selects one pixel from among the multiple pixels included in the image to generate. The one pixel selected at this point, or in other words the selected pixel, is a pixel on which the calculation process has not been executed yet from among the multiple pixels included in the image to generate.

(Step S2331)

For the pixel selected in step S1330 (that is, the selected pixel), the maximum value decision unit 122 compares the luminance values of the pixels at the same position as the selected pixel included in each of the multiple images taken in step S1240 when the mask 242 is present. From the results of the comparison, the maximum value decision unit 122 decides the maximum luminance value as the maximum value of the luminance for the selected pixel.

(Step S2332)

The calculation unit 124 subtracts the luminance value of the pixel at the same position as the selected pixel included in the image taken in step S2230 when the mask 242 is absent from double the maximum value of the luminance of the selected pixel decided in step S2331.

(Step S1360)

The image generation unit 125 stores the luminance value calculated in step S2332 as the luminance of the selected pixel.

By repeating the processes from step S1320 to step S1360, the light and dark image processing unit 120 is able to generate the luminance values of all pixels in the image to generate.

At this point, the calculation in step S2332 will be described.

From among the light sensed by an arbitrary pixel on the image sensor 150 while the mask 242 is removed, take the light from a point light source 141 which is transmitted through the material, and which travels in a straight line to reach the image sensor 150, to be a direct component D. Also, take the light from a point light source which hits the medium or the object and is refracted or scattered to be a global component G. In other words, when the mask 242 is removed, the light sensed by an arbitrary pixel on the image sensor 150 becomes D+G.

When the mask 242 is placed, at an arbitrary pixel, the luminance value of the pixel becomes a maximum in Embodiment 2 when the pixel is being irradiated with light in an ideal bright segment. In this case, the direct component from the point light source 141 is equal to the direct component D when the mask 242 is removed. However, when the mask 242 is placed, half of the light emitted from the point light source 141 is blocked by the light-blocking part. Note that there is a 1:1 area ratio of the light-transmitting part and the light-blocking part of the mask 242. Consequently, when the mask 242 is placed, compared to when the mask 242 is removed, the light that is refracted or scattered becomes halved. In other words, when the mask 242 is placed, the global component becomes equal to half the global component G in the case in which the mask 242 is removed. Consequently, when the mask 242 is placed, the light received by an arbitrary pixel on the image sensor 150 in a bright segment becomes:

$$D + \frac{1}{2}G$$

When the mask 242 is placed, at an arbitrary pixel, the luminance value of the pixel becomes a minimum in Embodiment 2 during the state of an ideal dark segment. In this case, the direct component from the point light source 141 is blocked by the mask 242, and thus is not sensed. The sensed light is the global component of light from a point light source 141 that passes through the light-transmitting part so as to arrive directly at another pixel on the image sensor 150, but is refracted or scattered, and thereby reaches the pixel. In other words, since there is a 1:1 area ratio between the light-transmitting part and the light-blocking part of the mask 242, the light sensed by a pixel in a dark segment is the global component in which the light of a portion of half the light emitted from a point light source 141 is refracted or scattered to reach the pixel. This global component is half the global component G in the case in which the mask 242 is removed. Consequently, in an ideal dark segment state, or in other words when the minimum value of the luminance is obtained, the light sensed by a pixel becomes:

$$\frac{1}{2}G$$

Since refracted or scattered light acts as noise that makes the image made up of direct light unclear, by removing the refracted light or the scattered light, or in other words the global component G, the image may be made clearer. Accordingly, in step S2332 illustrated in FIG. 21 of Embodiment 2, in order to decide the direct component D, the luminance value of the bright segment is doubled, or in other words, the maximum value of the luminance is doubled.

Subsequently, the component of light sensed while the mask 242 is removed, or in other words, the luminance value when taking an image without a mask, is subtracted from double the maximum value, like in Formula 1 below.

$$D = 2 \times \left(D + \frac{1}{2}G\right) - (D + G) \quad \text{(Formula 1)}$$

Also, the light sensed in a dark segment, or in other words the minimum value of the luminance, is the global component. Consequently, in order to decide the direct component D, double the light sensed in a dark segment, or in other words, double the minimum value of the luminance, is subtracted from the luminance value obtained when taking an image without a mask, like in Formula 2 below.

$$D = (D + G) - 2 \times \left(\frac{1}{2}G\right) \quad \text{(Formula 2)}$$

Figure 22:
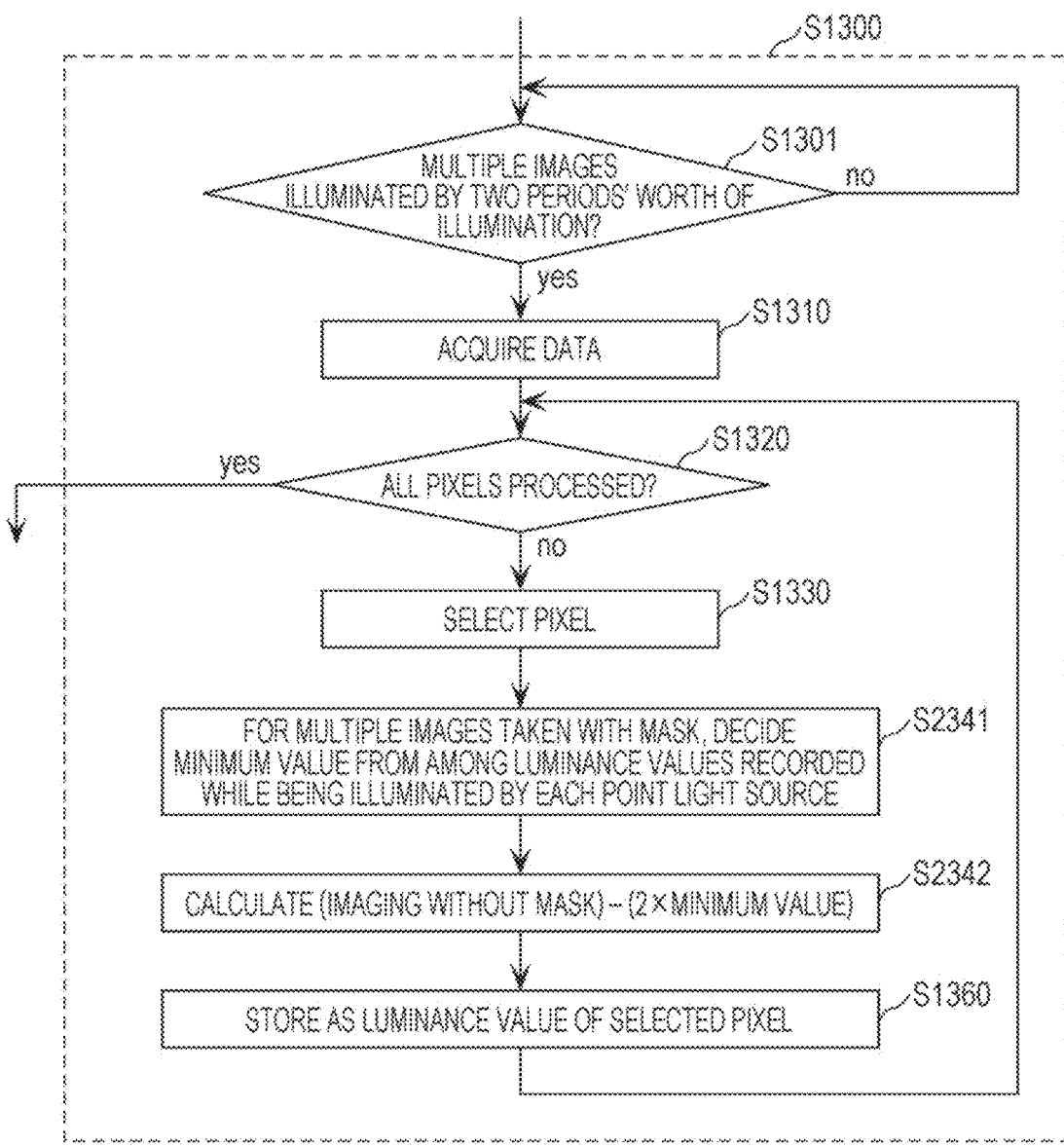
FIG. 22 is a flowchart illustrating another example of the operation of a light and dark image processing unit according to Embodiment 2.

FIG. 22 is a flowchart illustrating another example of the operation of the light and dark image processing unit 120 according to Embodiment 2. Specifically, the flowchart in FIG. 22 illustrates operation using the subtraction in Formula 2 above.

The flowchart in FIG. 22 includes steps S2341 and S2342 instead of steps S2331 and S2332 in the flowchart of FIG. 21.

(Step S2341)

For the pixel selected in step S1330 (that is, the selected pixel), the minimum value decision unit 123 compares the luminance values of the pixels at the same position as the selected pixel included in each of the multiple images taken in step S1240 when the mask 242 is present. From the results of the comparison, the minimum value decision unit 122 decides the minimum luminance value as the minimum value of the luminance for the selected pixel.

(Step S2342)

The calculation unit 124 subtracts double the minimum value of the luminance for the selected pixel decided in step S2341 from the luminance value of the pixel at the same position as the selected pixel included in the image taken in step S2230 without a mask. As a result, a luminance value in accordance with the direct component is generated for the selected pixel.

[3. Advantageous Effects]

As above, according to the image generating apparatus 20 according to Embodiment 2, light is projected onto an object and an image sensor 150 through a mask 242 having a repeating pattern of a light-blocking part and a light-transmitting part. Subsequently, for each selected pixel included in the image to be generated, the largest luminance value from among the luminance values of pixels at the same position as the selected pixel in each of the multiple images taken with transmitted light is computed as the maximum value of the luminance for the selected pixel. Additionally, for each selected pixel included in the image to be generated, the luminance value of the pixel at the same position as the selected pixel in the image taken without the mask 242 is subtracted from double the maximum value of the luminance value for the selected pixel. As a result, it is possible to generate an image of the object illuminated by the direct component of light from which refracted light or scattered light has been removed. Alternatively, for each selected pixel included in the image to be generated, the smallest luminance value from among the luminance values of pixels at the same position as the selected pixel in each of the multiple images taken with transmitted light is computed as the minimum value of the luminance for the selected pixel. Additionally, for each selected pixel included in the image to be generated, double the minimum value of the luminance for the selected pixel is subtracted from the luminance value of the pixel at the same position as the selected pixel in the image taken without the mask 242. As a result, it is possible to generate an image of the object illuminated by the direct component of light from which refracted light or scattered light has been removed.

In this way, in Embodiment 2, noise due to scattered light or refracted light may be reduced, and an image that is clear due to direct light may be generated.

Modification of Embodiment 2

A modification of Embodiment 2 will now be described. In Embodiment 2, when taking an image without the mask 242 to use for calculation, the point light source 141 positioned directly above the center of the image sensor 150 is used. Strictly speaking, however, the direct component of light from a point light source 141 is different depending on the relationship between the position of the point light source 141 and the position of a pixel on the image sensor 150. Consequently, if the illumination position corresponding to the image that includes the pixel having the maximum value or the minimum value of luminance does not necessarily match the illumination position when taking an image without the mask 242, like in Embodiment 2, error may be included in the direct component.

Accordingly, in a modification of Embodiment 2, all of the multiple illumination positions used when imaging is conducted with the mask 242 are also used when imaging is conducted without the mask 242. In the luminance value calculation process, the luminance value of the selected pixel is calculated by using the luminance of an image in the state with the mask 242 and the luminance of an image in the state without the mask, which are taken while the same illumination position is being used. As a result, error in the direct component due to inconsistency in the illumination position may be resolved. Hereinafter, the points about the modification of Embodiment 2 that differ from Embodiment 2 will be described primarily.

Since the configuration of the image generating apparatus 20 according to the present modification is similar to Embodiment 2, detailed description thereof will be reduced or omitted.

[1. Operation of Image Generating Apparatus]

The operation of the image generating apparatus 20 according to the present modification will be described. The overall schematic operation of the image generating apparatus 20 according to the present modification is similar to the overall schematic operation of the image generating apparatus 10 of Embodiment 1 illustrated in the flowchart of FIG. 10. However, the detailed operation in each of the multiple light source imaging in step S1200 and the light and dark image process in step S1300 according to the present modification is different from Embodiment 1 or 2. Also, since the image generating operation in step S1400 according to the present modification is similar to Embodiment 1 or 2, the description of such operation will be reduced or omitted.

[1-1. Multiple Light Source Imaging]

Figure 23:
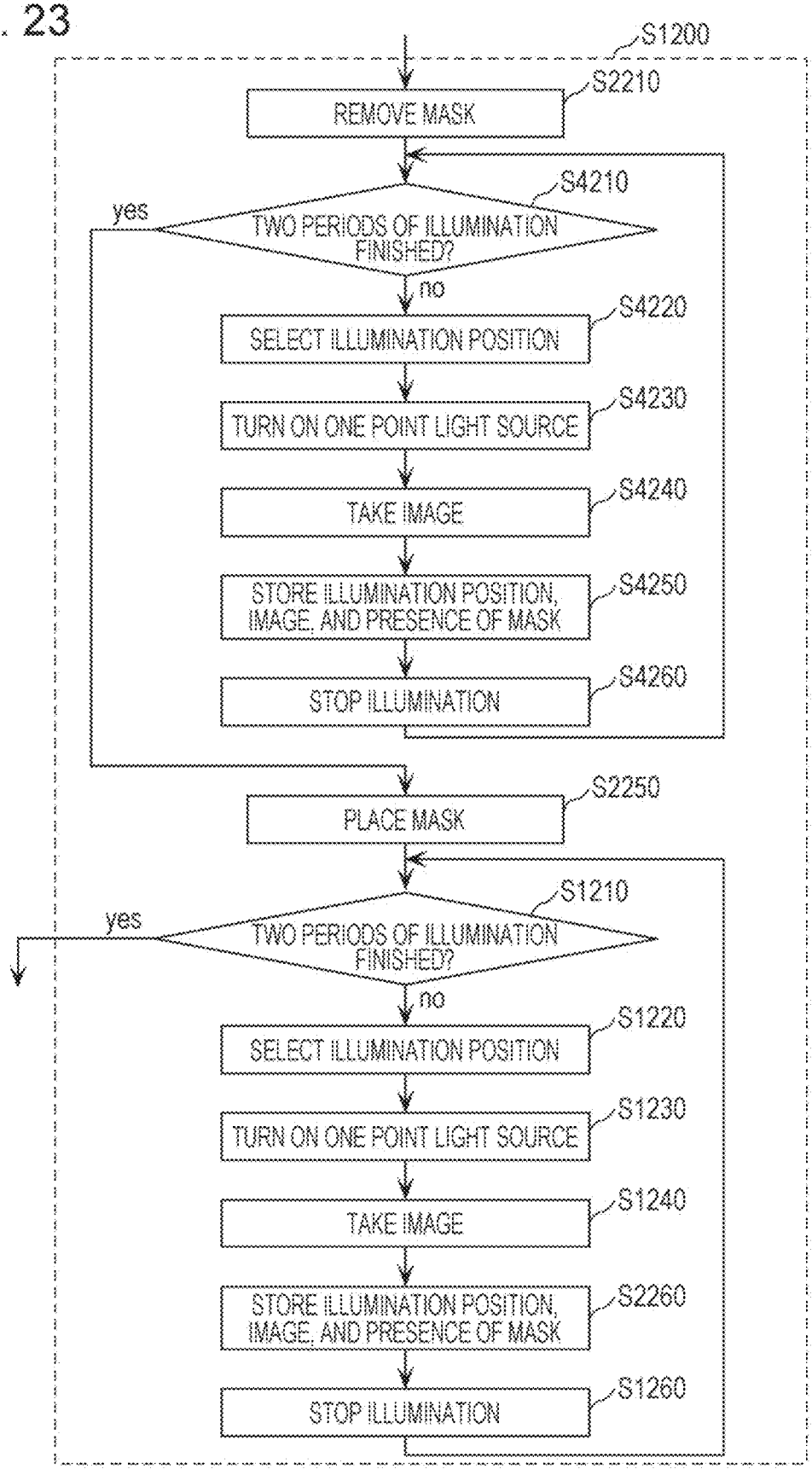
FIG. 23 is a flowchart illustrating an example of the operation of an imaging unit according to a modification of Embodiment 2.

FIG. 23 is a flowchart illustrating an example of the detailed operation of the imaging unit 200 of the image generating apparatus 20 according to a modification of Embodiment 2. In other words, FIG. 23 illustrates an example of the detailed operation of the multiple light source image (step S1200 in FIG. 10) according to a modification of Embodiment 2. Step S1200 will be described in detail in accordance with FIG. 23. From among the respective operations included in the multiple light source imaging of the present modification, operations which are shared in common with FIG. 11 of Embodiment 1 and FIG. 20 of Embodiment 2 are denoted with the same signs, and description thereof will be reduced or omitted.

(Step S2210)

The control unit 260 outputs a mask removal signal to the driving unit 243. The driving unit 243 causes the mask 242 of the illumination equipment 240 to move from in between the multiple point light sources 141 and the image sensor 150. As a result, the control unit 260 sets a state in which the light emitted from the multiple point light sources 141 is not blocked by the mask 242.

(Step S4210)

The control unit 260 references the illumination position list, and determines whether or not imaging of the object with illumination from each illumination position has finished. The illumination position list is shared in common with the illumination position list used when the mask 242 is placed.

At this point, if imaging with illumination from all illumination positions included in the illumination position list has finished (step S4210, yes), the flow proceeds to step S2250. On the other hand, if imaging with illumination from any of the illumination positions included in the illumination position list has not finished (step S4210, no), the flow proceeds to step S4220.

(Step S4220)

The control unit 260 selects an illumination position from which illumination has not been provided from among the multiple illumination positions included in the illumination position list, and outputs a control signal to the illumination equipment 240.

(Step S4230)

The illumination equipment 240, following the control signal output by the control unit 260 in step S4220, starts radiating light from the point light source 141 at the illumination position selected in step S4220 from among the multiple point light sources 141 included in the illumination equipment 240.

(Step S4240)

While the object is being illuminated by the point light source 141, the image sensor 150 acquires an image formed by the light which is emitted from the point light source 141 and transmitted through the object.

(Step S4250)

The control unit 260 outputs the image acquired in step S4240, together with the illumination position from when the image was acquired, and information about the presence or absence of the mask 242 (specifically, "absent"), to the storage unit 110. The storage unit 110 stores the image, the illumination position, and the information about the presence or absence of the mask 242 in association with each other.

(Step S2460)

After that, the control unit 260 outputs a control signal to the illumination equipment 240, and stops the illumination of the object. After step 34260, the flow returns to step S4210.

After step S2210, by repeating the processes from step S4210 to step S4260, the object is successively irradiated with light from the point light sources 141 at all of the illumination positions included in the illumination position list. Additionally, every time the object is irradiated with light, the image sensor 150 acquires an image in a state without the mask 242.

(Step S2250)

After the imaging in the state without the mask 242 is finished, the control unit 260 outputs a mask placement signal to the driving unit 243. The driving unit 243 causes the mask 242 of the illumination equipment 240 to move, and places the mask 242 between the multiple point light sources 141 and the image sensor 150. As a result, the control unit 260 sets a state in which the light emitted from the multiple point light sources 141 is radiated through the mask 242 onto the object and the image sensor 150.

(Step S1210)

The control unit 260 references the illumination position list, and determines whether or not imaging of the object with illumination from each illumination position has finished. The illumination position list is the same as the illumination position list referenced in step S4210.

At this point, if imaging with illumination from all illumination positions included in the illumination position list has finished (step S1210, yes), the flow proceeds to step S1300. On the other hand, if imaging with illumination from any of the illumination positions included in the illumination position list has not finished (step S1210, no), the flow proceeds to step S1120.

(Step S1220)

The control unit 260 selects an illumination position from which illumination has not been provided from among the multiple illumination positions included in the illumination position list, and outputs a control signal to the illumination equipment 240.

(Step S1230)

The illumination equipment 240 starts illuminating the object, in accordance with the control signal output from the control unit 260 in step S1220. In other words, from among the multiple point light sources 141 included in the illumination equipment 240, the point light source 141 at the illumination position selected in step S1220 starts radiating light.

(Step S1240)

While the object is being illuminated by the point light source 141, the image sensor 150 acquires an image formed by the light that travels from the point light source 141 through the mask 242, and is additionally transmitted through the object.

(Step S2260)

The control unit 260 outputs the image acquired in step S1240, together with the illumination position from when the image was acquired, and information about the presence or absence of the mask 242 (specifically, "present"), to the storage unit 110. The storage unit 110 stores the image, the illumination position, and the information about the presence or absence of the mask 242 in association with each other.

(Step S1260)

After that, the control unit 260 outputs a control signal to the illumination equipment 240, and stops the illumination of the object. After step S1260, the flow returns to step S1210.

By repeating the processes from step S1210 to step S1260, the object is successively irradiated with light from the point light sources 141 at all of the illumination positions included in the illumination position list. In addition, every time the object is irradiated with light through the mask 142, the image sensor 150 acquires an image.

[1-2. Light and Dark Image Process]

The operation of the light and dark image processing unit 20 in step S1300 will be described in detail.

Figure 24:
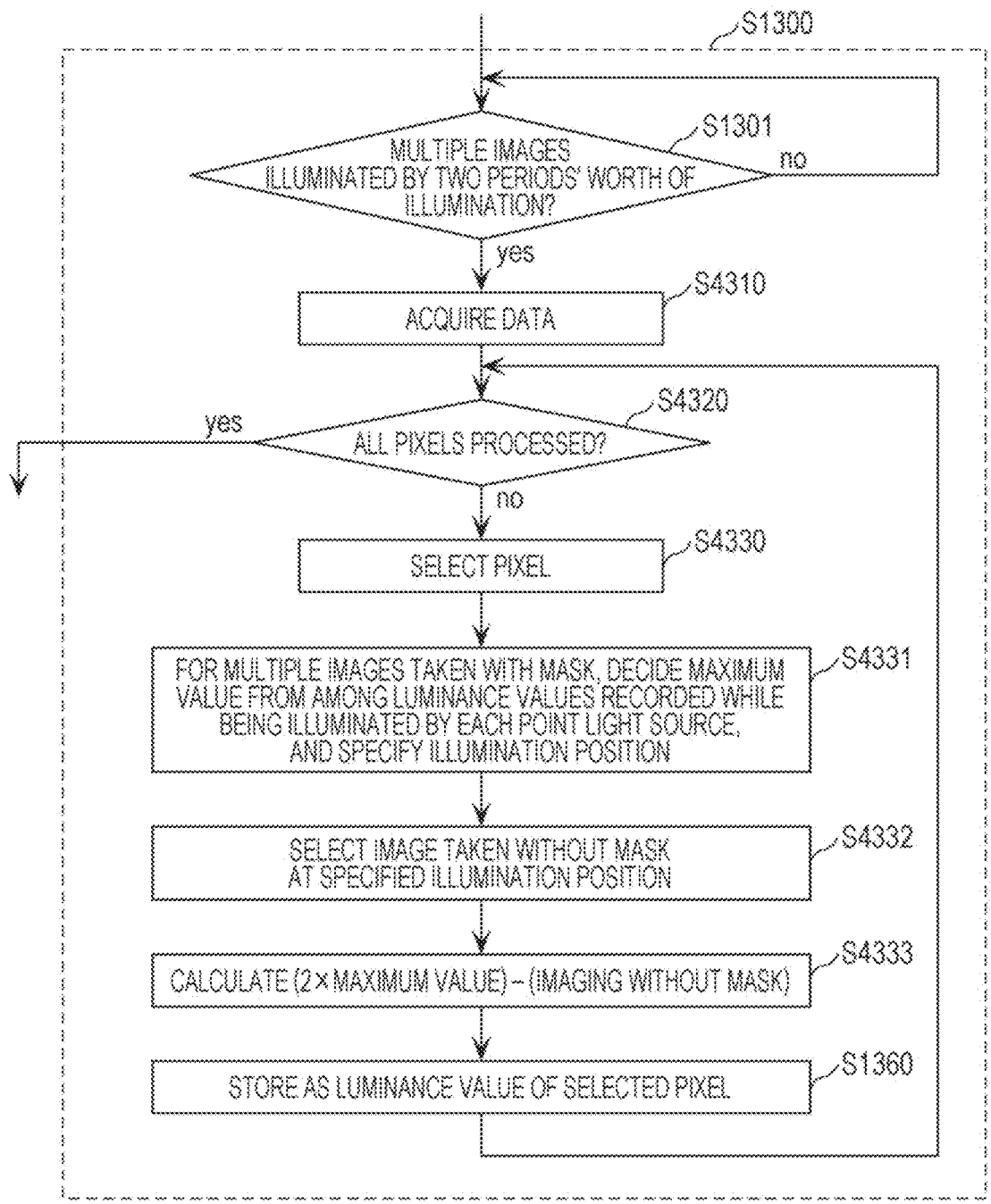
FIG. 24 is a flowchart illustrating an example of the operation of a light and dark image processing unit according to a modification of Embodiment 2.

FIG. 24 is a flowchart illustrating an example of the operation of the light and dark image processing unit 120 according to a modification of Embodiment 2. In the flowchart illustrated in FIG. 24, steps which are similar to steps in each of FIG. 14 of Embodiment 1 and FIG. 21 of Embodiment 2 are denoted with the same signs, and detailed description thereof will be reduced or omitted.

(Step S4310)

The data acquisition unit 121 of the light and dark image processing unit 120 acquires the multiple images acquired in step S1200, the illumination positions corresponding to each of the multiple images, and the information about the presence or absence of the mask 242 from the storage unit 110, and stores the acquired information in the storage unit 127.

(Step S4320)

The pixel selection unit 126 determines whether or not the process of calculating the luminance for all pixels included in the image to generate has finished.

If the calculation process has finished for all pixels included in the image to generate (step S4320, yes), the light and dark image processing unit 120 ends the light and dark image process (that is, the flow proceeds to step S1400).

If the calculation process has not finished for any of the pixels included in the image to generate (step S4320, no), the light and dark image processing unit 120 continues the light and dark image process (that is, the flow proceeds to step S4330).

(Step S4330)

The pixel selection unit 126 selects one pixel from among the multiple pixels included in the image to generate. The one pixel selected at this point, or in other words the selected pixel, is a pixel on which the calculation process has not been executed yet from among the multiple pixels included in the image to generate.

(Step S4331)

For the pixel selected in step S4330 (that is, the selected pixel), the maximum value decision unit 122 compares the luminance values of the pixels at the same position as the selected pixel included in each of the multiple images taken in step S1240 when the mask 242 is present. From the results of the comparison, the maximum value decision unit 122 decides the maximum luminance value as the maximum value of the luminance for the selected pixel. Additionally, the maximum value decision unit 122 specifies the illumination position from which the image including the pixel having the largest luminance value was taken.

(Step S4332)

The calculation unit 124 selects, from the storage unit 127, the image taken in the state without the mask 242 at the time of the illumination position specified in step S4331.

(Step S4333)

The calculation unit 124 subtracts the luminance value of the pixel at the same position as the selected pixel included in the image selected in step S4332 from double the maximum value of the luminance of the selected pixel decided in step S4331. Note that the image selected in step S4332 is the image taken when the object is illuminated by light which does not go through the mask 242, and which is from the point light source 141 at the same illumination position as the illumination position when the image including the pixel having the largest luminance value is acquired.

(Step S1360)

The image generation unit 125 stores the luminance value calculated in step S4333 as the luminance value of the selected pixel.

By repeating the processes from step S4320 to step S1360, the light and dark image processing unit 120 is able to generate the luminance values of all pixels in the image to generate.

Note that in the example illustrated in FIG. 24, the luminance of the image taken in the state without the mask 242 is subtracted from double the maximum value of the luminance obtained in the state with the mask 242 while illumination is provided by the point light source 141 at the same illumination position, like in Formula 1 above. However, double the minimum value of the luminance obtained in the state with the mask 242 may also be subtracted from the luminance of the image taken in the state without the mask 242 while illumination is provided by the point light source 141 at the same illumination position, like in Formula 2 above.

Figure 25:
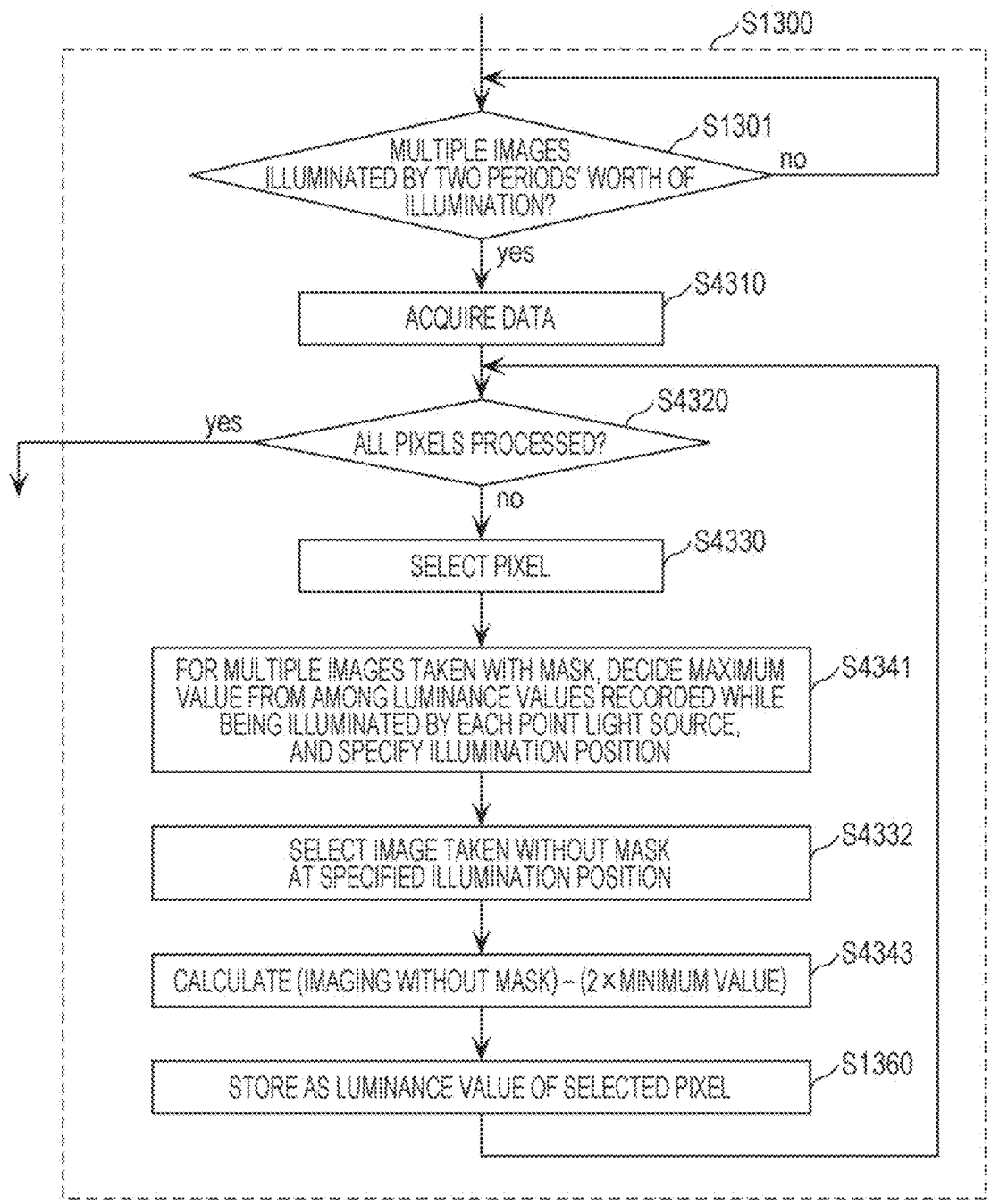
FIG. 25 is a flowchart illustrating an example of the operation of a light and dark image processing unit according to another modification of Embodiment 2.

FIG. 25 is a flowchart illustrating another example of the operation of the light and dark image processing unit 120 according to a modification Embodiment 2. In the flowchart illustrated in FIG. 25, steps which are similar to FIG. 24 are denoted with the same signs, and detailed description thereof will be reduced or omitted. In the flowchart illustrated in FIG. 25, the operations in step S4341 and step S4343 are conducted instead of step S4331 and step S4333 in FIG. 24.

(Step S4341)

For the pixel selected in step S4330 (that is, the selected pixel), the minimum value decision unit 123 compares the luminance values of the pixels at the same position as the selected pixel included in each of the multiple images taken in step S1240 when the mask 242 is placed. From the results of the comparison, the minimum value decision unit 122 decides the minimum luminance value as the minimum value of the luminance for the selected pixel. Additionally, the minimum value decision unit 123 specifies the illumination position from which the image including the pixel having the smallest luminance value was taken.

(Step S4343)

The calculation unit 124 subtracts double the minimum value of the luminance for the selected pixel decided in step S4341 from the luminance value of the pixel at the same position as the selected pixel in the image selected in step S4332. Note that the image selected in step S4332 is the image taken when the object is illuminated by light which does not go through the mask 242, and which is from the point light source 141 at the same illumination position as the illumination position when the image including the pixel having the smallest luminance value is acquired.

[2. Advantageous Effects]

As above, according to the image generating apparatus 20 according to a modification of Embodiment 2, light is projected onto an object and an image sensor 150 through a mask 242 having a repeating pattern of a light-blocking part and a light-transmitting part. Subsequently, for each selected pixel included in the image to be generated, the largest luminance value from among the luminance values of pixels at the same position as the selected pixel in each of the multiple images taken with transmitted light is computed as the maximum value of the luminance for the selected pixel. Additionally, for each selected pixel, the luminance value of the pixel at the same position as the selected pixel in an image taken in a state without the mask 242, and with illumination provided from the same illumination position as when the maximum value of the luminance was obtained by imaging, is computed as a maskless imaging luminance value. Subsequently, for each selected pixel; the maskless imaging luminance value corresponding to the selected pixel is subtracted from double the maximum value of the luminance of the selected pixel. As a result, it is possible to generate an image of the object illuminated by the direct component of light from which refracted light or scattered light has been removed.

Alternatively, for each selected pixel included in the image to be generated, the smallest luminance value from among the luminance values of pixels at the same position as the selected pixel in each of the multiple images taken with transmitted light is computed as the minimum value of the luminance for the selected pixel. Additionally; for each selected pixel, the luminance value of the pixel at the same position as the selected pixel in an image taken in a state without the mask 242, and with illumination provided from the same illumination position as when the minimum value of the luminance was obtained by imaging, is computed as a maskless imaging luminance value. Subsequently, for each selected pixel, double the minimum value of the luminance of the selected pixel is subtracted from the maskless imaging luminance value corresponding to the selected pixel. As a result, it is possible to generate an image of the object illuminated by the direct component of light from which refracted light or scattered light has been removed.

In this way, in the modification of Embodiment 2, noise due to scattered light or refracted light may be reduced, and an image that is clear due to direct light and without error of the illumination position may be generated.

Advantageous Effects of Embodiment 2

Figure 28A:
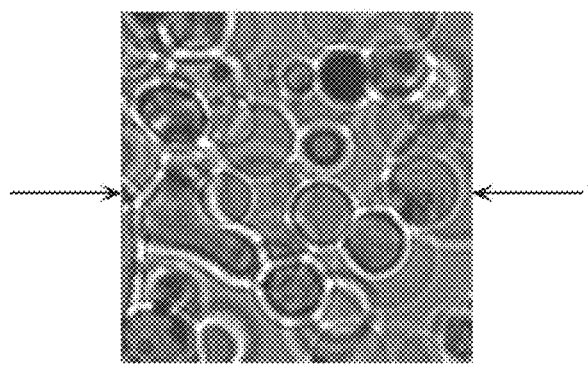
FIG. 28A is a diagram illustrating an image taken in a state of radiating illumination from a point light source, without a mask.
Figure 28B:
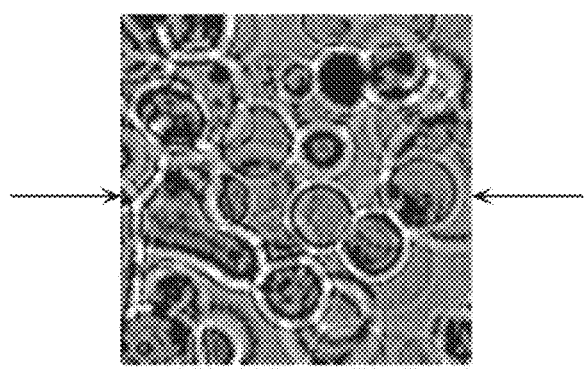
FIG. 28B is a diagram illustrating a composited image taken with the method according to Embodiment 2.

FIGS. 28A and 28B are images taken in a state in which multiple glass beads having an average diameter of 0.04 mm are kept fixed in place with a resin, similarly to FIGS. 26A and 26B. The image in FIG. 28A is the same as the image in FIG. 26A. The image in FIG. 28B is an image obtained by taking and compositing images with the method according to Embodiment 2. Compared to the image in FIG. 28A, the image in FIG. 28B has greater contrast, with distinct edges.

Figure 29:
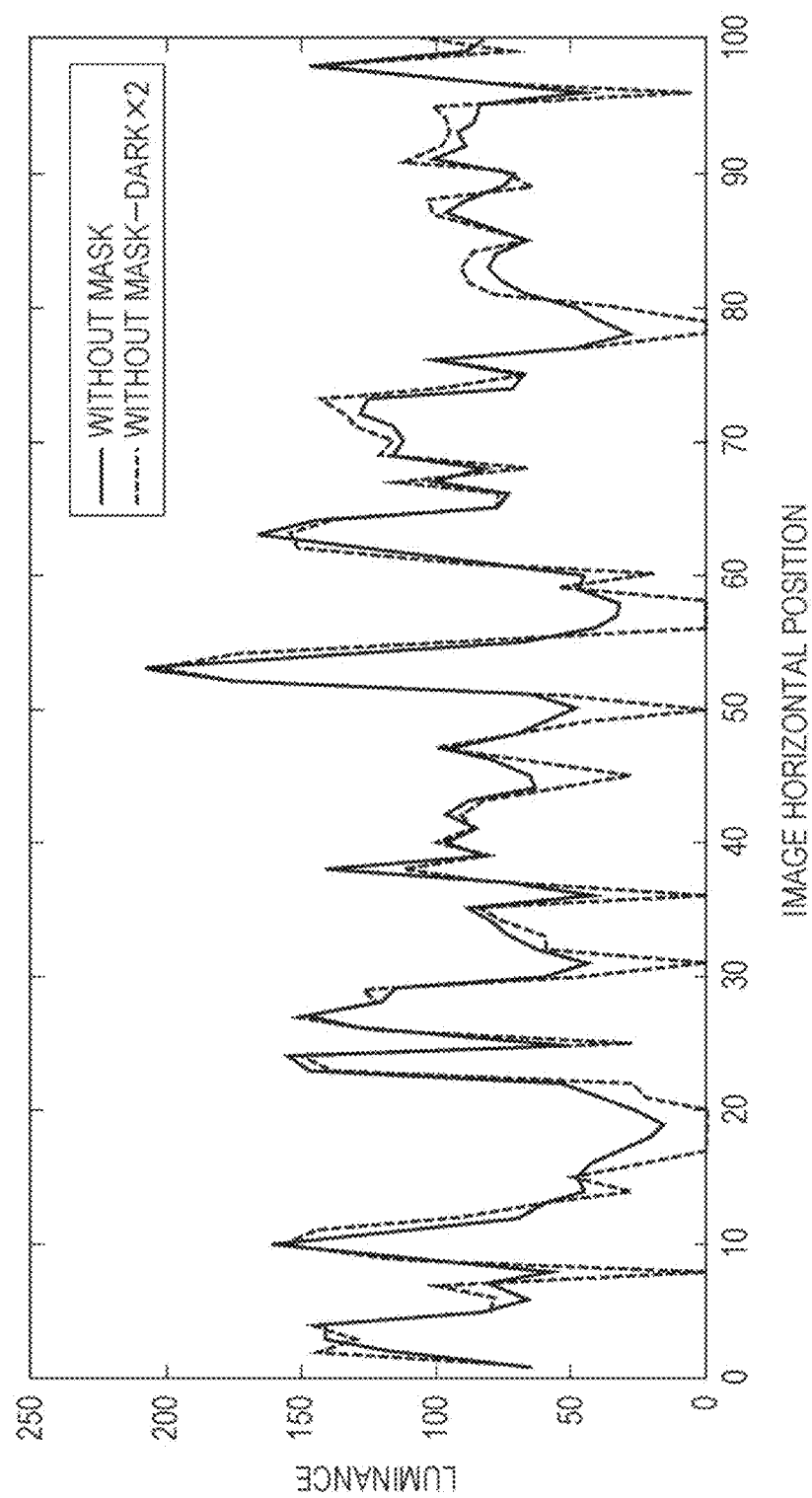
FIG. 29 is a diagram illustrating the luminance profiles of the image in FIG. 28A and the image in FIG. 28B.

FIG. 29 is a diagram illustrating the luminance profiles of the image in FIG. 28A and the image in FIG. 28B. In FIG. 29, the solid line indicates the luminance profile of the image in FIG. 28A, while the dashed line indicates the luminance profile of the composite image taken with the method according to Embodiment 2 in FIG. 28B. In FIG. 29, the horizontal axis is a value indicating the horizontal position of the image by pixel count, while the vertical axis is the luminance value. The luminance profiles illustrated in FIG. 29 are computed at the positions indicated by the arrows in FIGS. 28A and 28B.

The luminance peaks in FIG. 29 do not appear greatly different between the image taken in the state without a mask in FIG. 28A, and the image obtained by taking and compositing images with the method according to Embodiment 2 in FIG. 28B. However, for the portion of low luminance in FIG. 29, the luminance of the image in FIG. 28B (dashed line) is lower than the luminance of the image in FIG. 28A (solid line). In other words, the difference of luminance in the image of FIG. 28B (dashed line) is greater than the difference of luminance in the image of FIG. 28A (solid line). Thus, as illustrated in FIG. 29, the composite image taken with the method according to Embodiment 2 is confirmed to have higher contrast than the image taken without a mask.

Other Embodiments

The foregoing thus describes an image generating device according to one or more aspects on the basis of respective embodiments and their modifications, but the present disclosure is not limited to these respective embodiments and their modifications. Embodiments obtained by applying various modifications that may occur to persons skilled in the art to the foregoing respective embodiments or a modification thereof, as well as embodiments constructed by combining structural elements from different embodiments, may also be included in the scope of the present disclosure insofar as such embodiments do not depart from the gist of the present disclosure.

For example, in the foregoing respective embodiments and respective modifications, one pixel included in the image to be generated or the image sensor 150 is selected one after another as the selected pixel, and a luminance value is calculated for each selected pixel. However, instead of selecting one pixel included in the image to be generated or the image sensor 150 one after another, a block made up of 4×4 pixels or 8×8 pixels, for example, may also be selected one after another. In this case, each of the first image to the fifth image described above is an image corresponding to the same block included in the image sensor 150.

Also, in the foregoing Embodiment 2 and its modification, the mask 242 is moved, but by configuring the mask 242 with a liquid crystal shutter, the mask 242 may also be configured not to move. In other words, the mask 242 is fixed in a state of being placed between the multiple point light sources 141 and the image sensor 150. The mask 242 has slits or a checker pattern as described earlier, but becomes uniformly transparent if a voltage is applied, for example. In other words, at this time, the entirety of the mask 242 becomes the light-transmitting part, and a state that is optically similar to the state in which the mask 242 is removed from in between the multiple point light sources 141 and the image sensor 150 may be realized. Consequently, in this case, the illumination equipment 240 is not provided with the driving unit 243, and the control unit 260 is able to conduct operations similar to placing and removing the mask 242 by switching between applying a voltage to the mask 242, and stopping the application of such voltage. With this arrangement, it is possible to make the image generating apparatus 20 even more compact.

Note that, in the foregoing respective embodiments and respective modifications, each structural element may be configured by dedicated hardware, or realized by executing a software program suited to each structural element. Each structural element may be realized as a result of a program execution unit such as a CPU or processor reading out and executing a software program recorded on a recording medium such as a hard disk or semiconductor memory. Herein, software realizing a configuration such as the image generating apparatus according to the foregoing respective embodiments or respective modifications is a program causing a computer to execute each step included in the flowcharts illustrated in FIG. 10, FIG. 14, FIG. 16, and FIGS. 20 to 25.

Also, in the present disclosure, all or part of the units and devices, or all or part of the function blocks in the block diagrams illustrated in FIGS. 2, 9, and 17, may also be executed by one or multiple electronic circuits, including a semiconductor device, a semiconductor integrated circuit (IC), or a large-scale integration (LSI) chip. An LSI chip or IC may be integrated into a single chip, or be configured by combining multiple chips. For example, function blocks other than storage elements may be integrated into a single chip. Although referred to as an LSI chip or IC herein, such electronic circuits may also be called a system LSI chip, a very large-scale integration (VLSI) chip, or an ultra large-scale integration (VLSI) chip, depending on the degree of integration. A field-programmable gate array (FPGA) programmed after fabrication of the LSI chip, or a reconfigurable logic device in which interconnection relationships inside the LSI chip may be reconfigured or in which circuit demarcations inside the LSI chip may be set up, may also be used for the same purpose.

Furthermore, the function or operation of all or part of a unit, device, or part of a device may also be executed by software processing. In this case, the software is recorded onto a non-transitory recording medium, such as one or multiple ROM modules, optical discs, or hard disk drives, and when the software is executed by a processor, the software causes the processor and peripheral devices to execute specific functions in software. A system or device may also be equipped with one or multiple non-transitory recording media on which the software is recorded, a processor, and necessary hardware devices, such as an interface, for example.

The present disclosure is broadly applicable to apparatus such as an apparatus that generates an image of cells being cultivated or a mass of cells such as an embryo, for example, and is effective when imaging an object inside an incubator.

What is claimed is:

1. An image generating apparatus that generates an image of a translucent material, comprising:
   a first light source that illuminates the material;
   a second light source that illuminates the material from a position separated from the first light source by a certain distance;
   an image sensor on which the material is disposed;
   a mask including a light-transmitting part that transmits light from the first light source and the second light source, and a light-blocking part that blocks the light, the mask being positioned between the image sensor, and the first light source and the second light source; and
   a processing circuit, wherein
   the image sensor acquires a first image of the material when illuminated by the first light source, and acquires a second image of the material when illuminated by the second light source, and
   the processing circuit generates a third image of the material by deriving a difference between a luminance value of a pixel included in the first image and a luminance value of a pixel included in the second image at a same position as the pixel included in the first image,
   wherein the first light source is positioned one half-period away from the second light source, one period being a sum of a distance of one dark segment and a distance of one bright segment and the dark segment corresponding to the light-blocking part and the bright segment corresponding to the light-transmitting part,
   a partial region of a photosensitive surface of the image sensor acquires an image including a maximum luminance value and an image including a minimum luminance value in a case in which each of a plurality of light sources, including the first light source and the second light source, successively illuminates the material,
   the processing circuit selects an image group with less variance in luminance value from between a first image group including a maximum luminance image containing a maximum luminance value, and a second image group including a minimum luminance image containing a minimum luminance value,
   (i) if the selected image group is the first image group,
      the processing circuit selects, as the first image from among the first image group, an image including a maximum luminance value, being an image acquired by the image sensor when the first light source is illuminating the material, and
      selects, as the second image, an image acquired by the image sensor when the second light source is illuminating the material,
   (ii) if the selected image group is the second image group,
      the processing circuit selects, as the second image from among the second image group, an image including a minimum luminance value, being an image acquired by the image sensor when the second light source is illuminating the material, and
      selects, as the first image, an image acquired by the image sensor when the first light source is illuminating the material.

2. The image generating apparatus according to claim 1, wherein
   the partial region of the photosensitive surface of the image sensor
      acquires the first image in a state in which the light-transmitting part of the mask is disposed between the first light source that illuminates the material and the region, and
      acquires the second image in a state in which the light-blocking part of the mask is disposed between the second light source that illuminates the material, and the region.

3. The image generating apparatus according to claim 2, wherein
   the partial region of the photosensitive surface of the image sensor acquires a plurality of images with different luminance values, including the first image and the second image, when each of a plurality of light sources, including the first light source and the second light source, successively illuminates the material, and
   the processing circuit
      selects, as the first image from among the plurality of images, an image including a maximum luminance value, being an image acquired by the image sensor when the first light source is illuminating the material, and
      selects, as the second image from among the plurality of images, an image including a minimum luminance value, being an image acquired by the image sensor when the second light source is illuminating the material.

4. An image generating apparatus that generates an image of a translucent material, comprising:
   a light source group made up of a plurality of light sources, including a first light source that illuminates a material, and a second light source that illuminates the material from a position separated from the first light source by a certain distance;
   an image sensor on which the material is disposed;

a mask including a light-transmitting part that transmits light from the first light source and the second light source, and a light-blocking part that blocks the light; and a processing circuit, wherein the image sensor
(a) acquires a first image of the material when illuminated by the first light source,
(b) acquires a second image of the material when illuminated by the second light source,
(c) acquires a fourth image of the material when illuminated by a light source included in the light source group, the first image and the second image being acquired through the mask positioned between the image sensor, and the first light source and the second light source, and the fourth image being acquired without going through the mask, and the processing circuit selects an image having a larger luminance value or an image having a smaller luminance value from among a luminance value of a pixel included in the first image and a luminance value of a pixel included in the second image at a same position as the pixel included in the first image, and derives a difference based on the selected image and the fourth image to thereby generate a fifth image of the material.

5. The image generating apparatus according to claim 4, wherein
each of the first image, the second image, the fourth image, and the fifth image includes a luminance value corresponding to a same pixel included in the image sensor.

6. The image generating apparatus according to claim 4, wherein
there is a 1:1 area ratio of the light-transmitting part and the light-blocking part in the mask.

7. The image generating apparatus according to claim 6, wherein
the processing circuit generates the luminance value of the fifth image by deriving a difference between double the luminance value of the selected image, and the luminance value of the fourth image.

8. The image generating apparatus according to claim 7, wherein
if the image including the larger luminance value is selected from among the first image and the second image,
the processing circuit generates the luminance value of the fifth image by subtracting the luminance value of the fourth image from double the luminance value of the selected image.

9. The image generating apparatus according to claim 7, wherein
if the image including the smaller luminance value is selected from among the first image and the second image,
the processing circuit generates the luminance value of the fifth image by subtracting double the luminance value of the selected image from the luminance value of the fourth image.

10. An image generating method that generates an image of a translucent material using
a first light source that illuminates the material,
a second light source that illuminates the material from a position separated from the first light source by a certain distance,
an image sensor on which the material is disposed, and a mask including a light-transmitting part that transmits light from the first light source and the second light source, and a light-blocking part that blocks the light, the mask being positioned between the image sensor, and the first light source and the second light source, the method comprising:
(a) acquiring, with the image sensor, a first image of the material when illuminated by the first light source;
(b) acquiring, with the image sensor, a second image of the material when illuminated by the second light source; and
(c) generating a third image of the material by deriving a difference between a luminance value of a pixel included in the first image and a luminance value of a pixel included in the second image at a same position as the pixel included in the first image, wherein the first light source is positioned one half-period away from the second light source, one period being a sum of a distance of one dark segment and a distance of one bright segment and the dark segment corresponding to the light-blocking part and the bright segment corresponding to the light-transmitting part, in (a) and (b),
a partial region of a photosensitive surface of the image sensor acquires a plurality of images, including the first image and second image, by acquiring an image including a maximum luminance value and an image including a minimum luminance value when each of a plurality of light sources, including the first light source and the second light source, successively illuminates the material, in (c), an image group with less variance in luminance value is selected from between a first image group including a maximum luminance image containing a maximum acquired luminance value, and a second image group including a minimum luminance image containing a minimum acquired luminance value, and
(i) if the selected image group is the first image group,
an image including a maximum luminance value, being an image acquired by the image sensor when the first light source is illuminating the material, is selected as the first image from among the first image group, and
an image acquired by the image sensor when the second light source is illuminating the material is selected as the second image, and
(ii) if the selected image group is the second image group,
an image including a minimum luminance value, being an image acquired by the image sensor when the second light source is illuminating the material is selected as the second image from among the second image group, and
an image acquired by the image sensor when the first light source is illuminating the material is selected as the first image.

11. The image generating method according to claim 10, wherein
in (a), the partial region of the photosensitive surface of the image sensor acquires the first image in a state in which the light-transmitting part of the mask is disposed between the first light source that illuminates the material and the region, and
in (b), the partial region of the photosensitive surface of the image sensor acquires the second image in a state in which the light-blocking part of the mask is disposed between the second light source that illuminates the material, and the region.

12. The image generating method according to claim 11, wherein
- in (a) and (b), the partial region of the photosensitive surface of the image sensor acquires a plurality of images with different luminance values, including the first image and the second image, when each of a plurality of light sources, including the first light source and the second light source, successively illuminates the material, and
- in (c),
  - an image including a maximum luminance value, being an image acquired by the image sensor when the first light source is illuminating the material, is selected as the first image from among the plurality of images, and
  - an image including a minimum luminance value, being an image acquired by the image sensor when the second light source is illuminating the material is selected as the second image from among the plurality of images.

13. An image generating method that generates an image of a translucent material using
- a light source group made up of a plurality of light sources, including a first light source that illuminates a material, and a second light source that illuminates the material from a position separated from the first light source by a certain distance,
- an image sensor on which the material is disposed, and
- a mask including a light-transmitting part that transmits light from the first light source and the second light source, and a light-blocking part that blocks the light, the method comprising:
  - (a) disposing the mask between the image sensor, and the first light source and the second light source;
  - (b) acquiring, with the image sensor, a first image of the material when illuminated by the first light source in a state in which the mask is disposed;
  - (c) acquiring, with the image sensor, a second image of the material when illuminated by the second light source in a state in which the mask is disposed;
  - (d) removing the mask from in between the image sensor, and the first light source and the second light source;
  - (e) acquiring, with the image sensor, a fourth image of the material when illuminated by a light source included in the light source group, in a state in which the mask is removed;
  - (f) selecting an image having a larger luminance value or an image having a smaller luminance value from among a luminance value of a pixel included in the first image and a luminance value of a pixel included in the second image at a same position as the pixel included in the first image; and
  - (g) deriving a difference based on the selected image and the fourth image to thereby generate a fifth image of the material.

14. The image generating method according to claim 13, wherein
- each of the first image, the second image, the fourth image, and the fifth image includes a luminance value corresponding to a same pixel included in the image sensor.

15. The image generating method according to claim 13, wherein
- there is a 1:1 area ratio of the light-transmitting part and the light-blocking part in the mask.

16. The image generating method according to claim 15, wherein
- in (g), the luminance value of the fifth image is generated by deriving a difference between double the luminance value of the selected image, and the luminance value of the fourth image.

17. The image generating method according to claim 16, wherein
- in (g),
  - if the image including the larger luminance value is selected from among the first image and the second image,
  - the luminance value of the fifth image is generated by subtracting the luminance value of the fourth image from double the luminance value of the selected image.

18. The image generating method according to claim 16, wherein
- in (g),
  - if the image including the smaller luminance value is selected from among the first image and the second image,
  - the luminance value of the fifth image is generated by subtracting double the luminance value of the selected image from the luminance value of the fourth image.

19. An image generating apparatus, comprising:
- an image sensor including a first pixel, a material being disposed on the image sensor;
- light sources including a first light source and a second light source;
- a mask provided between an outer surface of the image sensor and the light sources; and
- a controller,
- wherein the mask includes a first region and a second region,
- the first region transmit light emitted from the light sources,
- the second region block the light emitted from the light sources,
- the first region include a first continuous area and a second continuous area, and the second region include a third continuous area and a fourth continuous area,
- the first continuous area is provided between the third continuous area and the fourth continuous area, and the fourth continuous area is provided between the first continuous area and the second continuous area,
- the first continuous area touches the third continuous area and the fourth continuous area, and the fourth continuous area touches the second continuous area,
- wherein, on a plane including a cross section of the first continuous area, a cross section of the second continuous area, a cross section of the third continuous area, a cross section of the fourth continuous area, a cross section of the first pixel, a cross section of the first light source, and a cross section of the second light source,
  - (i) a first line includes a first point on the cross section of the first light source and a second point on the cross section of the second light source,
  - (ii) the first point is provided between a first intersection and a second intersection, and the second point is provided between a third intersection and the second intersection,
  - (iii) the first intersection is an intersection of the first line and a second line, the second intersection is an intersection of the first line and a third line, and the third intersection is an intersection of the first line and a fourth line, and
  - (iv) the second line includes a third point on the cross section of the first pixel and a point on a border of the cross section of the first continuous area and the cross section of the third continuous area, the third line includes the third point and a point on a border of the cross section of the first continuous area and the cross section of the fourth continuous area, and the fourth line includes the third point and a point on a border of the cross section of the fourth continuous area and the cross section of the second continuous area, wherein the controller causes the first light source to emit light without causing the light sources except the first light source to emit light, during a first period, the controller causes the first pixel to obtain a first pixel value during the first period, the controller causes the second light source to emit light without causing the light sources except the second light source to emit light, during a second period, the controller causes the first pixel source to obtain a second pixel value during the second period, and the controller generates image data of the material using the first pixel value and the second pixel value, and wherein the first light source is positioned one half-period away from the second light source, one period being a sum of a distance of one dark segment and a distance of one bright segment and the dark segment corresponding to the light-blocking part and the bright segment corresponding to the light-transmitting part, a partial region of a photosensitive surface of the image sensor acquires an image including a maximum luminance value and an image including a minimum luminance value in a case in which each of a plurality of light sources, including the first light source and the second light source, successively illuminates the material, the controller selects an image group with less variance in luminance value from between a first image group including a maximum luminance image containing a maximum luminance value, and a second image group including a minimum luminance image containing a minimum luminance value, (i) if the selected image group is the first image group,
the controller selects, as the first image from among the first image group, an image including a maximum luminance value, being an image acquired by the image sensor when the first light source is illuminating the material, and
selects, as the second image, an image acquired by the image sensor when the second light source is illuminating the material, (ii) if the selected image group is the second image group,
the controller selects, as the second image from among the second image group, an image including a minimum luminance value, being an image acquired by the image sensor when the second light source is illuminating the material, and
selects, as the first image, an image acquired by the image sensor when the first light source is illuminating the material.

* * * * *